(12) United States Patent
Rodriguez et al.

(10) Patent No.: US 7,217,676 B2
(45) Date of Patent: May 15, 2007

(54) HYDROPHOBIZATION AND SILICA FOR SUPPORTED CATALYST

(75) Inventors: George Rodriguez, Houston, TX (US); Anthony N. Speca, Kingwood, TX (US); Matthew C. Kuchta, Houston, TX (US); David H. McConville, Houston, TX (US); Terry J. Burkhardt, Huntley, IL (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/758,726

(22) Filed: Jan. 16, 2004

(65) Prior Publication Data

US 2005/0159299 A1 Jul. 21, 2005

(51) Int. Cl.
B01J 31/00 (2006.01)
B05D 1/18 (2006.01)
B05D 3/06 (2006.01)
B32B 15/04 (2006.01)

(52) U.S. Cl. .................. 502/150; 502/155; 502/159; 502/172; 502/102; 427/443; 427/558; 428/457

(58) Field of Classification Search ............... 502/159, 502/150, 155, 172, 102, 103, 117; 427/443, 427/558; 428/457; 174/35
See application file for complete search history.

(56) References Cited

U.S. PATENT DOCUMENTS

| | | | | |
|---|---|---|---|---|
| 4,808,561 A | | 2/1989 | Welborn, Jr. ................. 502/104 |
| 5,324,698 A | | 6/1994 | Ala-Huikku et al. ......... 502/126 |
| 5,496,960 A | | 3/1996 | Piers et al. ..................... 556/8 |
| 5,643,847 A | | 7/1997 | Walzer, Jr. .................. 502/117 |
| 5,885,924 A | * | 3/1999 | Ward .......................... 502/402 |
| 5,939,347 A | * | 8/1999 | Ward et al. ................. 502/104 |
| 5,972,823 A | * | 10/1999 | Walzer, Jr. .................. 502/152 |
| 6,060,633 A | * | 5/2000 | Chen et al. ................. 585/475 |
| 6,211,311 B1 | * | 4/2001 | Wang et al. ................. 526/131 |
| 6,262,202 B1 | | 7/2001 | Walzer, Jr. et al. ......... 526/133 |
| 6,265,505 B1 | * | 7/2001 | McConville et al. ....... 526/161 |
| 6,329,313 B1 | * | 12/2001 | Fritze et al. ................ 502/202 |
| 6,355,594 B1 | | 3/2002 | McDaniel et al. .......... 502/152 |
| 6,368,999 B1 | | 4/2002 | Speca .......................... 502/402 |
| 6,388,017 B1 | | 5/2002 | McDaniel et al. .......... 525/240 |
| 6,395,666 B1 | | 5/2002 | McDaniel et al. ............ 502/87 |
| 6,403,732 B2 | | 6/2002 | Marks et al. ............... 526/134 |

(Continued)

FOREIGN PATENT DOCUMENTS

WO  WO 9109882 A1 * 7/1991

(Continued)

OTHER PUBLICATIONS

Zhuravlev, "Concentration of Hydroxyl Groups on the Surface of Amorphous Silicas", Langmuir, 1987, 3, 316-318.*
Tian et al., "Borane-functionalized oxide supports: development of active supported metallocene catalysts at low aluminoxane loading", Journal of Molecular Catalysis. A, Chemical, Elsevier, Amsterdam, NL, 144, 1999, 137-150.

(Continued)

Primary Examiner—J. A. Lorengo
Assistant Examiner—Patricia L. Hailey
(74) Attorney, Agent, or Firm—Catherine L. Bell

(57) ABSTRACT

This invention relates to a catalyst support comprising the result of the combination of:
(a) a support comprising hydroxyl groups;
(b) a capping agent comprising a boron containing Lewis acid; and
(c) an ionic activator, wherein at least some of the capping agent does not form a support bound activator.

58 Claims, 5 Drawing Sheets

U.S. PATENT DOCUMENTS

| | | | |
|---|---|---|---|
| 6,426,313 B2 | 7/2002 | Walzer, Jr. et al. | 502/103 |
| 6,432,863 B2 * | 8/2002 | Ward | 502/152 |
| 6,524,988 B2 * | 2/2003 | Speca | 502/152 |
| 6,525,988 B2 | 2/2003 | Ryu et al. | 365/223 |
| 6,552,137 B1 | 4/2003 | Kao et al. | 526/133 |
| 6,555,495 B2 | 4/2003 | Peterson et al. | 502/104 |
| 6,632,770 B2 * | 10/2003 | Holtcamp | 502/158 |
| 6,645,370 B2 * | 11/2003 | Verduijn et al. | 208/120.01 |
| 6,646,067 B2 * | 11/2003 | Lewtas et al. | 526/89 |
| 6,664,348 B2 * | 12/2003 | Speca | 526/133 |
| 6,667,272 B2 * | 12/2003 | Speca | 502/402 |
| 6,780,946 B2 * | 8/2004 | Saudemont et al. | 526/129 |
| 6,846,770 B2 * | 1/2005 | Speca | 502/104 |
| 6,867,267 B2 * | 3/2005 | Lewtas et al. | 526/69 |
| 2001/0031695 A1 | 10/2001 | Loveday et al. | 502/117 |
| 2001/0041778 A1 | 11/2001 | McConville et al. | 526/135 |
| 2002/0082367 A1 | 6/2002 | McConville et al. | 526/119 |
| 2003/0008980 A1 | 1/2003 | Mawson et al. | 526/61 |

FOREIGN PATENT DOCUMENTS

| | | |
|---|---|---|
| WO | WO 9403506 A1 * | 2/1994 |
| WO | WO 9719959 A1 * | 6/1997 |
| WO | WO 00/04059 | 1/2000 |
| WO | WO 00/13792 | 3/2000 |
| WO | WO 00/40623 | 7/2000 |
| WO | WO 01/41920 | 6/2001 |
| WO | WO 01/44308 | 6/2001 |
| WO | WO 01/44309 | 6/2001 |
| WO | WO 01/58587 | 8/2001 |
| WO | WO 02/16455 | 2/2002 |
| WO | WO 02/16480 | 2/2002 |
| WO | WO 02/16681 | 2/2002 |

OTHER PUBLICATIONS

Coevoet et al., "U.V./Visible Spectroscopic Study of the rac-Et(Ind)2ZrC12/MAO Olefin Polymerization Catalytic System, 1 Investigation in Toluene" Macromol. Chem. Phys. vol. 199, pp. 1451-1457 (1998).

Coevoet et al., "U.V./Visible Spectroscopic Study of the rac-Et(Ind)2ZrC12/MAO Olefin Polymerization Catalytic System, 2a Investigation in CH2CL2", Macromol. Chem. Phys., vol. 199, pp. 1459-1464 (1998).

Pedeutour et al., "Activation of iPr(CpFluo)ZrC12 by Methylaluminoxane, 4a UV/visible Spectroscopic Study in Hydrocarbon and Chlorinated Media", Macromol. Chem. Phys. vol., 200, pp. 1215-1221 (1999).

U. Wieser et al., "UV-VIS Studies on the Activation of Zirconocene-Based Olefin-Polymerization Catalysts", in Organometallic Catalysts and Olefin Polymerization, Springer-Verlag Berlin Heidelberg, NY, New York, pp. 3-13, (2001).

Diehl, S.C. et al., "Polystyrene-supported 2-arylindenyl zirconocene catalysts for propylene polymerization", Israel Journal of Chemistry, vol. 42, pp. 393-401 (2002).

Raimondi, M.E. et al., "A Spectroscopic Study of Group IV Transition Metal Incorporated Direct Templated Mesoporous Catalysts Part 1: A Comparison between Materials Synthesized Using Hydrophobic and Hydrophilic Ti Precursors", J. Phys. Chem. B, vol. 104, pp. 7102-7109 (2000).

Stork, M. et al., "Combinatorial Testing of supported catalysts for the heterogeneous polymerization of olefins", Angewandte Chemie, International Edition, 39 (23), pp. 4367-4369 (2000).

* cited by examiner

Reference F3/Silica

F3/Cab-O-Sil700DEAHD2, 23018p075#7

F3 solved in toluene added to Cab-O-Sil700 and let react for 2 hours, color of solid orange, liquid light yellow.

F3/SBLA/Silica

F3 on Silica SBLA in Toluene, 23018p084#3

F3: no lot#, Silica SBLA 23456-042

Comparative
F3/SBA/Silica

F3/SBA/SBLA/Silica

HYDROPHOBIZATION AND SILICA FOR SUPPORTED CATALYST

CROSS REFERENCE TO RELATED APPLICATIONS

This invention is related to concurrently filed U.S. Ser. No. 10/758,900, filed Jan. 16, 2004 which is incorporated by reference herein.

FIELD OF THE INVENTION

This invention relates to a catalyst support, a catalyst system using the support useful to polymerize olefins, and a process of polymerizing olefins.

BACKGROUND OF THE INVENTION

Polymerization catalyst systems offer opportunities for providing new processes and products to various markets including those which utilize olefin polymerization materials. Accordingly, supported olefin polymerization catalyst systems are of interest in making new olefin polymerization materials and products available.

Supported catalyst systems useful for olefin polymerization which may be interest include those comprising a metallocene, which are referred to herein as metallocene catalysts and metallocene catalyst systems. As used herein, metallocene catalyst systems may include the combination of a metallocene catalyst precursor and an activator, and may also include a support. Supports useful with metallocene catalyst systems preferably comprise porous materials, and may include both organic and inorganic components.

Inorganic components that may be useful within or as a catalyst support, such as silica and/or alumina, may comprise reactive functionalities. These reactive functionalities, for example hydroxyl groups (i.e., —OH) may also prove beneficial within the catalyst system. For example, a concentration of active —OH groups can provide for association of one or more catalyst system components with the support. However, excess hydroxyl groups present within or on the support (i.e., hydroxyl groups not involved in providing for association of a catalyst system component) may deactivate the catalyst system. As a result, excess hydroxyl groups of a support may reduce the overall activity of a supported catalyst system. Accordingly, it is desirable for a support to comprise a number of hydroxyl groups which allows for association of one or more catalyst system components, and in addition, to remove, reduce or render inactive a sufficient number of the hydroxyl groups on a catalyst support to provide for an improved catalyst system activity.

The deactivation of a catalyst system which may result from free hydroxyl groups on a support can be overcome in a number of ways. For example, the deactivation of a catalyst system may be overcome through the addition of more catalyst, by increasing the catalyst concentration in the catalyst system, and the like. These approaches, however may be undesirable due to a substantial increase in the cost of olefin polymerization.

Other methods to overcome the deactivation of a catalyst system that result from free hydroxyl groups and other reactive functionalities present on a support, can include at least partially deactivating the support by removing and/or reducing the number of free hydroxyl groups present on the support. Such methods may include using thermal and/or chemical treatments directed towards removing and/or chemically binding with hydroxyl groups to thereby render free hydroxyl groups inactive.

Examples of thermal and/or chemical treatments directed towards deactivating, and/or reducing the activity of a catalyst supports (i.e., reducing the SiOH concentration on the support) include U.S. Pat. Nos. 6,525,988 and 6,368,999 to Speca, which are directed to deactivation of a silica catalyst support by calcining the silica in the presence of a fluorine source. The fluorided silica of Speca is reported to improve the support over silica supports that had been calcined without the fluoride source. It is also reported that the fluorided silica of Speca was an improvement over a support that had been calcined without fluoride, and had been subjected to chemical dehydration with hexamethyldisilazane. Other examples include WO2002/16455 and WO2002/216681, which are directed to isotactic polypropylene made using a metallocene catalyst system supported with fluorided silica. U.S. Pat. Nos. 6,355,594, 6,388,017, and 6,395,666 are directed to metallocene catalyst supported on fluorided silica, silica-alumina, and silica-titania, while WO2001/41920, WO2001/44308, WO2001/44309 and WO2001/58587 are directed to using fluorided silica-zirconia as a metallocene catalyst support.

Methods of deactivating a catalyst support using chemical means include U.S. Pat. No. 6,329,313 to Fritze et al., in which a silica catalyst support is deactivated by "chemical inertization" using alkylaluminum, -magnesium, -boron, or -lithium compounds such as a silyl chloride to render free hydroxyl groups inert. In one example, the support was dried at 200° C., and then treated with vinyltriethoxysilane prior to being contacted with an activator.

Other examples of chemical deactivation of supports include U.S. Pat. No. 5,324,698 to Ala-Huikku et al., which is directed chemically deactivating a silica support using triethylaluminum; WO2000/40623, directed to a metallocene catalyst on a support that has been passivated (i.e., deactivated) using Lewis acid alkylating agents such as trihydrocarbyl aluminum compounds, trihydrocarbylchlorosilane compounds, and trihydrocarbylalkoxysilane compounds; and U.S. Pat. Nos. 5,643,847, 5,972,823, 6,262,202, and 6,426,313 all of which include deactivation of silica by addition of the Lewis Acid (LA) activator in an amount in excess of the stoichiometric amount required to attach the catalyst to the support.

However, both chemical and thermal deactivation of a support material may fail to achieve a sufficient level of deactivation. Thus, there remains a need for a method to deactivate supports such that the support comprises hydroxyls at a concentration sufficient to associate components of a catalyst system (e.g., a number of hydroxyl groups sufficient to react with an activator), but which also have a concentration of free hydroxyl groups, if any, which do not detrimentally effect the overall catalyst system activity. Particularly, there remains a need for improved deactivation of silica based catalyst supports for use in metallocene catalyst systems, wherein the concentration of reactive functionalities present in or on the support are sufficiently reduced and/or deactivated thus providing for a supported metallocene catalyst system having an improved activity over that known in the art.

Other references of interest include:
1. U.S. Pat. No. 5,496,960 to Piers et al.
2. U.S. Pat. No. 6,265,505 to McConville et al.
3. U.S. Pat. No. 6,555,495 to Peterson et al.
4. U.S. Pat. No. 6,403,732 to Marks et al.
5. U.S. Pat. No. 4,808,561 to Welborn et al.
6. U.S. Pat. No. 6,552,137 to Kao et al.

7. U.S. Patent Application No. 20030008980 to Mawson et al.
8. U.S. Patent Application No. 20020082367 to McConville et al.
9. U.S. Patent Application No. 20010031695 to Loveday et al.
10. U.S. Patent Application No. 20010041778 to McConville et al.
11. PCT Patent Publication WO 00/13792 to Clark.

SUMMARY OF THE INVENTION

This invention relates to a catalyst support comprising the result of the combination of:
(a) a support comprising hydroxyl groups;
(b) a capping agent comprising a boron containing Lewis acid; and
(c) an ionic activator, wherein at least some of the capping agent does not form a support bound activator.

This invention further relates to a catalyst system comprising the above support, and activator and a catalyst compound (also referred to as a catalyst precursor, pre-catalyst or a catalyst), a process to produce the support and the catalyst system, and a process to oligomerize and/or polymerize unsaturated monomers using the catalyst system.

DETAILED DESCRIPTION OF THE INVENTION

Figure 1:
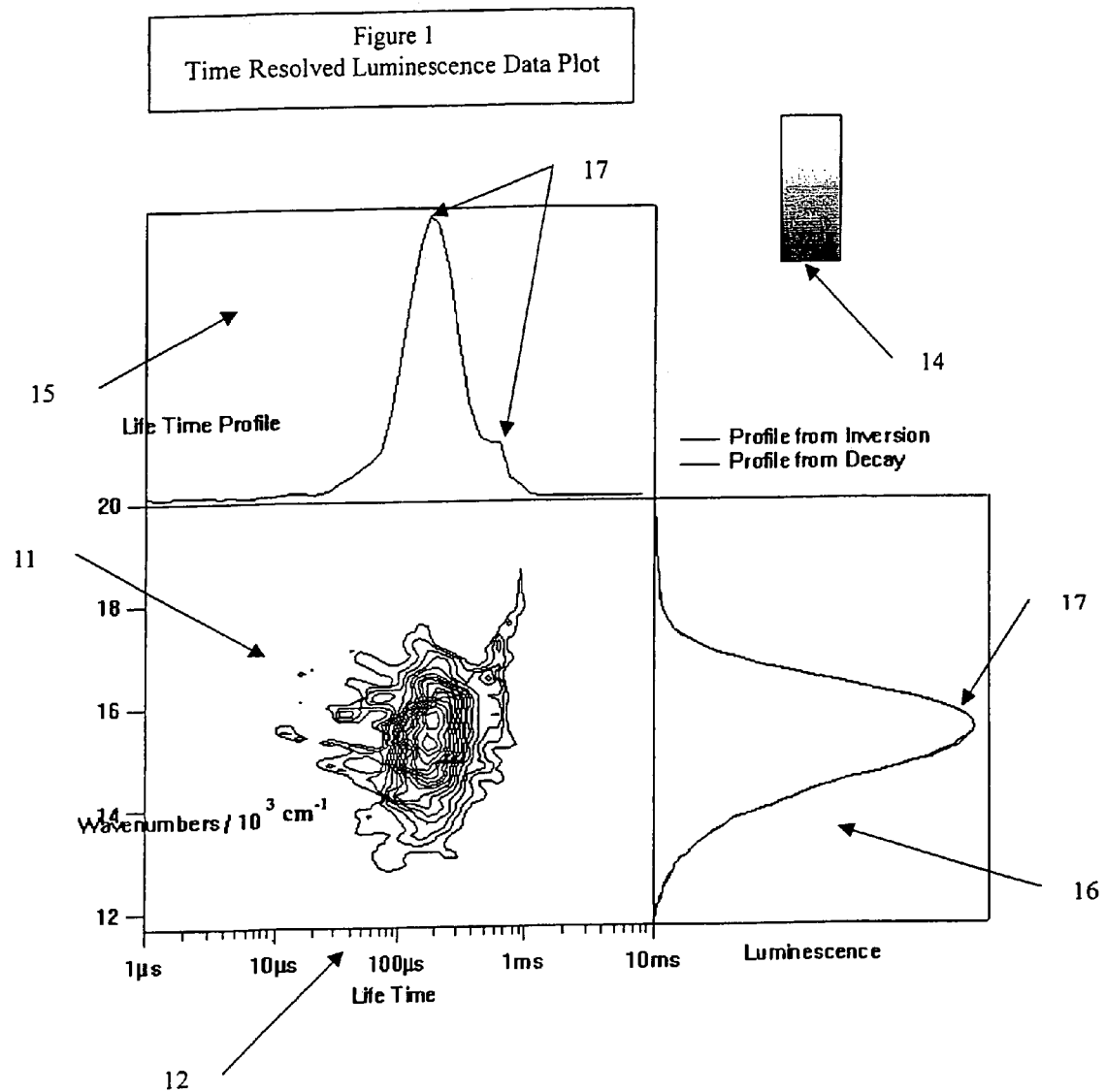
FIG. 1 shows a typical time resolved luminescence data plot, according to the present invention.

This invention relates to a new class of catalyst support compositions that may be combined with one or more activators and catalysts precursors to oligomerize or polymerize an unsaturated monomer. This invention further relates to a process for preparing oligomers and/or polymers of unsaturated monomers, such as polar monomers and or olefins comprising contacting a catalyst system with the monomers, and the polymers produced therefrom.

For the purposes of this invention and the claims thereto, when a polymer is referred to as comprising an olefin, the olefin present in the polymer is the polymerized form of the olefin. A support composition may include one or more base materials capable of providing physical support to another material. A support composition may also include various other materials in combination with the base material that provide various physical and chemical properties to that base material. Accordingly, a support composition may be interchangeably referred to herein as a support material or simply as a support.

As referred to herein, an activator may interchangeably be referred to a cocatalyst. The combination of a support and an activator may be referred to as a catalyst support. A catalyst precursor refers to material that becomes catalytically active in combination with an activator. Accordingly, a catalyst system, as used herein, refers to a combination of a catalyst precursor, an activator, and a support. A capping agent refers to a chemical reagent capable of reacting with, and/or deactivating a hydroxyl functional group located on and/or within a support.

The new numbering scheme for the Periodic Table Groups is used herein, and may be found in CHEMICAL AND ENGINEERING NEWS, 63(5), 27 (1985). Further, for purposes of this invention, Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, and a perfluoro radical is an organic radical having one or more available hydrogen atoms substituted with fluorine atoms.

Support Materials

Preferably the support material is a porous solid having a chemically significant amount of hydroxyl functionality. A porous material is a material that adsorbs at least about 1 gram of argon, nitrogen, n-hexane, cyclohexane, or benzene per 100 grams of the material. A support having a chemically significant amount of hydroxyl functionality is a support which has a sufficient hydroxyls concentration so as to allow for association of an amount of activator and/or catalyst to the support, which is sufficient to polymerize an olefin under polymerization conditions.

Preferred support materials include inorganic oxides comprising Group 2, 3, 4, 5, 13 or 14 metal oxides. Particularly preferred supports include silica, fumed silica, modified alumina (WO 99/60033), silica-alumina, and mixtures comprising silica. Inorganic oxides preferably including silica capable of retaining a concentration of hydroxyl groups after dehydration and/or deactivation treatment methods to be suitable for use in accordance with the present invention. Silica may be readily available and may have a relatively low cost. Accordingly, silica and silica containing metal oxide based supports, for example, silica-alumina, are preferred. Silica may be in the form of a powder, particles, gels, extrudates, and/or beads comprising silica may be used.

Preferred metal oxide compositions may additionally contain oxides of other metals, such as those comprising Al, K, Mg, Na, Ti and Zr. Metal oxides used herein are preferably treated by thermal and/or chemical means to remove water and free oxygen. Treatments may include applying vacuum in a heated oven, being heated in a fluidized bed and/or being contacted (chemically treated) with one or more dehydrating, deactivating, and/or capping agents such as organosilanes, siloxanes, alkyl aluminum compounds, and the like. Preferably, the level of treatment may be such that as much retained moisture and oxygen as is possible is removed, but that a chemically significant amount of hydroxyl functionality is retained by the support.

Silica may also be combined with other support materials including magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187), and the like. Additional support materials may include organic materials such as porous acrylic polymers as described in EP 0 767 184 B1, which is incorporated herein by reference. Other support materials can include nanocomposites as described in PCT WO 99/47598, aerogels as described in WO 99/48605, spherulites as described in U.S. Pat. No. 5,972,510 and polymeric beads as described in WO 99/50311, all of which are herein incorporated by reference.

The support may also comprise a frangible, spray dried agglomerate of silica gel, which possess a controlled morphology of microspheroidal shape, rough scabrous appearance, and interstitial void spaces that penetrate the agglomerate surface and are of substantially uniform size and distribution, such as those described in WO 97/48743. Such agglomerates may possess a 1 to 250 micron particle size, and a 1 to 1000 $m^2/g$ surface area. Agglomerates may be derived from a mixture of dry milled inorganic oxide particles, e.g., silica gel and optionally but preferably wet milled inorganic oxide particles, e.g., silica gel particles slurried in water for spray drying.

The support may also comprise a mixture of particles of bound clay with one or more ingredients including silica as an inorganic binder. Preferably, such particles are formed by spray drying such that porosity is introduced into the bodies during their assembly, and results primarily from spaces between the starting particles. See for example U.S. Pat. Nos. 5,395,808 5,569,634; 5,403,799; and 5,403,809; and EP 92/490 226.

The support may also comprise undehydrated silica as disclosed in U.S. Pat. No. 5,238,892. Further, the support may include clay, clay minerals, ion exchanging layered compounds, diatomaceous earth, silicates and zeolites, subjected to chemical treatment, which utilizes ion exchangeability to substitute interlaminar exchangeable ions of the clay with other large bulky ions to obtain a layered substance having the interlaminar distance enlarged. Preferably, the bulky ions play the role of pillars, supporting the layered structure, (and are therefore referred to herein as pillars). Preferred guest compounds include cationic inorganic compounds derived from titanium tetrachloride, zirconium tetrachloride, and $SiO_2$. See for example U.S. Pat. No. 5,308,811.

Other forms of supports suitable for use herein include those comprising a clay mineral modified with a compound capable of introducing a cation into the layer interspaces of the clay mineral. Suitable cations which may be inserted into the clay include those having a proton, namely, Bronsted acids such trimethylammonium, as well as carbonium ions, oxonium ions, and sulfonium ions. Representative anions include chlorine ion, bromide ion, and iodide ion. See for example U.S. Pat. No. 5,830,820.

Dried solid compositions comprising clay particles and inorganic metal oxide particles substantially segregated from the clay particles may also be used. Preferably, the metal oxide particles are sol particles, which tend to fuse upon sintering. Consequently, by segregating the sol particles with smectite-type clay particles, fusion of the sol particles is reduced under sintering conditions thereby preventing a loss of surface area. The preferred metal oxide is colloidal silica having an average particle size between 40 and 800 angstroms (0.004 and 0.08 microns), preferably 40 and 80 angstroms. The ratio of the metal oxide to clay is preferably between about 1:1 to 20:1, preferably 4:1 to 10:1. The end product is preferably described as a sol particle-clay composite in which the clay platelets inhibit aggregation of the sol particles. Such products are preferably made up entirely of irregular sol-clay networks in which the clay platelets are placed between the sol particles. See for example U.S. Pat. No. 4,981,825.

Still other suitable supports include fibrous clays and precalcined oxides prepared by forming a fluid suspension of the clay with the precalcined oxide particles, agitating the suspension to form a co-dispersion, and shaping and drying the co-dispersion. Suitable fibrous clays include aluminosilicates, magnesium silicates, and aluminomagnesium silicates. Examples of suitable fibrous clays are attapulgite, playgorskite, sepiolite, haloysite, endellite, chrysotile asbestos, and imogolite. Suitable oxides include silica. The ratio of fibrous clay to precalcined oxide may vary from 20:1 to 1:5 by weight. See for example U.S. Pat. No. 4,375,406. The support may also comprise agglomerate composite particles of an inorganic oxide, preferably silica, and an ion exchanging layered compound such as clay, as described in U.S. Pat. No. 6,559,090.

It is preferred that the support material have a surface area of about 10 to about 1000 $m^2/g$, as determined by nitrogen porosimetry using the B.E.T. method. Within this range, a surface area of less than or equal to about 700 $m^2/g$ can be employed, with less than or equal to about 500 $m^2/g$ preferred, and less than or equal to about 400 $m^2/g$ more preferred. Also preferred within this range is a surface area of greater than or equal to about 50 $m^2/g$, with greater than or equal to about 100 $m^2/g$ more preferred, and greater than or equal to about 300 $m^2/g$ especially preferred.

The pore volume of the support, as determined by nitrogen adsorption, is preferably in the range of from about 0.1 to about 4.0 cc/g. Within this range, a pore volume of less than or equal to about 3.5 cc/g can be employed, with less than or equal to about 3 cc/g preferred. Also preferred within this range is a pore volume of greater than or equal to about 0.5 cc/g, with greater than or equal to about 0.8 cc/g more preferred.

The average particle size of the support is preferably in the range of from about 0.1 to about 500 micrometers. Within this range, an average particle size of less than or equal to about 200 micrometers can be employed, with less than or equal to about 100 micrometers preferred. Also preferred within this range is an average particle size of greater than or equal to about 1 micrometer, with greater than or equal to about 5 micrometers more preferred.

It is preferred that the inorganic solid having hydroxyl groups on the surface thereof to be used in the present invention does not contain water such as adsorbed water. Accordingly, the support material may be subjected to a heat treatment and/or chemical treatment to reduce the water content or the hydroxyl content of the support material. Water contained in the inorganic solid can be removed therefrom by heating, preferably in a nitrogen atmosphere and/or under reduced pressure, at 250° C. or higher for 1 hour or more. However, the presence of water in the support materials does not preclude the use of the support materials in the present invention.

In a preferred embodiment, the support may be calcined by heating in an inert atmosphere at a temperature, and for a period of time sufficient to reduce the number of hydroxyl groups. Such treatment may be under vacuum in a heated oven, in a heated fluidized bed, or the like. The level of treatment (i.e., the temperature, time, pressure, and the like) preferably allows as much retained moisture and oxygen as is possible to be removed from the support while retaining a chemically significant amount of hydroxyl functionality within or on the support. Thus, calcining at up to a point prior to decomposition of the support material, for several hours, may be permissible. If higher loading of supported anionic activator is desired, lower calcining temperatures for lesser times may be suitable.

Where the metal oxide is silica, loadings of about 0.1 mmol to about 3.0 mmol activator/g $SiO_2$ may be suitable, and can preferably be achieved, for example, by varying the temperature of calcining from about 200° C. to about 800° C. See, for example, Zhuralev, et al, Langmuir 1987, vol. 3, 316 where correlation between calcining temperature and times and hydroxyl contents of silicas of varying surface areas is described.

The calcining temperature of the support is preferably about 200° C. to about 1000° C. Within this range, a calcining temperature of less than or equal to about 800° C. can be employed, with less than or equal to about 700° C. preferred. Also preferred within this range is a calcining temperature of greater than or equal to about 300° C., with greater than or equal to about 400° C. more preferred. The support may be calcined at ambient pressure, at a pressure greater than ambient pressure, or at a pressure less than ambient pressure. In addition, the support may be calcined in an inert atmosphere, in a reducing atmosphere, and/or in an oxidizing atmosphere. The support may also be calcined in the presence of a fluorine source as described in U.S. Pat. Nos. 6,525,988 and 6,368,999 to Speca, which are incorporated by reference herein. The fluorine source may comprise a fluoride-containing compound, preferably an inorganic fluoride-containing compound such as a fluoride salt as described in U.S. Pat. No. 6,524,988. The fluorine source is preferably an inorganic fluoride salt such as NaF, $CaF_2$, and the like.

For a support comprising silica, the calcining time is preferably about 0.5 hours to about 24 hours, depending on the temperature program used to calcine, the atmosphere in which the support is calcined, the pressure or pressures the support is being calcined at, and the composition of the support itself. Within this range, a calcining time of less than or equal to about 12 hours can be employed, with less than or equal to about 10 hours preferred, and less than or equal to about 8 hours more preferred. Also preferred within this range is a calcining time of greater than or equal to about 2 hours, with greater than or equal to about 4 hours more preferred, and greater than or equal to about 6 hours especially preferred.

Tailoring of hydroxyl groups available as attachment sites on the support can be accomplished by the treatment of the support with a chemical dehydrating and/or deactivation agent, also referred to herein as a capping agent. This chemical treatment of the support (i.e., capping of the support) is preferably conducted after calcination of the support.

In a preferred embodiment, a capping agent suitable for use herein may not be substantially involved in forming a covalently bound activator, also referred to herein as a support bound activator or SBA. Without wishing to be bound by theory, it is believed that the capping agent replaces or otherwise inactivates the hydrogen on the SiOH functional group by bonding to the oxygen, thus forming an otherwise inert cap on the silanol group of the substrate At least a portion of the support bound capping agent preferably does not combine with a catalyst precursor to activate a catalyst precursor to produce a catalyst system. Accordingly, by not forming a catalytically active site, a preferred capping agent is not involved in polymerization. In still a more preferred embodiment, essentially all of the capping agent, in combination with the support, does not form a support bound activator in the presence of a catalyst precursor. Also preferably, essentially all of the capping agent in combination with the support, does not form a support bound activator in the presence of a catalyst precursor and in the presence of an activator, more preferably in the presence of an ionic activator as described herein.

After thermal and/or chemical treatment to reduce the number of available hydroxyl groups on the support, the support material preferably comprises a hydroxyl concentration (free hydroxyl concentration) from about 0.001 millimoles per gram support (mmol/g-support) to about 10 mmol/g-support. Within this range, a hydroxyl content of less than or equal to about 5 mmol/g-support can be employed, with less than or equal to about 2 mmol/g-support preferred. Also preferred within this range is a hydroxyl content of greater than or equal to about 0.05 mmol/g-support, with greater than or equal to about 0.1 mmol/g-support more preferred.

The total hydroxyl content of the support can be determined by various techniques known to those of skill in the art. Such techniques may include solid state NMR, infrared spectroscopy, and/or wet chemical techniques. For example, the concentration of free hydroxide on a support may be determined by adding a molar excess of a dialkyl magnesium to a slurry of the solid support, and then determining the amount of dialkyl magnesium remaining in solution via known techniques (e.g., via titration). This method is based on the reaction of:

S—OH+$MgR_2$→S—OMgR+RH, wherein S is the solid support.

The concentration of hydroxyl groups may also be determined via thermal methods. For example, a support may first be dried, preferably in a nitrogen gas flow at about 250° C. for about 10 hours and cooled to room temperature prior to determining the weight of the dried inorganic solid, taken as an initial weight represented by "W1" (unit: g). Next, the dried inorganic solid may be heated to about 1,000° C., allowed to cool to room temperature, and then again weighed (W2). The difference between the initial weight (W1) and the weight of the cooled inorganic solid after heating (W2) is then determined, represented by $\Delta W$ (unit: g). The amount of the hydroxyl groups is calculated by the following formula:

Amount of the hydroxyl groups=(1,000×$\Delta W$/18.02)/ W1 mmol/g.

For purposes of this invention and the claims thereto, unless otherwise stated, when the concentration of hydroxyl groups is determined by the thermal method described immediately above.

In a preferred embodiment, the support comprises silica. Examples of preferred silica supports include, silica, fumed silica, silica-alumina, phyllosilicate, silica-alumina, silica-titania, and the like, described in greater detail below. Preferred silica supports include those with a pore size of 1 to 500 Å preferably 10 to 100 Å more preferably 25 to 50 Å. Preferred silica supports include those with an average particle size of 5 to 500 micrometers preferably 5 to 200 micrometers more preferably 1 to 100 micrometers. Preferred silica supports include those with a surface area of 10 to 1000 $m^2$/g preferably 50 to 500 $m^2$/g more preferably 100 to 400 $m^2$/g. Preferred silica supports include those with a pore volume of 0.1 to 4 cc/g preferably 0.5 to 3.5 cc/g more preferably 0.8 to 3 cc/g. Preferred silica supports include those with a pKa greater than or equal to about 11. Preferred silica supports after treatment to remove hydroxyls include those with a hydroxyl concentration of about 0.001 to 10 mmol/g, preferably 0.05 to 5 mmol/g more preferably 0.1 to 2 mmol/g.

In an embodiment, preferred silica supports include those with:

a pore size of 1 to 500 Å, preferably 10 to 100 Å, more preferably 25 to 50 Å; and/or an average particle size of 5 to 500 micrometers, preferably 5 to 200 micrometers, more preferably 1 to 100 micrometers; and/or a surface area of 10 to 1000 m$^2$/g, preferably 50 to 500 m$^2$/g, more preferably 100 to 400 m$^2$/g; and/or a pore volume of 0.1 to 4 cc/g, preferably 0.5 to 3.5 cc/g, more preferably 0.8 to 3 cc/g, and/or 0.001 to 10 mmol/g hydroxyl groups, preferably 0.05 to 5 mmol/g, more preferably 0.1 to 2 mmol/g; and/or a pKa of greater than or equal to about 11.

In yet another embodiment, preferred silica supports include those with a pore size of 1 to 500 Å, an average particle size of 5 to 500 micrometers, a surface area of 10 to 1000 m$^2$/g, a pore volume of 0.1 to 4 cc/g, 0.001 to 10 mmol/g hydroxyl groups, and a pKa of greater than or equal to 11.

In still another embodiment, preferred silica supports include those with a pore size of 10 to 200 Å, an average particle size of 5 to 200 micrometers, a surface area of 50 to 500 m$^2$/g, a pore volume of 0.5 to 3.5 cc/g, 0.05 to 5 mmol/g hydroxyl groups, and a pKa of greater than or equal to 11.

In another embodiment, the support preferably comprises a plurality of silica granules or particles comprising a plurality of pores arranged within the particle such that a surface of the pores defines an inner surface of the particle located internal to an outer surface of the particle (i.e., an inside and an outside). Accordingly, inside the support refers to the internal surface area of the support granule or particle and outside the support refers to the external surface of the support granule or particle. The total surface area refers to both the internal and external surface area of the support (both inside and outside the support).

After thermal and/or chemical treating of the support, it is preferred that the support comprises a plurality of particles, each particle having a plurality of pores arranged within the particle such that a surface of the pores defines an inner surface of the particle located internal to an outer surface of the particle. Preferably, wherein a concentration of Si—OH functional groups disposed on the inner surface of the particle is greater than a concentration of Si—OH functional groups disposed on the outer surface of the particle. In other words, the Si—OH functional groups are preferably disposed and/or located within the pores of the support, as compared to being located on the outer surface of the support particle. Accordingly, it is preferred that the hydroxyls be present in the same or a substantially higher concentration "inside" the support rather than "outside" the support.

In a preferred embodiment, substantially all of the hydroxyls are substantially evenly dispersed over the total surface area of the support. As used herein, substantially all of the hydroxyls refers to at least about 75%, preferably greater than 90% of the total number of hydroxyls present on or within the support. In this context, a substantially evenly disbursed concentration of hydroxyls refers to a situation where in any 25 square micrometer surface or greater contained on or within the support, the amount of hydroxyls present in that square area is within 10% of the amount of hydroxyls present in any other area of the same size. Since the surface of the calcined support over which the hydroxyls are located necessarily includes the internal surface of the support, i.e. the open-cell pores, as well as the external surface, the external surface is preferably smaller than the internal surface. Accordingly, since substantially all of the hydroxyls are substantially evenly dispersed in such a preferred embodiment, and since the inside surface area is larger than the outside surface area, if follows that in this preferred embodiment, the concentration of hydroxyls inside the support will be greater than the concentration of hydroxyls outside the support.

Hydroxyls may be non-accessible, by which is meant the hydroxyls may be present on the inside of the support such that they may not be accessible to various chemical and thermal treatments designed to remove hydroxyls. As such, non-accessible hydroxyl groups may not detrimentally affect the activity of a catalyst system. Accordingly, a preferred support comprises hydroxyl wherein all, or substantially all of the hydroxyls are located inside the pores of the support, rather than on the exterior surface if the support. More preferably, at least about 75%, preferably at least about 90% of the hydroxyls of the support are present inside the pores of the support as opposed to being located outside (i.e., on the external surface of) the support.

The location of hydroxyls may also be inferred from Attenuated Total Reflectance Infrared Spectroscopy (ATRIR), X-ray Photoelectron Spectroscopy (XPS), as well as being directly measured by Secondary Ion Mass Spectroscopy (SIMS), all of which are well known to those skilled in the respective arts.

In one embodiment, a determination of the amount of hydroxyls disposed on the external surface and the internal surface of the support may be determined according to the ratios of a component of the hydroxyls to an element in the support, (hereafter "support element") such as silicon.

In an example, the hydroxyl to support element ratio may be determined by X-ray Photoelectron Spectroscopy (XPS) normalizing to hydrogen and metals. For example, the hydroxyl to silicon ratio could be measured by XPS for a support comprising silica, and then the support may be crushed, pulverized or otherwise masticated and the hydroxyl to silicon ratio again determined. (The word "crushed" refers to a finely ground solid, such as one that has been ground by mortar and pestal to a fine powder). The ratio of the noncrushed (OH:Si) to crushed (OH:Si) may then directly correlates to the ratio of hydroxyls to silicon outside the support particles over the hydroxyl to silicon ratio inside the support particles.

By way of a hypothetical example, if the XPS data show the concentration of silicon to be 25% and the concentration of hydroxyl to be 0.01% in a first sample that is not crushed, the ratio of hydroxyl to silicon in that sample is 0.01 divided by 25, which is 0.0004. When the sample is crushed, if the XPS would show 20% silicon and 0.02% hydroxyl, the hydroxyl to silicon ratio in the crushed sample is 0.02 divided by 20, which is 0.001. In this example, the ratio of hydroxyl outside to hydroxyl inside is then determined by dividing 0.0004 by 0.001 come up with a final ratio of 0.4:1.0. For the purposes of this invention it is assumed that the hydroxyl measured in the crushed samples that is from the "external" surface of the support is negligible when included in the total hydroxyl present. Similar data can be generated by other analytical methods known in the art, for the support materials, and is preferably analyzed in the same manner as the silica example above.

Preferably, the ratio of hydroxyl to support element outside to hydroxyl to support element inside should be about 2.0:1 or less, more preferably about 1.5:1 or less, even more preferably about 1.0:1.0, still more preferred is a ratio of 0.5:1.0 or less.

Accordingly, in a preferred support, the pores of the support are arranged within the support such that a surface of the pores define an inner surface of the support located internal to an outer surface of the support, and an amount of the hydroxyls on the inner surface of the support is greater than an amount of the hydroxyls on the outer surface of the support, as determined by comparing the hydroxyl concentration on essentially the surface of the support, with the total hydroxyl concentration of an amount of the support (e.g., the total hydroxyl concentration of an amount of the support which has been crushed).

As discussed above, types of silica suitable for use herein include hydrophilic fumed silica, precipitated silica, colloidal silica, and the like. The silica particles may be powders, granular, spherical, agglomerated, fumed, and/or in other forms. Commercially available silicas that are useful in this invention include those available from Grace Davison (division of W.R. Grace & Co.) under the trade names SYLOID®, SYLOX®DARACLAR®, SYLODENT, TriSyl® SYLOJET®, in particular designations including SD 3216.30, SP-9-10046, Davison Syloid 245, Davison 948 and Davison 952, and the like; Ludox® -HS, -HS40, -HS30, -HS, -TM, -SM, -AM, -AS, -LS, -CL, -CL-X, -SK, -TMA, and the like.

From Degussa AG under the designations: Acematt® HK 125, HK 400, HK 450, HK 460, OK 412, OK 412 LC, OK 500, OK 520, OK 607, TS 100, and the like;

Aerosil 130, 150, 150 V, 200, 200 Pharma, 200 VV Pharma, 300, 380, 90, OX 50, R 104, R 106, R 202, R 711, R 711 VV60, R 7200, R 805, R 805 VV6, R 812, R 812 S, R 812 S VV60, R 812 VV60, R 816, R 816 VV60, R 8200, R 972, R 974, TT 600, and the like; Aerocat®, Aerolyst 350®, Cofill 11, 11-GR, and the like;

Coupsil® 6109, 8113, 8113 GR, and the like;

DYNASYLAN® BH-O, BHN, and the like;

E 39H, EJK 3017, H 10126, H 1044, H 1201; H 1235, and the like;

Sident® 10, 22 S, 8, and the like;

Silicon tetrachloride;

Sipernat® 22 LS, 22 S, 2200, 310, 320, 320 DS, 325 C, 35, 350, 360, 383 DS, 50, 50 S, 500 LS, 570, 700, C 600, C 630, D 10, D 11, D 13, D17, and the like;

Ultrasil® 360, 7000 GR, 7005, 880, VN 2, VN 2 GR, VN 3, VN 3 GR, and the like;

VP Coupsil® 6411, 6508, 8108, and the like;

VP SI 203, VP Si 208, and the like;

From Crossfield under the designation ES 70X, and the like, among others.

A preferred fumed silica is available under the trade name Cabosil TS500, TS530, TS610, TS700, TS720, LM90, LM130, LM 150, M5, M7d, PTG, MS55, H5, HS-5, EH5, available from Cabot Corporation. Preferably, fumed silica has particles 7 to 30 nanometers in size, and may be treated with dimethylsilyldichloride and the like such that a majority of the surface hydroxyl groups are capped.

The support may also include other reactive functional groups including primary alkyl amines, secondary alkyl amines, and the like, preferably where the groups are structurally incorporated in a polymeric chain and capable of an acid-base reaction with a Lewis acid. See, for example, the functional group containing polymers of U.S. Pat. No. 5,288,677.

Capping Agents

Capping agents suitable for use herein preferably comprise a single ligand reactive with the silanol groups. Examples include halogenated silanes such as $(CH_3)_3SiCl$, alkyl aluminum compounds of the general formula $R_3Al$, wherein R is a hydrocarbon radical, phenylsilane $((C_6H_5)_nSiH_{(4-n)}$, n=1, 2, or 3), hexamethyldisilazane $((Me_3Si)_2NH)$, tetramethyldisilazane $((Me_2HSi)_2NH)$, and combinations comprising at least one of the foregoing. Difunctional coupling agents (e.g., $(CH_3)_2SiCl_2$) may be employed to cap hydrogen-bonded pairs of silanol groups, which are present under the less severe calcining conditions. See, e.g., "Investigation of Quantitative SiOH Determination by the Silane Treatment of Disperse Silica", Gotski, et al, Journ. of Colloid and Interface Science, Vol. 126, No. 2, December 1988, for discussion of the effect of silane coupling agents for silica polymeric fillers that will also be effective for modification of silanol groups on the catalyst supports disclosed herein.

Boron Containing Lewis Acid

The support, preferably after calcination, is capped by being combined with a boron-containing Lewis acid, which may preferably form a support bound Lewis acid (SBLA). Preferred boron-containing Lewis acid capping agents for use herein include bis-substituted boranes having the general formula:

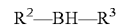

$$R^2\text{—}BH\text{—}R^3$$

wherein $R^2$ and $R^3$ are independently at each occurrence an identical or different substituent including $C_1$–$C_{40}$ carbon-containing group, such as a $C_1$–$C_{40}$-alkylene, $C_1$–$C_{40}$-haloalkylene, $C_6$–$C_{40}$-arylene, $C_6$–$C_{40}$-haloarylene, $C_7$–$C_{40}$-arylalkylene or $C_7$–$C_{40}$-halo-arylalkylene, $C_2$–$C_{40}$-alkynylene, $C_2$–$C_{40}$-haloalkynylene, $C_2$–$C_{40}$-alkenylene, $C_2$–$C_{40}$-haloalkenylene, $C_1$–$C_{40}$-aryleneoxy, $C_1$–$C_{40}$-alkylaryleneoxy or $C_1$–$C_{40}$-arylalkyleneoxy group, —NR"—, —PR"—, —P(O)R"—, —Si(R")$_2$—O—Si(R")$_2$—, —C—O—SiR"$_2$— or —CONR"—, where R" is a $C_1$–$C_{40}$ carbon-containing group, such as a $C_1$–$C_{40}$ alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-halo-arylalkyl, $C_2$–$C_{40}$-alkynyl, $C_2$–$C_{40}$-haloalkynyl, $C_2$–$C_{40}$ alkenyl, $C_2$–$C_{40}$-haloalkenyl, $C_1$–$C_{40}$-aryloxy, $C_1$–$C_{40}$-alkylaryloxy or $C_1$–$C_{40}$-arylalkyloxy group. Preferred Lewis acid substituents include perfluoroaryl groups, with bis(perfluorophenyl) borane (i.e., $(C_6F_5)_2BH$) being most preferred.

More preferred boron-containing Lewis acid capping agents for use herein include Lewis acidic bisaryl boron compounds having the general formula:

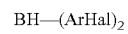

$$BH\text{—}(ArHal)_2$$

wherein each ArHal is a halogenated $C_6$ aromatic or higher carbon number polycyclic aromatic hydrocarbon or aromatic ring assembly in which two or more rings (or fused ring systems) are joined directly to one another or together. Examples include phenyl, napthyl, anthracenyl radicals wherein at least one, preferably all of the fused ring hydrogen atoms are replaced with halogen, more preferably wherein preferably all of the fused ring hydrogen atoms are replaced with fluorine. Accordingly, ArHal may include partially aromatic and partially cycloaliphatic (e.g., as in tetrahydronapthyl, acenapthyl, indenyl, and/or fluorenyl), preferably wherein each group comprises a pentafluorophenyl group.

Preferred Lewis acids comprising boron include:
bis(perfluorophenyl)borane
bis(nonafluoroanthracenyl)borane
(nonafluoroanthracenyl)(pentafluorophenyl) borane
bis(undecafluorotetrahydronaphthyl)borane
(undecafluorotetrahydronaphthyl)(pentafluorophenyl) borane
(undecafluorotetrahydronaphthyl)(nonafluoroanthracenyl) borane
bis(nonafluorofluorenyl)borane
(nonafluorofluorenyl)(pentafluorophenyl) borane (nonafluorofluorenyl)(nonafluoroanthracenyl)borane
(nonafluorofluorenyl)(undecafluorotetrahydronaphthyl)borane
bis(2,3,4,6-tetrafluorophenyl)borane,
bis(2,3,5,6-tetrafluorophenyl)borane,
bis(2,3,5-trifluorophenyl)borane,
bis(2,4,6-trifluorophenyl)borane,
bis(1,3-difluorophenyl)borane,
bis(2,3,5,6-tetrafluoro-4-methylphenyl)borane,
bis(2,3,4,6-tetrafluoro-5-methylphenyl)borane,
bis(2,4,5-trifluoro-6-methylphenyl)borane,
bis(2,3,6-trifluoro-4-methylphenyl)borane,
bis(2,4,6-trifluoro-3-methylphenyl)borane,
bis(2,6-difluoro-3-methylphenyl)borane,
bis(2,4-difluoro-5-methylphenyl)borane,
bis(3,5-difluoro-2-methylphenyl)borane,
bis(4-methoxy-2,3,5,6-tetrafluorophenyl)borane,
bis(3-methoxy-2,4,5,6-tetrafluorophenyl)borane,
bis(2-methoxy-3,5,6-trifluorophenyl)borane,
bis(3-methoxy-2,5,6-trifluorophenyl)borane,
bis(3-methoxy-2,4,6-trifluorophenyl)borane,
bis(2-methoxy-3,5-difluorophenyl)borane,
bis(3-methoxy-2,6-difluorophenyl)borane,
bis(3-methoxy-4,6-difluorophenyl)borane,
bis(2-methoxy-4,6-difluorophenyl)borane,
bis(4-methoxy-2,6-difluorophenyl)borane,
(2,3,4,6-tetrafluorophenyl) (2,3,5,6-tetrafluorophenyl) borane,
(2,3,4,6-tetrafluorophenyl) (2,3,5-trifluorophenyl) borane,
(2,3,4,6-tetrafluorophenyl) (2,4,6-trifluorophenyl) borane
(2,3,4,6-tetrafluorophenyl) (1,3-difluorophenyl) borane,
(2,3,4,6-tetrafluorophenyl) (2,3,5,6-tetrafluoro-4-methylphenyl) borane,
(2,3,4,6-tetrafluorophenyl) (2,3,4,6-tetrafluoro-5-methylphenyl) borane,
(2,3,4,6-tetrafluorophenyl) (2,4,5-trifluoro-6-methylphenyl) borane,
(2,3,4,6-tetrafluorophenyl) (2,3,6-trifluoro-4-methylphenyl) borane,
(2,3,4,6-tetrafluorophenyl) (2,4,6-trifluoro-3-methylphenyl) borane,
(2,3,4,6-tetrafluorophenyl) (2,6-difluoro-3-methylphenyl) borane, (2,3,4,6-tetrafluorophenyl) (2,4-difluoro-5-methylphenyl) borane,
(2,3,4,6-tetrafluorophenyl) (3,5-difluoro-2-methylphenyl) borane,
(2,3,4,6-tetrafluorophenyl) (4-methoxy-2,3,5,6-tetrafluorophenyl) borane,
(2,3,4,6-tetrafluorophenyl) (3-methoxy-2,4,5,6-tetrafluorophenyl) borane,
(2,3,4,6-tetrafluorophenyl) (2-methoxy-3,5,6-trifluorophenyl) borane,
(2,3,4,6-tetrafluorophenyl) (3-methoxy-2,5,6-trifluorophenyl) borane,
(2,3,4,6-tetrafluorophenyl) (3-methoxy-2,4,6-trifluorophenyl) borane,
(2,3,4,6-tetrafluorophenyl) (2-methoxy-3,5-difluorophenyl) borane,
(2,3,4,6-tetrafluorophenyl) (3-methoxy-2,6-difluorophenyl) borane,
(2,3,4,6-tetrafluorophenyl) (3-methoxy-4,6-difluorophenyl) borane,
(2,3,4,6-tetrafluorophenyl) (2-methoxy-4,6-difluorophenyl) borane,
(2,3,4,6-tetrafluorophenyl) (4-methoxy-2,6-difluorophenyl) borane,
(2,3,5,6-tetrafluorophenyl) (2,3,5-trifluorophenyl) borane,
(2,3,5,6-tetrafluorophenyl) (2,4,6-trifluorophenyl) borane
(2,3,5,6-tetrafluorophenyl) (1,3-difluorophenyl) borane,
(2,3,5,6-tetrafluorophenyl) (2,3,5,6-tetrafluoro-4-methylphenyl) borane,
(2,3,5,6-tetrafluorophenyl) (2,3,4,6-tetrafluoro-5-methylphenyl) borane,
(2,3,5,6-tetrafluorophenyl) (2,4,5-trifluoro-6-methylphenyl) borane,
(2,3,5,6-tetrafluorophenyl) (2,3,6-trifluoro-4-methylphenyl) borane,
(2,3,5,6-tetrafluorophenyl) (2,4,6-trifluoro-3-methylphenyl) borane,
(2,3,5,6-tetrafluorophenyl) (2,6-difluoro-3-methylphenyl) borane,
(2,3,5,6-tetrafluorophenyl) (2,4-difluoro-5-methylphenyl) borane,
(2,3,5,6-tetrafluorophenyl) (3,5-difluoro-2-methylphenyl) borane,
(2,3,5,6-tetrafluorophenyl) (4-methoxy-2,3,5,6-tetrafluorophenyl) borane,
(2,3,5,6-tetrafluorophenyl) (3-methoxy-2,4,5,6-tetrafluorophenyl) borane,
(2,3,5,6-tetrafluorophenyl) (2-methoxy-3,5,6-trifluorophenyl) borane,
(2,3,5,6-tetrafluorophenyl) (3-methoxy-2,5,6-trifluorophenyl) borane,
(2,3,5,6-tetrafluorophenyl) (3-methoxy-2,4,6-trifluorophenyl) borane,
(2,3,5,6-tetrafluorophenyl) (2-methoxy-3,5-difluorophenyl) borane,
(2,3,5,6-tetrafluorophenyl) (3-methoxy-2,6-difluorophenyl) borane,
(2,3,5,6-tetrafluorophenyl) (3-methoxy-4,6-difluorophenyl) borane,
(2,3,5,6-tetrafluorophenyl) (2-methoxy-4,6-difluorophenyl) borane,
(2,3,5,6-tetrafluorophenyl) (4-methoxy-2,6-difluorophenyl) borane,
(2,3,5-trifluorophenyl) (2,4,6-trifluorophenyl) borane
(2,3,5-trifluorophenyl) (1,3-difluorophenyl) borane,
(2,3,5-trifluorophenyl) (2,3,5,6-tetrafluoro-4-methylphenyl) borane,
(2,3,5-trifluorophenyl) (2,3,4,6-tetrafluoro-5-methylphenyl) borane,
(2,3,5-trifluorophenyl) (2,4,5-trifluoro-6-methylphenyl) borane,
(2,3,5-trifluorophenyl) (2,3,6-trifluoro-4-methylphenyl) borane,
(2,3,5-trifluorophenyl) (2,4,6-trifluoro-3-methylphenyl) borane,
(2,3,5-trifluorophenyl) (2,6-difluoro-3-methylphenyl) borane,
(2,3,5-trifluorophenyl) (2,4-difluoro-5-methylphenyl) borane,
(2,3,5-trifluorophenyl) (3,5-difluoro-2-methylphenyl) borane,
(2,3,5-trifluorophenyl) (4-methoxy-2,3,5,6-tetrafluorophenyl) borane,
(2,3,5-trifluorophenyl) (3-methoxy-2,4,5,6-tetrafluorophenyl) borane,
(2,3,5-trifluorophenyl) (2-methoxy-3,5,6-trifluorophenyl) borane,
(2,3,5-trifluorophenyl) (3-methoxy-2,5,6-trifluorophenyl) borane,
(2,3,5-trifluorophenyl) (3-methoxy-2,4,6-trifluorophenyl) borane, (2,3,5-trifluorophenyl) (2-methoxy-3,5-difluorophenyl) borane,
(2,3,5-trifluorophenyl) (3-methoxy-2,6-difluorophenyl) borane,
(2,3,5-trifluorophenyl) (3-methoxy-4,6-difluorophenyl) borane,
(2,3,5-trifluorophenyl) (2-methoxy-4,6-difluorophenyl) borane,
(2,3,5-trifluorophenyl) (4-methoxy-2,6-difluorophenyl) borane,
(2,4,6-trifluorophenyl) (1,3-difluorophenyl) borane,
2,4,6-trifluorophenyl) (2,3,5,6-tetrafluoro-4-methylphenyl) borane,
(2,4,6-trifluorophenyl) (2,3,4,6-tetrafluoro-5-methylphenyl) borane,
(2,4,6-trifluorophenyl) (2,4,5-trifluoro-6-methylphenyl) borane,
(2,4,6-trifluorophenyl) (2,3,6-trifluoro-4-methylphenyl) borane,
(2,4,6-trifluorophenyl) (2,4,6-trifluoro-3-methylphenyl) borane,
(2,4,6-trifluorophenyl) (2,6-difluoro-3-methylphenyl) borane,
(2,4,6-trifluorophenyl) (2,4-difluoro-5-methylphenyl) borane,
(2,4,6-trifluorophenyl) (3,5-difluoro-2-methylphenyl) borane,
(2,4,6-trifluorophenyl) (4-methoxy-2,3,5,6-tetrafluorophenyl) borane,
(2,4,6-trifluorophenyl) (3-methoxy-2,4,5,6-tetrafluorophenyl) borane,
(2,4,6-trifluorophenyl) (2-methoxy-3,5,6-trifluorophenyl) borane,
(2,4,6-trifluorophenyl) (3-methoxy-2,5,6-trifluorophenyl) borane,
(2,4,6-trifluorophenyl) (3-methoxy-2,4,6-trifluorophenyl) borane,
(2,4,6-trifluorophenyl) (2-methoxy-3,5-difluorophenyl) borane,
(2,4,6-trifluorophenyl) (3-methoxy-2,6-difluorophenyl) borane,
(2,4,6-trifluorophenyl) (3-methoxy-4,6-difluorophenyl) borane,
(2,4,6-trifluorophenyl) (2-methoxy-4,6-difluorophenyl) borane,
(2,4,6-trifluorophenyl) (4-methoxy-2,6-difluorophenyl) borane,
(1,3-difluorophenyl)(2,3,5,6-tetrafluoro-4-methylphenyl) borane,
(1,3-difluorophenyl)(2,3,4,6-tetrafluoro-5-methylphenyl) borane,
(1,3-difluorophenyl)(2,4,5-trifluoro-6-methylphenyl) borane,
(1,3-difluorophenyl)(2,3,6-trifluoro-4-methylphenyl) borane,
(1,3-difluorophenyl)(2,4,6-trifluoro-3-methylphenyl) borane,
(1,3-difluorophenyl)(2,6-difluoro-3-methylphenyl) borane,
(1,3-difluorophenyl)(2,4-difluoro-5-methylphenyl) borane,
(1,3-difluorophenyl)(3,5-difluoro-2-methylphenyl) borane,
(1,3-difluorophenyl)(4-methoxy-2,3,5,6-tetrafluorophenyl) borane,
(1,3-difluorophenyl)(3-methoxy-2,4,5,6-tetrafluorophenyl) borane,
(1,3-difluorophenyl)(2-methoxy-3,5,6-trifluorophenyl) borane,
(1,3-difluorophenyl)(3-methoxy-2,5,6-trifluorophenyl) borane,
(1,3-difluorophenyl)(3-methoxy-2,4,6-trifluorophenyl) borane,
(1,3-difluorophenyl)(2-methoxy-3,5-difluorophenyl) borane,
(1,3-difluorophenyl)(3-methoxy-2,6-difluorophenyl) borane,
(1,3-difluorophenyl)(3-methoxy-4,6-difluorophenyl) borane,
(1,3-difluorophenyl)(2-methoxy-4,6-difluorophenyl) borane,
(1,3-difluorophenyl)(4-methoxy-2,6-difluorophenyl) borane,
(2,3,5,6-tetrafluoro-4-methylphenyl)(2,3,4,6-tetrafluoro-5-methylphenyl) borane,
(2,3,5,6-tetrafluoro-4-methylphenyl)(2,4,5-trifluoro-6-methylphenyl) borane,
(2,3,5,6-tetrafluoro-4-methylphenyl)(2,3,6-trifluoro-4-methylphenyl) borane,
(2,3,5,6-tetrafluoro-4-methylphenyl)(2,4,6-trifluoro-3-methylphenyl) borane,
(2,3,5,6-tetrafluoro-4-methylphenyl)(2,6-difluoro-3-methylphenyl) borane,
(2,3,5,6-tetrafluoro-4-methylphenyl)(2,4-difluoro-5-methylphenyl) borane,
(2,3,5,6-tetrafluoro-4-methylphenyl)(3,5-difluoro-2-methylphenyl) borane,
(2,3,5,6-tetrafluoro-4-methylphenyl)(4-methoxy-2,3,5,6-tetrafluorophenyl) borane,
(2,3,5,6-tetrafluoro-4-methylphenyl)(3-methoxy-2,4,5,6-tetrafluorophenyl) borane,
(2,3,5,6-tetrafluoro-4-methylphenyl)(2-methoxy-3,5,6-trifluorophenyl) borane,
(2,3,5,6-tetrafluoro-4-methylphenyl)(3-methoxy-2,5,6-trifluorophenyl) borane,
(2,3,5,6-tetrafluoro-4-methylphenyl)(3-methoxy-2,4,6-trifluorophenyl) borane,
(2,3,5,6-tetrafluoro-4-methylphenyl)(2-methoxy-3,5-difluorophenyl) borane,
(2,3,5,6-tetrafluoro-4-methylphenyl)(3-methoxy-2,6-difluorophenyl) borane,
(2,3,5,6-tetrafluoro-4-methylphenyl)(3-methoxy-4,6-difluorophenyl) borane,
(2,3,5,6-tetrafluoro-4-methylphenyl)(2-methoxy-4,6-difluorophenyl) borane,
(2,3,5,6-tetrafluoro-4-methylphenyl)(4-methoxy-2,6-difluorophenyl) borane,
(2,3,4,6-tetrafluoro-4-methylphenyl)(2,4,5-trifluoro-6-methylphenyl) borane,
(2,3,4,6-tetrafluoro-4-methylphenyl)(2,3,6-trifluoro-4-methylphenyl) borane,
(2,3,4,6-tetrafluoro-4-methylphenyl)(2,4,6-trifluoro-3-methylphenyl) borane,
(2,3,4,6-tetrafluoro-4-methylphenyl)(2,6-difluoro-3-methylphenyl) borane,
(2,3,4,6-tetrafluoro-4-methylphenyl)(2,4-difluoro-5-methylphenyl) borane,
(2,3,4,6-tetrafluoro-4-methylphenyl)(3,5-difluoro-2-methylphenyl) borane,
(2,3,4,6-tetrafluoro-4-methylphenyl)(4-methoxy-2,3,5,6-tetrafluorophenyl) borane,
(2,3,4,6-tetrafluoro-4-methylphenyl)(3-methoxy-2,4,5,6-tetrafluorophenyl) borane,
(2,3,4,6-tetrafluoro-4-methylphenyl)(2-methoxy-3,5,6-trifluorophenyl) borane, (2,3,4,6-tetrafluoro-4-methylphenyl)(3-methoxy-2,5,6-trifluorophenyl) borane,
(2,3,4,6-tetrafluoro-4-methylphenyl)(3-methoxy-2,4,6-trifluorophenyl) borane,
(2,3,4,6-tetrafluoro-4-methylphenyl)(2-methoxy-3,5-difluorophenyl) borane,
(2,3,4,6-tetrafluoro-4-methylphenyl)(3-methoxy-2,6-difluorophenyl) borane,
(2,3,4,6-tetrafluoro-4-methylphenyl)(3-methoxy-4,6-difluorophenyl) borane,
(2,3,4,6-tetrafluoro-4-methylphenyl)(2-methoxy-4,6-difluorophenyl) borane,
(2,3,4,6-tetrafluoro-4-methylphenyl)(4-methoxy-2,6-difluorophenyl) borane,
2,4,5-trifluoro-6-methylphenyl) (2,3,6-trifluoro-4-methylphenyl) borane,
(2,4,5-trifluoro-6-methylphenyl) (2,4,6-trifluoro-3-methylphenyl) borane,
(2,4,5-trifluoro-6-methylphenyl) (2,6-difluoro-3-methylphenyl) borane,
(2,4,5-trifluoro-6-methylphenyl) (2,4-difluoro-5-methylphenyl) borane,
(2,4,5-trifluoro-6-methylphenyl) (3,5-difluoro-2-methylphenyl) borane,
(2,4,5-trifluoro-6-methylphenyl) (4-methoxy-2,3,5,6-tetrafluorophenyl) borane,
(2,4,5-trifluoro-6-methylphenyl) (3-methoxy-2,4,5,6-tetrafluorophenyl) borane,
(2,4,5-trifluoro-6-methylphenyl) (2-methoxy-3,5,6-trifluorophenyl) borane,
(2,4,5-trifluoro-6-methylphenyl) (3-methoxy-2,5,6-trifluorophenyl) borane,
(2,4,5-trifluoro-6-methylphenyl) (3-methoxy-2,4,6-trifluorophenyl) borane,
(2,4,5-trifluoro-6-methylphenyl) (2-methoxy-3,5-difluorophenyl) borane,
(2,4,5-trifluoro-6-methylphenyl) (3-methoxy-2,6-difluorophenyl) borane,
(2,4,5-trifluoro-6-methylphenyl) (3-methoxy-4,6-difluorophenyl) borane,
(2,4,5-trifluoro-6-methylphenyl) (2-methoxy-4,6-difluorophenyl) borane,
(2,4,5-trifluoro-6-methylphenyl) (4-methoxy-2,6-difluorophenyl) borane,
2,3,6-trifluoro-4-methylphenyl)(2,4,6-trifluoro-3-methylphenyl) borane,
(2,3,6-trifluoro-4-methylphenyl)(2,6-difluoro-3-methylphenyl) borane,
(2,3,6-trifluoro-4-methylphenyl)(2,4-difluoro-5-methylphenyl) borane,
(2,3,6-trifluoro-4-methylphenyl)(3,5-difluoro-2-methylphenyl) borane,
(2,3,6-trifluoro-4-methylphenyl)(4-methoxy-2,3,5,6-tetrafluorophenyl) borane,
(2,3,6-trifluoro-4-methylphenyl)(3-methoxy-2,4,5,6-tetrafluorophenyl) borane,
(2,3,6-trifluoro-4-methylphenyl)(2-methoxy-3,5,6-trifluorophenyl) borane,
(2,3,6-trifluoro-4-methylphenyl)(3-methoxy-2,5,6-trifluorophenyl) borane,
(2,3,6-trifluoro-4-methylphenyl)(3-methoxy-2,4,6-trifluorophenyl) borane,
(2,3,6-trifluoro-4-methylphenyl)(2-methoxy-3,5-difluorophenyl) borane,
(2,3,6-trifluoro-4-methylphenyl)(3-methoxy-2,6-difluorophenyl) borane,
(2,3,6-trifluoro-4-methylphenyl)(3-methoxy-4,6-difluorophenyl) borane,
(2,3,6-trifluoro-4-methylphenyl)(2-methoxy-4,6-difluorophenyl) borane,
(2,3,6-trifluoro-4-methylphenyl)(4-methoxy-2,6-difluorophenyl) borane,
2,4,6-trifluoro-3-methylphenyl)(2,6-difluoro-3-methylphenyl) borane,
(2,4,6-trifluoro-3-methylphenyl)(2,4-difluoro-5-methylphenyl) borane,
(2,4,6-trifluoro-3-methylphenyl)(3,5-difluoro-2-methylphenyl) borane,
(2,4,6-trifluoro-3-methylphenyl)(4-methoxy-2,3,5,6-tetrafluorophenyl) borane,
(2,4,6-trifluoro-3-methylphenyl)(3-methoxy-2,4,5,6-tetrafluorophenyl) borane,
(2,4,6-trifluoro-3-methylphenyl)(2-methoxy-3,5,6-trifluorophenyl) borane,
(2,4,6-trifluoro-3-methylphenyl)(3-methoxy-2,5,6-trifluorophenyl) borane,
(2,4,6-trifluoro-3-methylphenyl)(3-methoxy-2,4,6-trifluorophenyl) borane,
(2,4,6-trifluoro-3-methylphenyl)(2-methoxy-3,5-difluorophenyl) borane,
(2,4,6-trifluoro-3-methylphenyl)(3-methoxy-2,6-difluorophenyl) borane,
(2,4,6-trifluoro-3-methylphenyl)(3-methoxy-4,6-difluorophenyl) borane,
(2,4,6-trifluoro-3-methylphenyl)(2-methoxy-4,6-difluorophenyl) borane,
(2,4,6-trifluoro-3-methylphenyl)(4-methoxy-2,6-difluorophenyl) borane,
(2,6-difluoro-3-methylphenyl) (2,4-difluoro-5-methylphenyl) borane,
2,6-difluoro-3-methylphenyl) (3,5-difluoro-2-methylphenyl) borane,
(2,6-difluoro-3-methylphenyl) (4-methoxy-2,3,5,6-tetrafluorophenyl) borane,
(2,6-difluoro-3-methylphenyl) (3-methoxy-2,4,5,6-tetrafluorophenyl) borane,
(2,6-difluoro-3-methylphenyl) (2-methoxy-3,5,6-trifluorophenyl) borane,
(2,6-difluoro-3-methylphenyl) (3-methoxy-2,5,6-trifluorophenyl) borane,
(2,6-difluoro-3-methylphenyl) (3-methoxy-2,4,6-trifluorophenyl) borane,
(2,6-difluoro-3-methylphenyl) (2-methoxy-3,5-difluorophenyl) borane,
(2,6-difluoro-3-methylphenyl) (3-methoxy-2,6-difluorophenyl) borane,
(2,6-difluoro-3-methylphenyl) (3-methoxy-4,6-difluorophenyl) borane,
(2,6-difluoro-3-methylphenyl) (2-methoxy-4,6-difluorophenyl) borane,
(2,6-difluoro-3-methylphenyl) (4-methoxy-2,6-difluorophenyl) borane,
2,4-difluoro-5-methylphenyl)(3,5-difluoro-2-methylphenyl) borane,
(2,4-difluoro-5-methylphenyl)(4-methoxy-2,3,5,6-tetrafluorophenyl) borane,
(2,4-difluoro-5-methylphenyl)(3-methoxy-2,4,5,6-tetrafluorophenyl) borane,
(2,4-difluoro-5-methylphenyl)(2-methoxy-3,5,6-trifluorophenyl) borane,
(2,4-difluoro-5-methylphenyl)(3-methoxy-2,5,6-trifluorophenyl) borane, (2,4-difluoro-5-methylphenyl)(3-methoxy-2,4,6-trifluorophenyl) borane,
(2,4-difluoro-5-methylphenyl)(2-methoxy-3,5-difluorophenyl) borane,
(2,4-difluoro-5-methylphenyl)(3-methoxy-2,6-difluorophenyl) borane,
(2,4-difluoro-5-methylphenyl)(3-methoxy-4,6-difluorophenyl) borane,
(2,4-difluoro-5-methylphenyl)(2-methoxy-4,6-difluorophenyl) borane,
(2,4-difluoro-5-methylphenyl)(4-methoxy-2,6-difluorophenyl) borane,
(3,5-difluoro-2-methylphenyl)(4-methoxy-2,3,5,6-tetrafluorophenyl) borane,
(3,5-difluoro-2-methylphenyl)(3-methoxy-2,4,5,6-tetrafluorophenyl) borane,
(3,5-difluoro-2-methylphenyl)(2-methoxy-3,5,6-trifluorophenyl) borane,
(3,5-difluoro-2-methylphenyl)(3-methoxy-2,5,6-trifluorophenyl) borane,
(3,5-difluoro-2-methylphenyl)(3-methoxy-2,4,6-trifluorophenyl) borane,
(3,5-difluoro-2-methylphenyl)(2-methoxy-3,5-difluorophenyl) borane,
(3,5-difluoro-2-methylphenyl)(3-methoxy-2,6-difluorophenyl) borane,
(3,5-difluoro-2-methylphenyl)(3-methoxy-4,6-difluorophenyl) borane,
(3,5-difluoro-2-methylphenyl)(2-methoxy-4,6-difluorophenyl) borane,
(3,5-difluoro-2-methylphenyl)(4-methoxy-2,6-difluorophenyl) borane,
(4-methoxy-2,3,5,6-tetrafluorophenyl) (3-methoxy-2,4,5,6-tetrafluorophenyl) borane,
(4-methoxy-2,3,5,6-tetrafluorophenyl) (2-methoxy-3,5,6-trifluorophenyl) borane,
(4-methoxy-2,3,5,6-tetrafluorophenyl) (3-methoxy-2,5,6-trifluorophenyl) borane,
(4-methoxy-2,3,5,6-tetrafluorophenyl) (3-methoxy-2,4,6-trifluorophenyl) borane,
(4-methoxy-2,3,5,6-tetrafluorophenyl) (2-methoxy-3,5-difluorophenyl) borane,
(4-methoxy-2,3,5,6-tetrafluorophenyl) (3-methoxy-2,6-difluorophenyl) borane,
(4-methoxy-2,3,5,6-tetrafluorophenyl) (3-methoxy-4,6-difluorophenyl) borane,
(4-methoxy-2,3,5,6-tetrafluorophenyl) (2-methoxy-4,6-difluorophenyl) borane,
(4-methoxy-2,3,5,6-tetrafluorophenyl) (4-methoxy-2,6-difluorophenyl) borane,
(3-methoxy-2,4,5,6-tetrafluorophenyl) (2-methoxy-3,5,6-trifluorophenyl) borane,
(3-methoxy-2,4,5,6-tetrafluorophenyl) (3-methoxy-2,5,6-trifluorophenyl) borane,
(3-methoxy-2,4,5,6-tetrafluorophenyl) (3-methoxy-2,4,6-trifluorophenyl) borane,
(3-methoxy-2,4,5,6-tetrafluorophenyl) (2-methoxy-3,5-difluorophenyl) borane,
(3-methoxy-2,4,5,6-tetrafluorophenyl) (3-methoxy-2,6-difluorophenyl) borane,
(3-methoxy-2,4,5,6-tetrafluorophenyl) (3-methoxy-4,6-difluorophenyl) borane,
(3-methoxy-2,4,5,6-tetrafluorophenyl) (2-methoxy-4,6-difluorophenyl) borane,
(3-methoxy-2,4,5,6-tetrafluorophenyl) (4-methoxy-2,6-difluorophenyl) borane,
(2-methoxy-3,5,6-trifluorophenyl) (3-methoxy-2,5,6-trifluorophenyl) borane,
(2-methoxy-3,5,6-trifluorophenyl) (3-methoxy-2,4,6-trifluorophenyl) borane,
(2-methoxy-3,5,6-trifluorophenyl) (2-methoxy-3,5-difluorophenyl) borane,
(2-methoxy-3,5,6-trifluorophenyl) (3-methoxy-2,6-difluorophenyl) borane,
(2-methoxy-3,5,6-trifluorophenyl) (3-methoxy-4,6-difluorophenyl) borane,
(2-methoxy-3,5,6-trifluorophenyl) (2-methoxy-4,6-difluorophenyl) borane,
(2-methoxy-3,5,6-trifluorophenyl) (4-methoxy-2,6-difluorophenyl) borane,
(3-methoxy-2,5,6-trifluorophenyl) (3-methoxy-2,4,6-trifluorophenyl) borane,
(3-methoxy-2,5,6-trifluorophenyl) (2-methoxy-3,5-difluorophenyl) borane,
(3-methoxy-2,5,6-trifluorophenyl) (3-methoxy-2,6-difluorophenyl) borane,
(3-methoxy-2,5,6-trifluorophenyl) (3-methoxy-4,6-difluorophenyl) borane,
(3-methoxy-2,5,6-trifluorophenyl) (2-methoxy-4,6-difluorophenyl) borane,
(3-methoxy-2,5,6-trifluorophenyl) (4-methoxy-2,6-difluorophenyl) borane,
(3-methoxy-2,4,6-trifluorophenyl) (2-methoxy-3,5-difluorophenyl) borane,
(3-methoxy-2,4,6-trifluorophenyl) (3-methoxy-2,6-difluorophenyl) borane,
(3-methoxy-2,4,6-trifluorophenyl) (3-methoxy-4,6-difluorophenyl) borane,
(3-methoxy-2,4,6-trifluorophenyl) (2-methoxy-4,6-difluorophenyl) borane,
(3-methoxy-2,4,6-trifluorophenyl) (4-methoxy-2,6-difluorophenyl) borane,
(2-methoxy-3,5-difluorophenyl) (3-methoxy-2,6-difluorophenyl) borane,
(2-methoxy-3,5-difluorophenyl) (3-methoxy-4,6-difluorophenyl) borane,
(2-methoxy-3,5-difluorophenyl) (2-methoxy-4,6-difluorophenyl) borane,
(2-methoxy-3,5-difluorophenyl) (4-methoxy-2,6-difluorophenyl) borane,
(3-methoxy-4,6-difluorophenyl) (2-methoxy-4,6-difluorophenyl) borane,
(3-methoxy-4,6-difluorophenyl) (4-methoxy-2,6-difluorophenyl) borane,
(3-methoxy-2,6-difluorophenyl) (3-methoxy-4,6-difluorophenyl) borane,
(3-methoxy-2,6-difluorophenyl) (2-methoxy-4,6-difluorophenyl) borane,
(3-methoxy-2,6-difluorophenyl) (4-methoxy-2,6-difluorophenyl) borane,
(2-methoxy-4,6-difluorophenyl) (4-methoxy-2,6-difluorophenyl) borane, and combinations comprising at least one of the foregoing.

Lewis acidic bisaryl boron compounds according to the formula (BH—(ArHal)$_2$) can be prepared or synthesized in accordance with methods known in the art. In particular, methods of preparing $(C_6F_5)_2$BH are taught in U.S. Pat. No. 5,496,960. Suitable methods of preparing fluoroaryl borane compounds for use herein also include those taught in U.S. Pat. Nos. 6,118,026 and 6,410,810.

Boron containing Lewis acids may act as capping agents, combining with free hydroxyl groups located on and/or within the support, preferably rendering the support relatively hydrophobic. The boron containing Lewis acid preferably combines with the support according the to following equation:

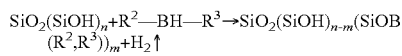

$$SiO_2(SiOH)_n + R^2-BH-R^3 \rightarrow SiO_2(SiOH)_{n-m}(SiOB(R^2,R^3))_m + H_2\uparrow$$

wherein $R^2$ and $R^3$ are defined as above. Preferably, hydrogen is released as a gaseous product upon combination of the boron containing Lewis acid with the support.

In a preferred embodiment, the boron containing Lewis acid is combined (reacted with) the support after calcination of the support. More preferably, the boron containing Lewis acid acts as a capping agent in that the boron containing Lewis acid is not substantially involved in forming a covalently bound activator. Accordingly, the boron containing Lewis acid preferably replaces or otherwise inactivates the hydrogen on the SiOH functional group by bonding to the oxygen, forming an otherwise inert cap on the silanol group of the substrate, which is not a bound activator and thus is not involved in polymerization within a catalyst system.

After contacting the support with the boron containing Lewis acid, the support preferably comprises a concentration of hydroxyl groups sufficient to allow combination of the support with an activator to produce a catalyst support (i.e., a support in combination with an activator). Also preferably after contacting the support with the boron containing Lewis acid, the support preferably comprises a concentration of free hydroxyl groups sufficient to allow formation of a catalyst system when combined with an activator and a catalyst precursor.

Prior to contacting the support with one or more boron containing Lewis acids to reduce the number of available hydroxyl groups on the support, the support materials preferably comprise a hydroxyl concentration from about 100 millimoles per gram (mmol/g) to about 1000 mmol/g. After contacting the support with one or more boron containing Lewis acids to reduce the number of available hydroxyl groups on the support, the support materials preferably comprise a hydroxyl concentration from about 0.001 millimoles per gram (mmol/g) to about 10 mmol/g. Within this range, a hydroxyl concentration after contacting the support with one or more boron containing Lewis acids of less than or equal to about 2 can be employed, with less than or equal to about 1 preferred. Also preferred within this range is a hydroxyl concentration after contacting the support with one or more boron containing Lewis acids of greater than or equal to about 0.005, with greater than or equal to about 0.01 more preferred. Also preferably after contacting the support with one or more boron containing Lewis acids to reduce the number of available hydroxyl groups on the support, hydrogen gas is evolved.

The boron containing Lewis acid may be contacted with the support at a molar ratio of about 0.1:1 to about 10:1, based on the molar concentration of the boron containing Lewis acid to the molar concentration of hydroxyl groups of the support (i.e., moles $BH(R^2,R^3)_2$ per gram support:moles S—OH per gram support). Within this range, a molar ratio of less than or equal to about 5:1 can be employed, with less than or equal to about 2:1 preferred, and less than or equal to about 1.5:1 more preferred. Also preferred within this range is molar ratio of greater than or equal to about 0.5:1, with greater than or equal to about 0.8:1 more preferred, and greater than or equal to about 1:1 especially preferred.

The support preferably comprises a plurality of silica particles. Each of the silica particles having a plurality of pores arranged within the particle such that a surface of the pores defines an inner surface of the particle located internal to an outer surface of the particle. After contacting the support with the boron containing Lewis acid, it is preferred that the concentration of Si—$OB(R^2,R^3)_2$ disposed on the inner surface of the particle is greater than a concentration of Si—$OB(R^2,R^3)_2$ disposed on the outer surface of the particle. In other words, the Si—$OB(R^2,R^3)_2$ functional groups are preferably disposed and/or located within the pores of the support (inside the support), as compared to the outer surface of (outside) the support particle.

In a preferred support, substantially all of the support bound boron containing Lewis acid is substantially evenly dispersed over the total surface area of the support, wherein substantially all refers to at least about 75%, preferably greater than 90% of the support bound boron containing Lewis acid present with the support. In this context, substantially evenly refers to a situation that in any 25 square micron surface or greater of the support, the amount of support bound boron containing Lewis acid present is within 10% of the amount of support bound boron containing Lewis acid present in any other surface area of the same size.

As discussed with respect to hydroxyl concentration above, the location of support bound boron containing Lewis acid can be inferred from Attenuated Total Reflectance Infrared Spectroscopy (ATRIR), X-ray Photoelectron Spectroscopy (XPS), NMR, as well as being directly measured by Secondary Ion Mass Spectroscopy (SIMS), all of which are well known to those skilled in the respective arts.

Activators and Activation Methods for Catalyst Compounds

The support is preferably combined with an activator to produce a catalyst support. The term "activator" as used herein may be interchangeably referred to as a co-catalyst for the purposes of this disclosure and appended claims. As such, an activator is unlike a capping agent in that an activator is involved in the catalytic activity of the catalyst system, as opposed to a capping agent which merely inactivates a portion of a support. In an embodiment, the catalyst support preferably comprises a support bound activator. When the support comprises silica, a silica bound activator may be formed. Combination of the catalyst support (i.e., support+activator) with a catalyst precursor forms a catalyst system.

Preferred olefin oligomerization and/or polymerization catalyst systems comprising the catalyst support disclosed herein may contain a formal anionic ligand, such as hydride or hydrocarbyl, with an adjacent (cis) coordination site accessible to an unsaturated monomer. Coordination of an unsaturated monomer to the cis coordination site allows a migratory insertion reaction to form a metal alkyl. Repetition of this process causes chain growth. An activator as described herein, is thus any combination of reagents that facilitates formation of a transition metal complex containing cis-coordinated olefin and hydride or hydrocarbyl.

Activation of a catalyst can be achieved by removal of formal anionic or neutral ligands of higher binding affinity than the unsaturated monomer. This removal process, referred to as abstraction, may have a kinetic rate that is first-order or non-first order with respect to the activator. Accordingly, activators that remove formal anionic ligands are termed ionizing activators. Activators that remove formal neutral ligands are termed non-ionizing activators.

Activation may be a one step or multi step process. One step in this process may include coordinating a hydride or hydrocarbyl group to a metal complex. A separate activation step is removal of formal anionic or neutral ligands of higher binding affinity than the unsaturated monomer. These activation steps may occur in series or in parallel. These steps may also occur in the presence of olefin, and/or prior to exposure to olefin. More than one sequence of activation steps may be possible to achieve activation.

The activator may also act to coordinate a hydride or hydrocarbyl group to a catalyst. Activation may be effected by substitution of catalyst functional groups with a hydride, hydrocarbyl or substituted hydrocarbyl group. This substitution may be effected with appropriate hydride or alkyl reagents of group 1, 2, 12, and/or 13 elements. To achieve activation, it may be necessary to also remove formal anionic or neutral ligands of higher binding affinity than the particular unsaturated monomer being used.

The activator may also act to coordinate a hydride or hydrocarbyl group to the catalyst. If the catalyst does not contain formal anionic ligands, then a hydride, hydrocarbyl or substituted hydrocarbyl may be coordinated to a metal using electrophilic proton or alkyl transfer reagents represented by $H^+(LB)_n A^-$, $(R^4)^+(LB)_n A^-$. $R^4$ is a hydrocarbyl or a substituted hydrocarbyl; LB is a Lewis-base, n=0, 1 or 2. Non-limiting examples of preferred Lewis-bases include diethyl ether, dimethyl ether, ethanol, methanol, water, acetonitrile, and/or N,N-dimethylaniline. $A^-$ is an anion, preferably a substituted hydrocarbon, a functional group, or a non-coordinating anion. Non-limiting examples of $A^-$ include halides, carboxylates, phosphates, sulfates, sulfonates, borates, aluminates, alkoxides, thioalkoxides, anionic substituted hydrocarbons, and/or anionic metal complexes.

Alumoxane and Aluminum Alkyl Activators

One or more alumoxanes may be utilized as an activator herein. Alumoxanes, also referred to as aluminoxanes, are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is typically a 1:1 molar ratio.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another preferred alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Aluminum alkyl or organoaluminum compounds which may be utilized as activators (or scavengers) include trimethylaluminum, triethylaluminum, triisobutylaluminum, tri-n-hexylaluminum, tri-n-octylaluminum, and the like.

Ionizing Activators

Preferably, an ionizing or stoichiometric activator, neutral or ionic, is used in combination with the support disclosed herein. Examples include tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or a combination comprising at least one of the foregoing. Furthermore, a neutral or ionic activator may be used alone or in combination with other activators including alumoxane or modified alumoxane activators.

Examples of neutral stoichiometric activators include tri-substituted boron, tellurium, aluminum, gallium, indium, or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Examples include those described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Preferred activators include a cation and an anion component, and may be represented by the following formula:

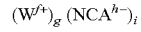

$W^{f+}$ is a cation component having the charge f+
$NCA^{h-}$ is a non-coordinating anion having the charge h−
f is an integer from 1 to 3.
h is an integer from 1 to 3.
g and h are constrained by the relationship: (g)×(f)=(h)×(i)

The cation component, ($W^{f+}$) may include Bronsted acids such as protons or protonated Lewis bases or reducible Lewis acids capable of protonating or abstracting a moiety, such as an alkyl or aryl, from an analogous metallocene or Group 15 containing transition metal catalyst precursor, resulting in a cationic transition metal species.

In a preferred embodiment, the activators include a cation and an anion component, and may be represented by the following formula:

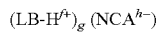

$$(LB-H^{f+})_g (NCA^{h-})_i$$

wherein LB is a neutral Lewis base;
H is hydrogen;
$NCA^{h-}$ is a non-coordinating anion having the charge h−
f is an integer from 1 to 3,
h is an integer from 1 to 3,
g and h are constrained by the relationship: (g)×(f)=(h)×(i)

The activating cation ($W^{f+}$) may be a Bronsted acid, (LB-H$^{f+}$), capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, N,N-diethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene and combinations comprising at least one of the foregoing activating cations.

The activating cation ($W^{f+}$) may also be an abstracting moiety such as silver, carboniums, tropylium, carbeniums, ferroceniums and mixtures thereof, with carboniums and ferroceniums being preferred. Most preferably ($W^{f+}$) is triphenyl carbonium or N,N-dimethylanilinium.

The anion component (NCA$^{h-}$) includes those having the formula [T$^{j+}$Qk]$^{h-}$ wherein j is an integer from 1 to 3; k is an integer from 2 to 6; k−j=h; T is an element selected from Group 13 or 15 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable (NCA$^{h-}$)$_i$ also include diboron compounds as disclosed in U.S. Pat. No. 5,447,895, which is fully incorporated herein by reference.

Additional suitable anions are known in the art and will be suitable for use with the catalysts of the invention. See in particular, U.S. Pat. No. 5,278,119 and the review articles by S. H. Strauss, "The Search for Larger and More Weakly Coordinating Anions", Chem. Rev., 93, 927–942 (1993) and C. A. Reed, "Carboranes: A New Class of Weakly Coordinating Anions for Strong Electrophiles, Oxidants and Superacids", Acc. Chem. Res., 31, 133–139 (1998).

Boron containing compounds useful herein as ionic activators may comprise ammonium salts, preferably tri-substituted ammonium salts. Illustrative, but not limiting examples of ionic activators comprising boron and comprising tri-substituted ammonium salts include:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium) tetrakis(pentafluorophenyl) borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluoro-phenyl) borate,
N,N-dimethyl-(2,4,6-trimethylanilinium)tetrakis-(2,3,4,6-tetrafluorophenyl) borate;

dialkyl ammonium salts such as: di-(i-propyl)ammonium tetrakis(pentafluorophenyl) borate and dicyclohexylammonium tetrakis(pentafluorophenyl) borate; and tri-substituted phosphonium salts such as: triphenylphosphonium tetrakis (pentafluorophenyl) borate, tri(o-tolyl)phosphonium tetrakis (pentafluorophenyl) borate, and tri(2,6-dimethylphenyl) phosphonium tetrakis(pentafluorophenyl) borate, and combinations comprising at least one of the foregoing activators.

Most preferably, the ionic stoichiometric activator is N,N-dimethylanilinium tetrakis(pentafluorophenyl)borate and/or triphenylcarbenium tetrakis(pentafluorophenyl)borate.

An activation method using ionizing ionic compounds not containing an active proton but capable of producing an analogous metallocene catalyst cation and their non-coordinating anion are also contemplated, and are described in EP-A-0 426 637, EP-A-0 573 403 and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those, which are not degraded to neutrality when the initially formed complex decomposes. Non-coordinating anions useful in accordance with this invention are those that are compatible, stabilize the metal cation in the sense of balancing its ionic charge, and yet retain sufficient lability to permit displacement by an ethylenically or acetylenically unsaturated monomer during polymerization. These types of cocatalysts sometimes use tri-isobutyl aluminum or tri-octyl aluminum as a scavenger.

Invention process also can employ activator compounds (also referred to as cocatalyst compounds) that are initially neutral Lewis acids but form a cationic metal complex and a noncoordinating anion, or a zwitterionic complex upon reaction with the invention compounds. For example, tris (pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527, 929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, 1391–1434 (2000).

When the catalyst complex does not contain at least one hydride or hydrocarbyl ligand but does contain at least one functional group ligand, such as chloride, amido or alkoxy ligands, and the functional group ligands are not capable of discrete ionizing abstraction with the ionizing, anion precursor compounds, these functional group ligands can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for analogous processes describing the reaction of alkyl aluminum compounds with analogous dihalide substituted metallocene compounds prior to or with the addition of activating noncoordinating anion precursor compounds.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation. For example, tris(perfluorophenyl) boron can be used with methylalumoxane.

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators include $R^5(R^6)_3$, where $R^5$ is a group 13 element and $R^6$ is a hydrogen, a hydrocarbyl, a substituted hydrocarbyl, or a functional group. Typically, $R^6$ is an arene or a perfluorinated arene. Non-ionizing activators also include weakly coordinated transition metal compounds such as low valent olefin complexes. Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$,alumoxane, CuCl, $Ni(1,5-cyclooctadiene)_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, 1391–1434 (2000).

Preferred non-ionizing activators include $R^5(R^6)_3$, where $R^5$ is a group 13 element and $R^6$ is a hydrogen, a hydrocarbyl, a substituted hydrocarbyl, or a functional group. Typically, $R^6$ is an arene or a perfluorinated arene.

More preferred non-ionizing activators include $B(R^7)_3$, where $R^7$ is a an arene or a perfluorinated arene. Even more preferred non-ionizing activators include $B(C_6H_5)_3$ and $B(C_6F_5)_3$. A particularly preferred non-ionizing activator is $B(C_6F_5)_3$. More preferred activators are ionizing and non-ionizing activators based on perfluoroaryl borane and perfluoroaryl borates such as $PhNMe_2H^+$ $B(C_6F_5)_4^-$, $(C_6H_5)_3C^+$ $B(C_6F_5)_4^-$, and $B(C_6F_5)_3$.

The combined metal compounds and the activator may be combined in ratios of about 1000:1 to about 0.5:1. In a preferred embodiment the metal compounds and the activator are combined in a ratio of about 300:1 to about 1:1, preferably about 150:1 to about 1:1, for boranes, borates, aluminates, etc. the ratio is preferably about 1:1 to about 10:1 and for alkyl aluminum compounds (such as diethylaluminum chloride combined with water) the ratio is preferably about 0.5:1 to about 10:1. The ratio of the first catalyst to the second or additional catalyst is 5:95 to 95:5, preferably 25:75 to 75:25, even more preferably 40:60 to 60:40.

Catalyst Precursors

The activator bound to the support preferably combines with a catalyst precursor to produce a catalyst system. Catalyst precursors (also referred to herein as pre-catalysts and pre-catalyst compounds) suitable for use herein include any compound that can be converted by ligand abstraction into a catalytically active cation and stabilized in that active electronic state by a noncoordinating or weakly coordination anion sufficiently labile to be displaced by an olefinically unsaturated monomer such as ethylene.

Preferably, the support bound activators and the catalyst precursors irreversibly combine by ligand extraction to form ionic catalysts for olefin polymerization (i.e., a catalyst system). More preferably, the support bound activator of the catalyst support comprises a neutral Lewis acid comprising a boron atom having three ligands, one of which is an heteroatom covalently bonded to the support disclosed herein. Such irreversible combinations may be evidenced by evolution of methane upon combination of the catalyst precursor with the activator.

Preferably, the catalyst precursors, and ultimately the catalyst, comprises a metallocene transition metal compounds (containing one, two, or three cyclopentadienyl ligands per metal atom), also referred to herein as a metallocene. Other catalyst precursors may include non-metallocene early transition metal compounds such as those with amide and/or phenoxide type ligands, non-metallocene late transition metal compounds including those with diimine or diiminepyridyl ligands, and other transition metal compounds.

More specifically, the transition metal pre-catalyst can be at least one metallocene compound, at least one constrained geometry transition metal compound or mixtures thereof capable of (A) being activated upon contact with the support bound activator or (B) being converted upon contact with an organometallic compound, to an intermediate which is capable of being activated upon contact with the support bound activator.

Preferably, catalyst precursors suitable for use herein can be generically represented by the formula:

$$Cp^*_q ZL^1_m L^2_n L^3_p \text{ or a dimer thereof} \qquad (I)$$

wherein:

Cp* represents an anionic, delocalized, π-bonded cyclopentadienyl group, or substituted cyclopentadienyl group, as well as a substituted or unsubstituted derivative of a cyclopentadienyl group, that is bound to Z, containing up to 50 non-hydrogen atoms, optionally two Cp* groups may be joined together by a moiety having up to 30 non-hydrogen atoms in its structure thereby forming a bridged structure, and further optionally one Cp* may be bound to $L^1$;

Z is preferably a metal of Group 3–15. More preferably, a metal of Group 3 (Sc, Y, La, Ac), Group 4 (Ti, Zr, Hf), an Actinide metal (Ac, Tgm Pa, U, Np, Pu, Am, Cm, Bk, Cf; Es, Fm, Md, No, Lr), and/or a Lanthanide metal (Ce, Pr, Nd, Pm, Sm, Eu, Gd, Tb, Dy, Ho, Er Tm Yb, Lu). More preferably Z is a Group 4 metal (Ti, Zr, Hf) in the +2, +3 or +4 formal oxidation state, counter balancing the anionic Cp* and L group(s);

$L^1$ is an optional, divalent substituent of up to 50 non-hydrogen atoms that, when present, together with Cp* forms a metallocycle with Z;

$L^2$ each occurrence independently represents an optional neutral Lewis base having up to 20 non-hydrogen atoms;

$L^3$ each occurrence independently represents a monovalent, anionic moiety having up to 50 non-hydrogen atoms. Preferably a hydrocarbon-based radical or group, optionally, two $L^3$ groups together may constitute a divalent anionic moiety having both valences bound, preferably covalently bound, to Z, or a neutral, conjugated or non-conjugated diene that is π-bonded to Z, (whereupon Z is in the +2 oxidation state), or further optionally one or more $L^3$ and one or more $L^2$ groups may be bonded together thereby constituting a moiety that is both covalently bound to Z and coordinated thereto by means of Lewis base functionality;

q is 1 or 2;

m is an integer of 0 or 1;

n is an integer of 0 to 3;

p is an integer from 0 to 3;

the sum of q+m+p is equal to the formal oxidation state of Z; and provided that where any one of $L^1$ to $L^3$ groups is hydrocarbyl containing, such L group is not Cp*.

Examples of suitable anionic, delocalized π-bonded cyclopentadienyl derivative groups constituting Cp* include indenyl, fluorenyl, tetrahydroindenyl, tetrahydrofluorenyl, octahydrofluorenyl, cyclopentadienyl, cyclohexadienyl, dihydroanthracenyl, hexahydroanthracenyl, and decahydroanthracenyl groups, as well as $C_1$–$C_{10}$ hydrocarbyl-substituted derivatives thereof.

Preferred Cp* groups include cyclopentadienyl, pentamethylcyclopentadienyl, tetramethylcyclopentadienyl, 1,3-dimethylcyclopentadienyl, n-butylcyclopentadienyl, indenyl, 2,3-dimethylindenyl, fluorenyl, 2-methylindenyl and 2-methyl-4-phenylindenyl.

Each carbon in the Cp* ring may independently be substituted with, a radical, selected—from halogen, hydrocarbyl, halohydrocarbyl and hydrocarbyl substituted metalloid radicals wherein the metalloid is selected from Group 14 (C, Si, Ge, Sn, Pb) of the Periodic Table of the Elements. Included within the term 'hydrocarbyl' are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition, two or more such radicals may together form a fused ring system or a hydrogenated fused ring system. Suitable hydrocarbyl-substituted organometalloid radicals include mono-, di- and trisubstituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. The recitation 'metalloid', as used herein, includes nonmetals such as boron, phosphorus and the like which exhibit semi-metallic characteristics.

Representative examples of suitable $L^2$ groups include diethylether, tetrahydrofuran, dimethylaniline. aniline, trimethylphosphine, and n-butylamine. $L^2$ can also represent a second transition metal compound of the same type as Formulas I, III or IV such that two metal centers, e.g., Z and Z', are bridged by one or two $L^3$ groups. Such dual metal center bridged structures are described in PCT/US91/4390.

Preferred pre-catalysts represented by Formula I include those containing either one or two Cp* groups. The latter pre-catalysts include those containing a bridging group linking the two Cp* groups. Preferred bridging groups are those corresponding to the Formula:

(II)

wherein

E is silicon or carbon, $R^1$ independently each occurrence is hydrogen or a group selected from silyl, hydrocarbyl, hydrocarbyloxy and combination thereof, said $R^1$ having up to 30 carbon or silicon atoms, and x is 1 to 8. Preferably, $R^1$ independently each occurrence is methyl, benzyl, tert-butyl or phenyl.

Examples of the foregoing bis(Cp*) containing pre-catalysts are compounds corresponding to the formula:

(III)

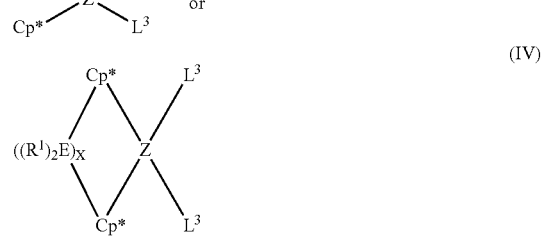
(IV)

wherein:

Cp* is as described previously;

Z is titanium, zirconium or hafnium, preferably zirconium or hafnium, in the +2 or +4 formal oxidation state.

The optional substituents on the cyclopentadienenyl ring in each occurrence independently can preferably selected from the group of hydrogen, hydrocarbyl, silyl, germyl, cyano, halo and combinations thereof, said substituents having up to 20 non-hydrogen atoms, or adjacent substituent groups together can form a divalent derivative (i.e., a hydrocarbadiyl, siladiyl or germadiyl group) thereby forming a fused ring system; and $L^3$ independently each occurrence is an anionic ligand group of up to 50 non-hydrogen atoms, or two $L^3$ groups together can constitute a divalent anionic ligand group of up to 50 non-hydrogen atoms or a conjugated diene having from 4 to 30 non-hydrogen atoms forming a π-complex with Z, whereupon Z is in the +2 formal oxidation state, and $R^1$, E and x are as previously defined.

Thus, each $L^3$ may be independently, each occurrence hydride, $C_1$–$C_{50}$ hydrocarbon-based radicals including hydrocarbyl radicals, substituted hydrocarbyl radicals wherein one or more hydrogen atoms is replaced by an electron-withdrawing group, such as a halogen atom or alkoxide radical, or $C_1$–$C_{50}$ hydrocarbyl-substituted metalloid radicals, wherein the metalloid is selected from the Group 4 of the Periodic Table of Elements, provided that where any $L^3$ is hydrocarbon based, such $L^3$ is different from Cp*. In addition any two $L^3$ groups together, may constitute an alkylidene olefin, acetylene or a cyclometallated hydrocarbyl group.

As used herein, the term "hydrocarbon-based radical or group" denotes a radical or group having a carbon atom directly attached to the remainder of the molecule and having a predominantly hydrocarbon character within the context of this invention. Moreover, in this context the terms "group" and "radical" are used interchangeably. Such radicals include the following:

(1) Hydrocarbon radicals; that is, aliphatic radicals, aromatic- and alicyclic-substituted radicals, and the like, of the type known to those skilled in art.
(2) Substituted hydrocarbon radicals; that is, radicals containing pendant non-hydrocarbon substituents, that in the context of this invention, do not alter the predominantly hydrocarbon character of the radical or constitute a poison for the pre-catalyst. Those skilled in the art will be aware of suitable substituents; examples are halo, nitro, hydroxy, alkoxy, carbalkoxy, and alkythio.
(3) Hetero radicals; that is, radicals which, while predominantly hydrocarbon in character within the context of this invention, contain atoms other than carbon present as a member of the linear structure of a chain or ring otherwise composed of carbon atoms. Suitable heteroatoms will be apparent to those skilled in the art and include, for example, nitrogen, oxygen, phosphorus and sulfur. Such hydrocarbon-based radicals may be bonded to Z through the heteroatom.

In general, no more than three substituents or heteroatoms, and preferably no more than one, will be present for each 10 carbon atoms in the hydrocarbon based radical.

More specifically, the hydrocarbon based radical or group of $L^3$ can be substituted or unsubstituted, cyclic or non-cyclic, linear or branched, aliphatic, aromatic, or mixed aliphatic and aromatic including hydrocarbylene, hydrocarbyloxy, hydrocarbylsilyl, hydrocarbylamino, and hydrocarbylsiloxy radicals having up to 50 non-hydrogen atoms. The preferred $L^3$ groups are independently selected from halo, hydrocarbyl, and substituted hydrocarbyl radicals. The hydrocarbon based radical may typically contain from 1 to about 50 carbon atoms, preferably from 1 to about 12 carbon atoms and the substituent group is preferably a halogen atom.

Exemplary hydrocarbyl radicals for $L^3$ are methyl, ethyl, propyl, butyl, amyl, isoamyl, hexyl, isobutyl, heptyl, octyl, nonyl, decyl, cetyl, 2-ethylhexyl, phenyl and the like, with methyl being preferred. Exemplary substituted hydrocarbyl radicals for $L^3$ include trifluoromethyl, pentafluorphenyl, trimethylsilylmethyl, and trimethoxysilylmethyl and the like. Exemplary hydrocarbyl substituted metalloid radicals for $L^3$ include trimethylsilyl, trimethylgermyl, triphenylsilyl, and the like. Exemplary alkyldiene radicals for two $L^3$ groups together include methylidene, ethylidene and propylidene.

The foregoing metal complexes are especially suited for the preparation of polymers having stereoregular molecular structure. In such capacity it is preferred that the complex possess Cs symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of, syndiotactic olefin polymers in Ewen, et al., J. Am. Chem. Soc. 110, 6255–6256 (1980). Examples of chiral structures include bis-indenyl complexes. Similar systems based on Ti(IV) or Zr(IV) were disclosed for preparation of isotactic olefin polymers in Wild et al., J. Organomet. Chem, 232, 233–47 (1982).

Exemplary bridged ligands containing two π-bonded groups include: (dimethylsilyl-bis-cyclopentadienyl), (dimethylsilyl-bismethylcyclopentadienyl), (dimethylsilyl-bis-ethylcyclopentadienyl, (dimethylsilyl-bis-t-butylcyclopentadienyl), (dimethylsilyl-bistetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilylcyclopentadienyl-fluorenyl), (1,1,2,2-tetramethyl-1,2-disilyl-biscyclopentadienyl), (1,2-bis(cyclopentadienyl))ethane, and (isopropylidene-cyclopentadienyl-fluorenyl).

Preferred $L^3$ groups are selected from hydride, hydrocarbyl, silyl, germyl, halohydrocarbyl, halosilyl, silylhydrocarbyl and aminohydrocarbyl groups, or two $L^3$ groups together can constitute a divalent derivative of a conjugated diene or a neutral, π-bonded, conjugated diene. Most preferred $L^3$ groups are $C_{1-20}$ hydrocarbyl groups.

Examples of preferred pre-catalyst compounds of Formula III and IV include compounds wherein the Cp* group is selected from cyclopentadienyl, indenyl, tetrahydroindenyl, fluorenyl, and octahydrofluorenyl; the substituents on the foregoing Cp* groups each occurrence is hydrogen, methyl, ethyl, propyl, butyl, pentyl, hexyl (including isomers), norbornyl, benzyl, phenyl, etc.; and $L^3$ is selected from methyl, neopentyl, trimethylsilyl, norbornyl, benzyl, methylbenzyl, and phenyl; q is 2, and m and n are zero.

A further class of metal complexes utilized in the present invention correspond to the formula:

$$Cp^*_q ZL^1_m L^2_n L^3_p \text{ or a dimer thereof} \quad \text{(V)}$$

wherein:
Cp* is as defined previously;
Z is a metal of Group 4 of the Periodic Table of the Elements in the +2, +3 or +4 formal oxidation state;
$L^1$ is a divalent substituent of up to 50 non-hydrogen atoms that together with Cp* forms a metallocycle with Z;
$L^2$ is an optional neutral Lewis base ligand having up to 20 non-hydrogen atoms;
$L^3$ each occurrence is a monovalent, anionic moiety having up to 20 non-hydrogen atoms, optionally two $L^3$ groups together may form a divalent anionic moiety having both valences bound to Z or a neutral $C_{5-30}$ conjugated diene, and further optionally $L^2$ and $L^3$ may be bonded together thereby forming a moiety that is both covalently bound to Z and coordinated thereto by means of Lewis base functionality;
q is 1 or 2;
m is 1;
n is a number from 0 to 3;
p is a number from 1 to 2; and the sum of q+m+p is equal to the formal oxidation state of Z.

Preferred divalent $L^1$ substituents include groups containing up to 30 non-hydrogen atoms comprising at least one atom that is oxygen, sulfur, boron or a member of Group 14 of the Periodic Table of the Elements directly attached to the Cp* group, and a different atom, selected from the group consisting of nitrogen, phosphorus, oxygen or sulfur that is covalently bonded to Z.

Another class of preferred pre-catalysts can be represented by the Formula:

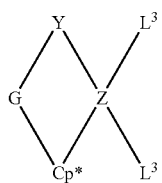

(VI)

wherein:

Z, Cp*, and $L^3$ are as defined previously;

G is a divalent moiety comprising oxygen, boron, or a member of Group 14 of the Periodic Table of Elements, such as, $Si(R^1)_2$, $C(R^1)_2$, $Si(R^1)_2$—$Si(R^1)_2$, $C(R^1)_2$—C$(R^1)_2$, $Si(R^1)_2$—$C(R^1)_2$, $C(R^1=CR^1)$, and $Ge(R^1)_2$;

Y is a linking group comprising nitrogen, phosphorus, oxygen or sulfur, such as —O—, —S—, —$NR^1$—, $PR^1$— or optionally G and Y together can constitute a fused ring structure, the combination of G and Y constituting an $L^1$ group of Formula I; and $R^1$ is as described previously.

A further class of preferred pre-catalysts are amido-silane or amido-alkanediyl-compounds corresponding to the formula:

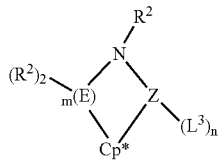

(VII)

wherein:

Z is as previously described;

$R^2$ each occurrence is independently selected from the group of hydrogen, silyl, alkyl, aryl and combinations thereof having up to 10 carbon or silicon atoms;

E is silicon or carbon; and $L^3$ independently each occurrence is hydride, alkyl, or aryl of up to 10 carbons;

m is an integer of 1 or 2; and n is an integer of 1 or 2 depending on the valence of Z.

Examples of preferred metal coordination compounds of Formula VII include compounds wherein the $R^2$ on the amido group is methyl, ethyl, propyl, butyl, pentyl, hexyl, (including isomers), norbornyl, benzyl, phenyl, and the like; the Cp* group is cyclopentadienyl, indenyl, tetrahydroindenyl, fluorenyl, and octahydrofluorenyl; the substituents on the foregoing cyclopentadienyl groups each occurrence is hydrogen, methyl, ethyl, propyl, butyl, pentyl, hexyl, (including isomers), norbornyl, benzyl, phenyl, etc.; and $L^3$ is methyl, neopentyl, trimethylsilyl, norbornyl, benzyl, methylbenzyl, phenyl, and the like.

Illustrative pre-catalysts that may be employed in the practice of the present invention include:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-pentadienyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
pentamethylcyclopentadienyltitaniumdimethylchloride,
$\eta^5$-2,4-dimethyl-1,3-pentadienyl)titaniumtrimethyl,
octahydrofluorenyltitaniumtrimethyl,
tetrahydroindenyltitaniumtrimethyl,
etrahydrofluorenyltitaniumtrimethyl,
(1,1-dimethyl-2,3,4,9,10-.eta.-1,4,5,6,7,8-hexahydronaphthalenyl)titaniumtrimethyl,
(1,1,2,3-tetramethyl-2,3,4,9,10-.eta.-1,4,5,6,7,8-hexahydronaphthalenyl)titaniumtrimethyl,
(tert-butylamido)(tetramethyl-η5-cyclopentadienyl)dimethylsilanetitanium dichloride,
(tert-butylamido)(tetramethyl-η5-cyclopentadienyl)dimethylsilanetitaniumdimethyl,
(tert-butylamido)(tetramethyl-η5-cyclopentadienyl)-1,2-ethanediyltitaniumdimethyl,
(tert-butylamido)(tetramethyl-η5-indenyl)dimethylsilaLnetitanium dimethyl,
(tert-butylamido)(tetramethyl-η5-cyclopentadienyl)dimethylsilane titanium (III) 2-(dimethylamino)benzyl;
(tert-butylamido)(tetramethyl-η5-cyclopentadienyl)dimethylsilanetitanium (III) allyl,
(tert-butylamido)(tetramethyl-η5-cyclopentadienyl)dimethylsilanetitanium (II) 1,4-diphenyl-1,3-butadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (IV) 1,3-butadiene,
(tert-butylamido)(2,3-dimethylindenyl)dimethylsilanetitanium (II) 1,4diphenyl-1,3-butadiene,
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methyl-4-phenylindenyl)dimethylsilanetitanium (II)1,4-diphenyl-1,3-butadiene,
(tert-butylamido)(tetramethyl-η5-cyclopentadienyl)dimethylsilanetitanium (IV) 1,3-butadiene,
(tert-butylamido)(tetramethyl-η5-cyclopentadienyl)dimethylsilanetitanium (II) 1,4-dibenzyl-1,3-butadiene,
(tert-butylamido)(tetramethyl-η5-cyclopentadienyl)dimethylsilanetitanium (II) 2,4-hexadiene, (tert-butylamido)(tetramethyl-η$^5$-cyclopentadienyl)dimethylsilanetitanium (II) 3-methyl-1,3-pentadiene,
(tert-butylamido)(2,4-dimethyl-1,3-pentadien-2-yl)dimethylsilanetitaniumdimethyl,
(tert-butylamido)(1,1-dimethyl-2,3,4,9,10-.eta.-1,4,5,6,7,8-hexahydronaphthalen-4-yl)dimethylsilanetitaniumdimethyl, and
(tert-butylamido)(1,1,2,3-tetramethyl-2,3,4,9,10-.PI.-1,4,5,6,7,8-hexahydronaphthalen-4-yl)dimethylsilanetitaniumdimethyl, and the like.

Bis(Cp*) containing complexes including bridged complexes suitable for use in the present invention include:
biscyclopentadienylzirconiumdimethyl,
biscyclopentadienyltitaniumdiethyl,
cyclopentadienyltitaniumdiisopropyl,
biscyclopentadienyltitaniumdiphenyl,
biscyclopentadienylzirconium dibenzyl,
biscyclopentadienyltitanium-2,4-pentadienyl,
biscyclopentadienyltitaniummethylmethoxide,
biscyclopentadienyltitaniummethylchloride,
bispentamethylcyclopentadienyltitaniumdimethyl,
bisindenyltitaniumdimethyl,
indenylfluorenyltitaniumdiethyl,
bisindenyltitaniummethyl(2-(dimethylamino)benzyl),
bisindenyltitaniummethyltrimethylsilyl,
bistetrahydroindenyltitaniummethyltrimethylsilyl,
bispentamethylcyclopentadienyltitaniumdiisopropyl,
bispentamethylcyclopentadienyltitaniumdibenzyl,
bispentamethylcyclopentadienyltitaniummethylmethoxide,
bispentamethylcyclopentadienyltitaniummethylchloride,
(dimethylsilyl-bis-cyclopentadienyl)zirconiumdimethyl,
(dimethylsilyl-bis-pentamethylcyclopentadienyl)titanium-2,4-pentadienyl,
(dimethylsilyl-bis-t-butylcyclopentadienyl)zirconiumdichloride,
(methylene-bis-pentamethylcyclopentadienyl)titanium(III) 2-(dimethylamino)benzyl,
(dimethylsilyl-bis-indenyl)zirconiumdichloride,
(dimethylsilyl-bis-2-methylindenyl)zirconiumdimethyl,
(dimethylsilyl-bis-2-methyl-4-phenylindenyl)zirconiumdimethyl,
(dimethylsilyl-bis-2-methylindenyl)zirconium-1,4-diphenyl-1,3-butadiene,
(dimethylsilyl-bis-2-methyl-4-phenylindenyl)zirconium (II) 1,4-diphenyl-1,3-butadiene, dimethylsilyl-bis-tetrahydroindenyl)zirconium(II) 1,4-diphenyl-1,3-butadiene,
(dimethylsilyl-bis-fluorenyl)zirconiumdichloride,
(dimethylsilyl-bis-tetrahydrofluorenyl)zirconiumdi(trimethylsilyl),
(isopropylidene)(cyclopentadienyl)(fluorenyl)zirconiumdibenzyl, and
(dimethylsilylpentamethylcyclopentadienylfluorenyl)zirconiumdimethyl, and the like.

Specific compounds represented by Formula VII include:
(tert-butylamido)(tetramethyl-η5-cyclopentadienyl)-1,2-ethanediylzirconium dimethyl,
(tert-butylamido)(tetramethyl-η5-cyclopentadienyl)-1,2-ethanediyltitanium dimethylbenzyl, (methylamido)(tetramethyl-η5-cyclopentadienyl)-1,2-ethanediylzirconium dibenzhydryl,
(methylamido)(tetramethyl-η5-cyclopentadienyl)-1,2-ethanediyltitanium dineopentyl, (ethylamido)(tetramethyl-η5-cyclopentadienyl)-methylenetitanium diphenyl,
(tert-butylamido)dibenzyl(tetramethyl-η5-cyclopentadienyl)silanezirconium dibenzyl,
(benzylamido)dimethyl(tetramethyl-η5-cyclopentadienyl)silanetitanium di(trimethylsilyl),
(phenylphosphido)dimethyl(tetramethyl-η5-cyclopentadienyl)silanezirconium dibenzyl, and the like.

Other compounds which may be useful in the preparation of catalyst systems according to this invention, especially compounds containing other Group 4 metals, will, of course, be apparent to those skilled in the art.

Methods for preparing the above catalysts have been described in various publications, including U.S. Pat. Nos. 5,064,802; 5,321,106; 5,399,636; 5,541,272; 5,624,878; 5,807,938; EP 890 581; PCT/US91/01860; and PCT/US91/04390. The teaching of each of the above cited references are incorporated herein in its entirety by reference.

In formulas I and II to VII, each $L^3$ group is preferably a halogen atom, an unsubstituted hydrocarbyl or a hydrocarbyloxy group. The most preferred compounds are those having each $L^3$ being halogen.

It will be understood that the identity of the L groups will determine the nature of the process steps needed to form the ultimate catalyst composition which is believed to exist, during polymerization, as an activated pair of a cation, or cation like (referred to herein collectively as cationic) component and an anion or anion like (referred to herein collectively as anionic) component. The cationic component is the pre-catalyst which has undergone activation typically by imparting a full or partial positive charge to the metal center Z and the anionic component is a full or partial negatively charged component derived from the support-activator and is believed to be in close proximity to, and provides charge balance for, the activated metal center Z under conventional polymerization reaction conditions while remaining labile. The term "labile" is used herein to mean that under polymerization conditions, the anionic component is only loosely associated at the site of the catalyst activity so as to permit displacement by a polymerizable monomer at the point of monomer addition.

Thus, the manner in which the pre-catalyst is activated typically depends on the identity of the L groups, particularly $L^3$.

Boron Containing Lewis Acid Capping Agents Involvement in Polymerization

As defined herein, an activated catalyst comprises a support bound activator in combination with a catalyst precursor to produce a catalyst system. In an embodiment, determination of the activation state of a support bound activator in combination with a catalyst precursor, as well as determination of whether or not a capping agent is in combination with a catalyst precursor may be made using time resolved luminescence spectra as described in co-pending U.S. Ser. No. 10/758,900, filed Jan. 16, 2004 ("Brant")which is fully incorporated by reference herein.

According to Brant, determination of an activation state of an activator along with a boron containing Lewis acid capping agent by a pre-catalyst using time resolved luminescence techniques may require determination of the correlation between a sample, an unactivated reference, and an activated reference. Preferably, comparison between a time resolved luminescence emission energy of a sample, and a time resolved luminescence emission energy of an identical reference compound under essentially identical conditions.

In general, the method disclosed by Brant includes, in no particular order, acquiring a time resolved luminescence spectrum of a catalyst precursor in the absence of an activator. The results of this analysis may then be used as the reference against which a time resolved luminescence spectrum of the catalyst precursor in combination with an activator, (in this case a boron containing Lewis acid capping agent in combination with a support), is compared to. Preferably, these spectra are obtained in similar solvents, at similar temperatures, at similar concentrations, with similar impurities present, and under similar external conditions. More preferably, the spectra are obtained under essentially identical conditions, save the presence of the capping agent being present in the reference.

Once the time resolved luminescence spectra are obtained, a reference luminescence emission intensity associated with a maximum reference output value in the reference spectrum may be determined. This reference luminescence emission intensity is also referred to by Brant as a reference emission energy value. A reference luminescence lifetime value associated with the reference emission energy value may also be determined. This reference luminescence lifetime value is referred to by Brant as a reference lifetime.

Accordingly, a sample luminescence emission intensity associated with a maximum sample output value in the sample luminescence spectrum is determined. This sample luminescence emission intensity is referred to by Brant as a sample emission energy value. A sample luminescence lifetime value associated with the sample emission energy value is also preferably determined. This sample luminescence lifetime value is referred to by Brant as a sample lifetime.

In one embodiment, activation of a catalyst with an activator in a sample is determined by subtracting the sample emission energy value from the reference emission energy value to produce an energy difference value. Likewise, the sample lifetime is subtracted from the reference lifetime to produce a lifetime difference value. A determination can then be made as to whether or not the energy difference value, the lifetime difference value, or both, are essentially non-zero numbers. Each of the values may independently be positive numbers or negative numbers, depending of the catalyst system and conditions, which are determined consistent with activation of the analyte.

Preferably, a catalyst may be considered activated when the lifetime difference value is a positive number (i.e., the lifetime value is less than the corresponding reference lifetime value), and/or the energy difference value is a positive number (i.e., the sample emission energy is less than the reference emission energy).

In an embodiment, a lifetime value, an energy difference value, and/or the like is essentially non-zero when the value is greater than or less than zero by an amount exceeding the experimental and inherent errors associated with the analysis, which is readily determined by one of skill in the art. In a preferred embodiment, an essentially non-zero value is obtained when a lifetime value, an energy difference value, and/or the like, is greater then 1 times the signal to noise ratio of the measurement. Preferably, an essentially non-zero value is obtained when a lifetime value, an energy difference value, and/or the like, is greater then or equal to about 2.5 times the signal to noise ratio of the analysis, with greater than or equal to about 5 times the signal to noise value more preferred, and greater than or equal to about 10 times the signal to noise value especially preferred.

As used herein, signal refers to the portion of the measurement which results from the analyte of interest, and noise refers to the portion of the system originating from background, error, and/or anything else not related to the analyte of interest. Noise may be determined utilizing a mathematically fitted average and/or a weighted average, transform, or the like of a particular measurement utilizing one or more methods known to one of reasonable skill in the art. Preferably, the level of background noise for an analysis is determined in a portion of a measurement comprising essentially no signal from the analyte of interest.

In another embodiment, activation of the catalyst occurs when the energy difference value, the lifetime difference value, or both, exceed a predetermined emission energy difference value and/or a predetermined lifetime difference value, respectively. These predetermined reference values may be obtained from measurements made on similar systems under similar environments. Accordingly, these values may be determined using empirical methods. Such predetermined values may also be arrived at using theoretical calculations, depending on the type of luminescence, sample, reference, and measurement employed.

In a more preferred embodiment, a sample adjudged to exceed a predetermined emission energy difference value and a predetermined lifetime difference value (either positive or negative) is considered to comprise an activated catalyst (i.e., a catalyst precursor which has been activated by an activator to produce a catalytically activated site). In this preferred embodiment, a sample adjudged not to exceed a predetermined emission energy difference value and a predetermined lifetime difference value may not be considered to comprise a catalyst precursor activated by an activator.

The predetermined difference value may be determined relative to empirical measurements, preferably measurements confirmed using polymerization and/or other methods to confirm conditions under which a particular catalyst system is activated.

In one embodiment, the sample emission energy difference value is preferably greater than or equal to about 500 cm$^{-1}$, more preferably greater than or equal to about 1000 cm$^{-1}$, still more preferably greater than or equal to about 1500 cm$^{-1}$.

The sample lifetime difference value is preferably greater than or equal to about 0.05 milliseconds (msec.), more preferably greater than or equal to about 0.1 msec., still more preferably greater than or equal to about 0.15 msec.

Preferably, the sample emission energy difference value is preferably greater than or equal to about 500 cm$^{-1}$ and the sample lifetime difference value is preferably greater than or equal to about 0.05 msec., more preferably greater than or equal to about 1000 cm$^{-1}$, and 0.1 msec. respectively, with greater than or equal to about 1500 cm$^{-1}$, and 0.15 msec. being especially preferred.

A preferred method of determining if the boron containing Lewis acid capping agent of the present invention forms a support bound activator in the presence of another support bound activator includes the following steps, conducted in no particular order: a time resolved luminescence spectrum of a catalyst precursor in the absence of an activator and in the absence of the Lewis acid capping agent is obtained. A time resolved luminescence spectrum of the catalyst precursor in combination with a support bound activator and the Lewis acid capping agent in combination with the support is also obtained. Preferably, these spectra are obtained in similar solvents, at similar temperatures, at similar concentrations, with similar impurities present, and under similar external conditions. More preferably, the spectra are obtained under essentially identical conditions.

Once these time resolved luminescence spectra are obtained, a reference emission energy value, and a reference emission lifetime value are determined. Sample emission energy values, sample emission lifetimes are also determined. The sample emission energy values and the sample emission lifetime values may then be subtracted from the corresponding reference values to produce sample energy difference values and sample lifetime difference values. A determination can then be made as to whether or not the sample emission energy difference values, the sample lifetime difference values, or both, are non-zero numbers in excess of the signal to noise ratio of the measurements. Preferably, a catalyst precursor may be considered activated by a support bound activator when the sample lifetime difference value is a positive number (i.e., the sample emission lifetime value is less than the corresponding reference emission lifetime value), and the sample emission energy difference value is a positive number (i.e., the sample emission energy is less than the reference emission energy.

In one embodiment, the boron containing Lewis acid of the present invention may be adjudged not to be activated in the presence of a pre-catalyst and a support bound activator when the sample emission energy difference value and the sample lifetime difference value associated with the combination of the support bound activator and the pre-catalyst is a non-zero number, and when the sample emission energy difference value and the sample lifetime difference value associated with the combination of the boron containing Lewis acid capping agent in combination with the pre-catalyst is essentially zero.

In another embodiment, the boron containing Lewis acid of the present invention may be adjudged as partially activated in the presence of a pre-catalyst and a support bound activator when the sample emission energy difference value and the sample lifetime difference value associated with the combination of the support bound activator and the pre-catalyst is a non-zero number, and when the two or more sample emission energy difference values and two or more sample lifetime difference value associated with the combination of the boron containing Lewis acid capping agent in combination with the pre-catalyst exist, one or more being a non-zero value, and one being essentially zero.

In another embodiment, the boron containing Lewis acid of the present invention may be adjudged as activated in the presence of a pre-catalyst and a support bound activator when the sample emission energy difference value and the sample lifetime difference value associated with the combination of the support bound activator and the pre-catalyst is a non-zero number, and when sample emission energy difference values the sample lifetime difference value associated with the combination of the boron containing Lewis acid capping agent in combination with the pre-catalyst are non-zero values.

In another embodiment, activation of the catalyst occurs when the sample emission energy difference value, the sample lifetime difference value, or both, may exceed a predetermined emission energy difference value and a predetermined lifetime difference value, respectively. In still a more preferred embodiment, a sample adjudged to exceed a predetermined emission energy difference value and a predetermined lifetime difference value is considered to comprise an activated catalyst (i.e., a catalyst precursor which has been activated by an activator). In this preferred embodiment, a sample adjudged not to exceed a predetermined emission energy difference value and a predetermined lifetime difference value may not be considered to comprise a catalyst precursor activated by an activator.

The predetermined difference value is determined relative to the catalyst system in which the measurement is being made. For catalyst systems comprising a metallocene catalyst precursor, a support bound activator, and/or a boron-containing Lewis acid capping agent of the present invention, the emission energy difference between this activated catalyst system and the corresponding metallocene reference is preferably greater than or equal to about 100 cm$^{-1}$, when analyzed according to the procedure disclosed by Brant. More preferably, the sample emission energy difference value is greater than or equal to about 200 cm$^{-1}$, still more preferably greater than or equal to about 250 cm$^{-1}$.

Also, when analyzed according to the procedure disclosed by Brant, activation of the catalyst precursor may occur when the sample emission lifetime difference value is greater than or equal to about 0.05 milliseconds (msec.), more preferably greater than or equal to about 0.1 msec., still more preferably greater than or equal to about 0.15 msec.

In an embodiment, the sample emission energy difference value may preferably be greater than or equal to about 100 cm$^{-1}$ and the sample emission lifetime difference value may preferably be greater than or equal to about 0.05 msec., more preferably greater than or equal to about 200 cm$^{-1}$, and 0.1 msec. respectively, with greater than or equal to about 250 cm$^{-1}$, and 0.15 msec. being especially preferred.

In a preferred embodiment, determination of an analyte emission energy and the corresponding lifetime associated with a maximum output value in the spectrum of the analyte may be made using a combination of 2-D Luminescence spectra plotted in the various plots as described by Brant and as shown in FIG. 1. Preferably, in the 2D-luminescence contour-plot, the bottom left horizontal direction is the luminescence emission lifetime axis 12, while the vertical direction is the luminescence emission energy axis 11 (in wavenumbers, 10$^3$ cm$^{-1}$). In this format, the intensity of the luminescence emission energy (not shown) is perpendicular to the page; the relation between luminescence emission energy and the intensity may be shown in a legend code 14 of the plot located at the top right of this preferred layout.

As shown in FIG. 1, as well as in FIGS. 2–5 of the instant disclosure, the top left portion 15, the Lifetime profile, as well as the bottom right portion 16, the Luminescence profile show spectral profiles (also referred to herein as plots) of the 2D-Luminescence. The Lifetime profile 15 preferably represents integration along the wavenumbers (energy) with summation of intensities in the vertical direction of 2D-Luminescence data. In other words, the vertical is the integrated intensity 11, versus the luminescence emission lifetimes 12 in the horizontal direction.

The maxima 17 in the data plots are preferably the values of the intensity plots where the corresponding peaks are observed (e.g., first derivative equal to zero). More than one maximum 17 may be present in the data plots, which may indicate a plurality of species and/or partial activation of a catalyst.

Figure 2:
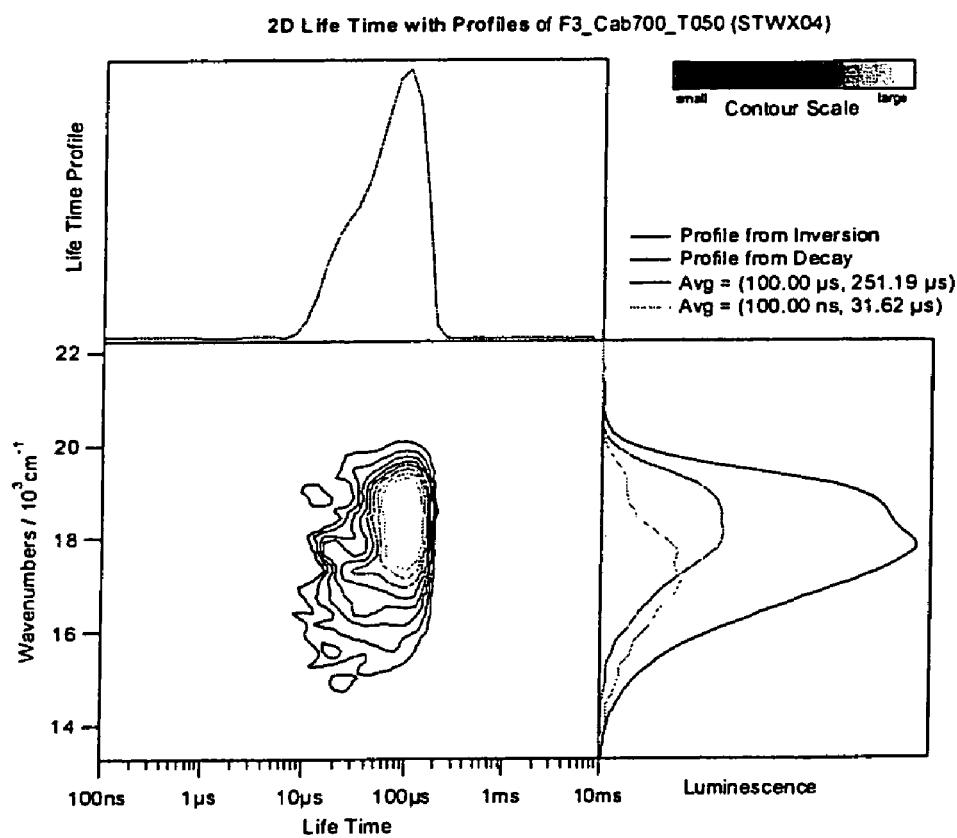
FIG. 2 shows a time resolved luminescence data plot of a reference catalyst precursor in combination with a silica support.

Turning now to FIG. 2, a reference spectra for metallocene A and a silica support (Cab-O-Sil 700) is shown. The reference emission energy is about 1750 and about 1900 cm−1 and the reference emission lifetime is about 100 microseconds. The structure of metallocene A is:

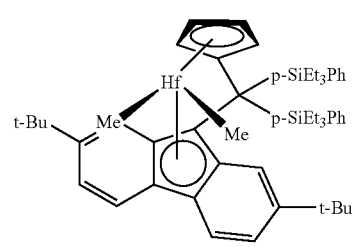

F3

Figure 3:
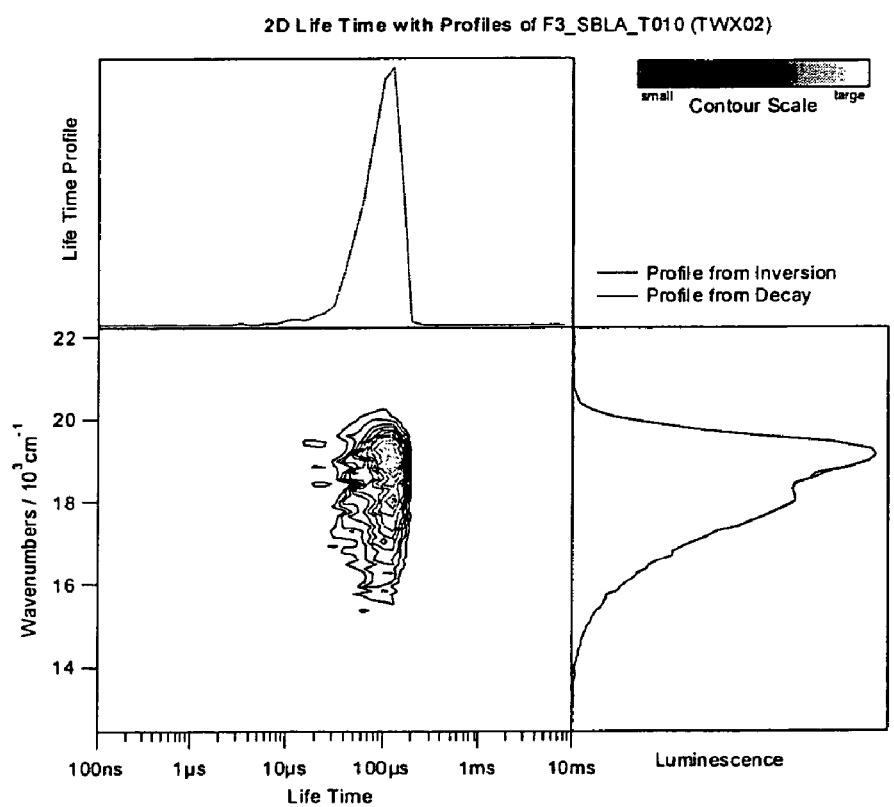
FIG. 3 shows a time resolved luminescence data plot of a catalyst precursor and a support bound Lewis acid of the present invention, in combination with a silica support.

FIG. 3 depicts metallocene A in combination with a support bound boron containing Lewis acid of the present invention, namely bis(perfluorophenyl) borane. The spectra depicts one major peak having a sample emission energy of about 1900 cm−1 and a sample emission lifetime of about 100 microseconds. Accordingly, the sample emission energy difference value and the lifetime difference value are each essentially zero. As such, the data shows that the present invention comprising the boron containing Lewis acid in combination with the support is not activated by the catalyst precursor and as such, is not substantially involved in polymerization when a catalyst comprising this combination is employed in a polymerization process.

Figure 4:
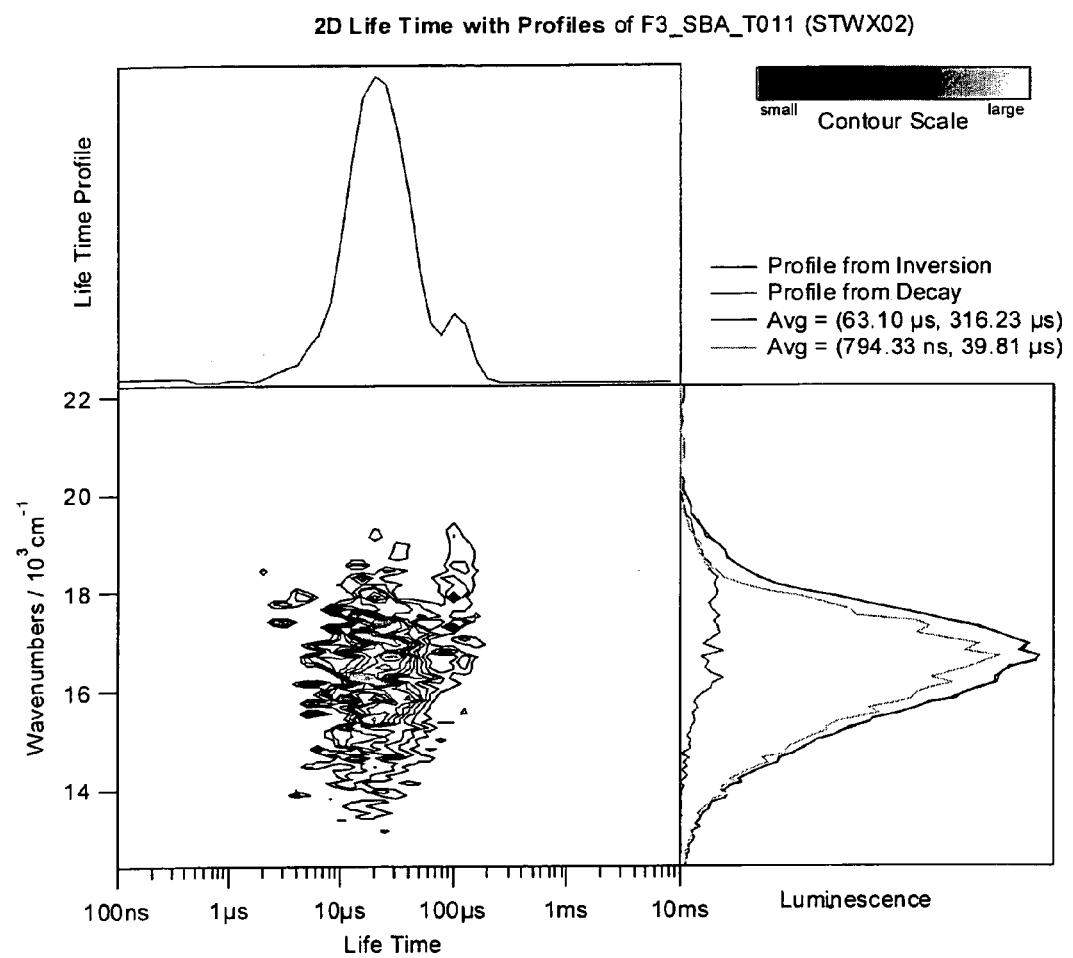
FIG. 4 shows a time resolved luminescence data plot of a comparative catalyst precursor and a support bound activator, in combination with a silica support.

FIG. 4 shows a comparative example comprising a metallocene A in combination with a support bound activator, namely dimethylaniliniumperfluorotetraphenylborate. The spectra depicts a sample emission energy of about 1650 cm−1 and a sample emission lifetime of about 20 microseconds. The sample emission energy difference value is about 250 cm−1 and the lifetime difference value is about 80 microseconds. Accordingly both are each essentially non-zero values indicating activation of the catalyst precursor by the support bound activator.

Figure 5:
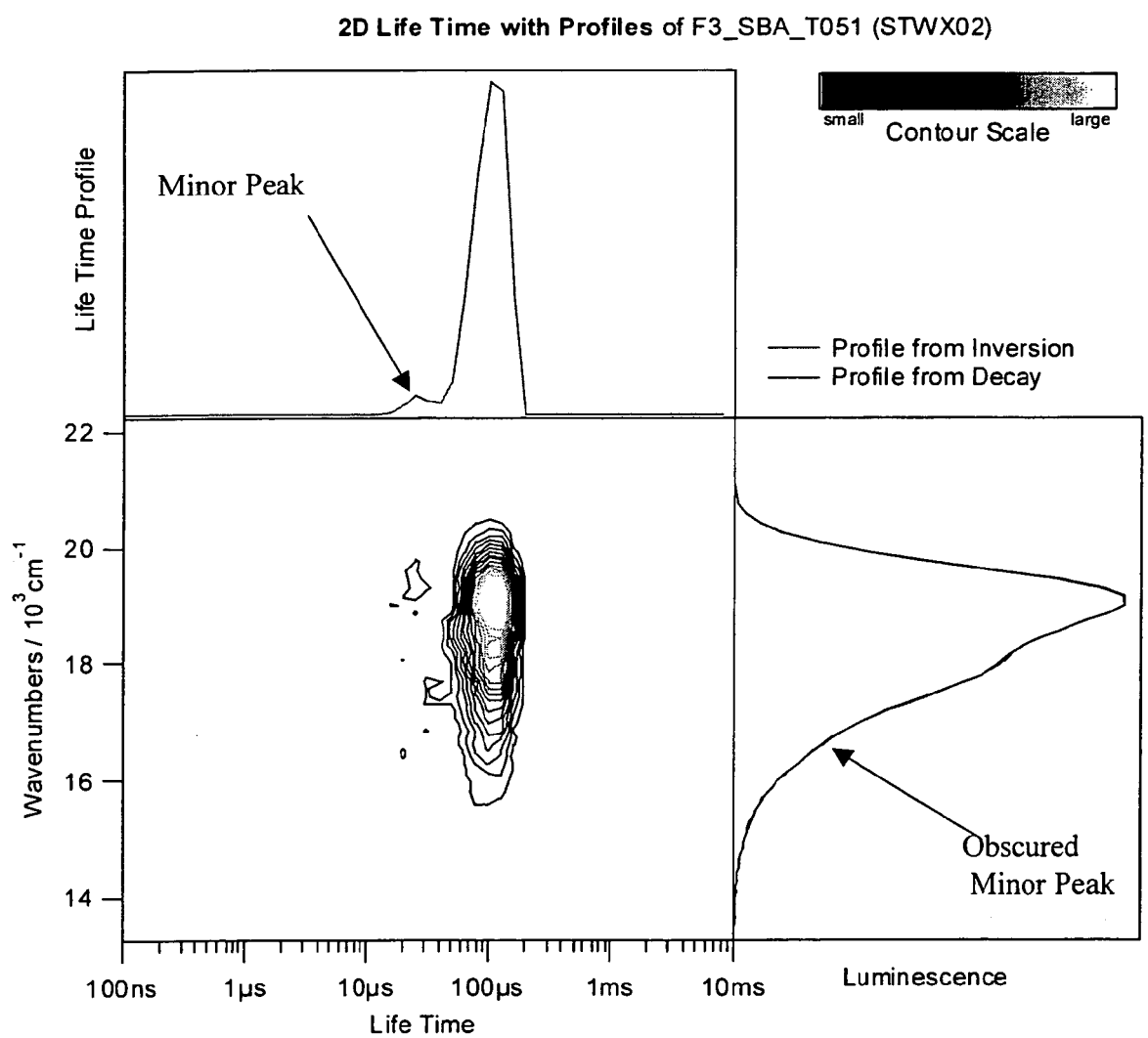
FIG. 5 shows a time resolved luminescence data plot of a catalyst precursor, an activator, and a support bound Lewis acid of the present invention, in combination with a silica support.

FIG. 5 shows the combination of metallocene A in combination with the above support bound activator and the above support bound boron containing Lewis acid capping agent of the present invention. The spectra shows a sample emission energy having one major peak at 1900 cm−1 and a sample emission lifetime of about 100 microseconds. The spectra also shows a smaller peak having a sample emission lifetime of about 20 microseconds, which may be assigned to the activated metallocene from the SBA present in the capped catalyst system. The sample emission energy of the activated metallocene SBA combination present is partially obscured in an unresolved peak in the spectra, but may be assigned a value of about 1650 based on the point of inflection in the data. The data values are presented in tabular form below:

TABLE 1

Spectroscopic Comparison of Support Bound Activator and Support Bound Lewis Acid with Metallocene Catalyst Precursor

| FIG. | Sample | Emission Energy (cm$^{-1}$) | Emission Lifetime (μsec.) | Emission Energy Difference (cm$^{-1}$) | Emission Lifetime Difference (μsec.) |
|---|---|---|---|---|---|
| 2 | A/Silica Reference | 1900 | 100 | N/A | N/A |
| 3 | A/SBLA/Silica | 1900 | 100 | 0 | 0 |
| 4 | Comparative A/SBA/Silica | 1650 | 20 | 250 | 80 |
| 5 | A/SBA/SBLA/ Silica Major peak | 1900 | 100 | 0 | 0 |
| 5 | A/SBA/SBLA/ Silica Minor peak | 1650 | 20 | 250 | 80 |

Accordingly, when measured according to the method disclosed in the above referenced patent application, the SBA does form a catalyst system (an active complex) with this particular metallocene. However, the boron containing Lewis acid in combination with the support (SBLA), either alone, or in combination with the SBA does not form a catalyst system with this particular metallocene catalyst.

Monomers

The catalyst system of this invention may be used to polymerize or oligomerize any unsaturated monomer or monomers. Preferred monomers include $C_2$ to $C_{100}$ olefins, more preferably $C_2$ to $C_{60}$ olefins, still more preferably $C_2$ to $C_{40}$ olefins, with preferably $C_2$ to $C_{20}$ olefins still more preferred, and $C_2$ to $C_{12}$ olefins being most preferred. In some embodiments monomers include linear, branched or cyclic alpha-olefins, preferably $C_2$ to $C_{100}$ alpha-olefins, more preferably $C_2$ to $C_{60}$ alpha-olefins, still more preferably $C_2$ to $C_{40}$ alpha-olefins, with $C_2$ to $C_{20}$ alpha-olefins being more preferred, and $C_2$ to $C_{12}$ alpha-olefins most preferred. Examples of preferred olefin monomers include one or more of ethylene, propylene, butene, pentene, hexene, heptene, octene, nonene, decene, dodecene, 4-methyl-pentene-1,3-methyl pentene-1,3,5,5-trimethyl hexene 1, and 5-ethyl-1-nonene.

The polymer produced herein may be a copolymer of one or more linear or branched $C_3$ to $C_{30}$ prochiral alpha-olefins, or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to about 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer may further comprise at least one polymerizable double bond such that after polymerization, the aromatic structure will be pendant from the polymer backbone. The aromatic-group containing monomer may further be substituted with one or more hydrocarbyl groups including, but not limited to, $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene, and allyl benzene.

Non-aromatic cyclic group containing monomers are also preferred. These monomers can contain up to about 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane, and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. Particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins, with or without substituents at various ring positions.

Non-limiting examples of preferred polar unsaturated monomers include 6-nitro-1-hexene, N-methylallylamine, N-allylcyclopentylamine, N-allyl-hexylamine, methyl vinyl ketone, ethyl vinyl ketone, 5-hexen-2-one, 2-acetyl-5-norbornene, 7-syn methoxymethyl-5-norbornen-2-one, acrolein, 2,2-dimethyl-4-pentenal, undecylenic aldehyde, 2,4-dimethyl-2,6-heptadienal, acrylic acid, vinylacetic acid, 4-pentenoic acid, 2,2-dimethyl-4-pentenoic acid, 6-heptenoic acid, trans-2,4-pentadienoic acid, 2,6-heptadienoic acid, nona-fluoro-1-hexene, allyl alcohol, 7-octene-1,2-diol, 2-methyl-3-buten-1-ol, 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo[9.5.1.13,9.15,15.17,13]octasiloxane, 2-benzoyl-5-norbornene, allyl 1,1,2,2,-tetrafluoroethyl ether, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, allyl disulfide, ethyl acrylate, and methyl acrylate.

For purposes of this disclosure, the term oligomer refers to compositions having 2–75 mer units and the term polymer refers to compositions having 76 or more mer units. A mer is defined as a unit of an oligomer or polymer that originally corresponded to the olefin(s) used in the oligomerization or polymerization reaction. For example, the mer of polyethylene would be ethylene.

The process described herein may be used to produce an oligomer of any of the monomers listed above. Preferred oligomers include oligomers of any $C_2$ to $C_{20}$ olefins, preferably $C_2$ to $C_{12}$ alpha-olefins, most preferably oligomers comprising ethylene, propylene and or butene are prepared. A preferred feedstock for the oligomerization process is the alpha-olefin, ethylene. Other alpha-olefins, including but not limited to propylene and 1-butene, may also be used alone or combined with ethylene. Preferred alpha-olefins include any $C_2$ to $C_{40}$ alpha-olefin, preferably and $C_2$ to $C_{20}$ alpha-olefin, preferably any $C_2$ to $C_{12}$ alpha-olefin, preferably ethylene, propylene, and butene, most preferably ethylene. Dienes may be used in the processes described herein, preferably alpha, omega-dienes are used alone or in combination with mono-alpha olefins.

The process described herein may be used to produce homopolymers or copolymers. As used herein, a copolymer may comprise two, three, four or more different monomer units. Preferred polymers produced herein include homopolymers or copolymers of any of the above monomers. In a preferred embodiment the polymer is a homopolymer of any $C_2$ to $C_2$ alpha-olefin. The polymer may be a homopolymer of ethylene or a homopolymer of propylene. In another embodiment the polymer is a copolymer comprising ethylene and one or more of any of the monomers listed above. In still another embodiment, the polymer is a copolymer comprising propylene and one or more of any of the monomers listed above. In a preferred embodiment, the copolymers comprise one or more diolefin comonomers, preferably one or more $C_2$ to $C_{40}$ diolefins.

The polymer produced herein may be a copolymer of ethylene and one or more $C_3$ to $C_{20}$ linear, branched or cyclic monomers, preferably one or more $C_3$ to $C_{12}$ linear, branched or cyclic alpha-olefins. Preferably, the polymer produced herein is a copolymer of ethylene and one or more of propylene, butene, pentene, hexene, heptene, octene, nonene, decene, dodecene, 4-methyl-pentene-1,3-methyl pentene-1, and 3,5,5-trimethyl hexene 1.

The polymer produced herein may be a copolymer of propylene and one or more $C_2$ or $C_4$ to $C_{20}$ linear, branched or cyclic monomers, preferably one or more $C_2$ or $C_4$ to $C_{12}$ linear, branched or cyclic alpha-olefins. The polymer produced herein may also be a copolymer of propylene and one or more of ethylene, butene, pentene, hexene, heptene, octene, nonene, decene, dodecene, 4-methyl-pentene-1,3-methyl pentene-1, and 3,5,5-trimethyl hexene 1.

The copolymers described herein may comprise at least 50 mole % of a first monomer and up to 50 mole % of other monomers. In another embodiment, the polymer comprises: a first monomer present at from 40 to 95 mole %, preferably 50 to 90 mole %, preferably 60 to 80 mole %; a comonomer present at from 5 to 40 mole %, preferably 10 to 60 mole %, more preferably 20 to 40 mole %; and a termonomer present at from 0 to 10 mole %, more preferably from 0.5 to 5 mole %, more preferably 1 to 3 mole %.

In a preferred embodiment, the first monomer comprises one or more of any $C_3$ to $C_8$ linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, cyclohexene, cyclooctene, hexadiene, cyclohexadiene and the like. The comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, un-decene, do-decene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene. The termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, un-decene, do-decene, hexadecene, butadiene, hexadiene, heptadiene, pentadiene, octadiene, nonadiene, decadiene, dodecadiene, styrene, 3,5,5-trimethyl hexene-1,3-methylpentene-1,4-methylpentene-1, cyclopentadiene, and cyclohexene.

The polymers described above may further comprise one or more dienes at up to about 10 weight %, preferably at 0.00001 to 1.0 weight %, preferably 0.002 to 0.5 weight %, even more preferably 0.003 to 0.2 weight %, based upon the total weight of the composition. In some embodiments, 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Oligomerization Processes

The catalyst compositions described above may be used to oligomerize or polymerize any unsaturated monomer, however they are preferably used to oligomerize olefins, typically alpha-olefins. In the instant oligomerization processes, the process temperature may be −100° C. to 300° C., −20° C. to 200° C., or 0° C. to 150° C. Some embodiments select oligomerization pressures (gauge) from 0 kPa–35 MPa or 500 kPa–15 MPa. In a preferred embodiment, conditions that favor oligomer production include using aluminum alkyls (as activator or scavenger, etc.) and/or selecting a nickel catalyst precursor where $Ar^1$ and or $Ar^2$ comprise phenyl and/or mesityl. A preferred feedstock for the oligomerization process is the alpha-olefin, ethylene. But other alpha-olefins, including but not limited to propylene and 1-butene may also be used alone or combined with ethylene. Preferred alpha-olefins include $C_2$ to $C_{40}$ alpha-olefins, preferably and $C_2$ to $C_{20}$ alpha-olefins, more preferably $C_2$ to $C_{12}$ alpha-olefins, with ethylene, propylene, and butene, being preferred and ethylene being most preferred. Dienes may be used in the processes described herein, preferably alpha, omega-dienes, used alone or in combination with mono-alpha olefins.

Oligomerization processes may be run in the presence of various liquids, particularly aprotic organic liquids. A supported (heterogeneous) catalyst system may also be used, but will form a slurry rather than a solution. Suitable liquids for both homogeneous and heterogeneous catalyst systems include alkanes, alkenes, cycloalkanes, selected halogenated hydrocarbons, aromatic hydrocarbons, hydrofluorocarbons, and combinations thereof. Preferred solvents include hexane, toluene, cyclohexane, benzene, and combinations comprising at least one of the foregoing.

The catalyst precursor described herein may also be used to obtain mixtures of alpha-olefins containing desirable numbers of carbon atoms. Factor K from the Schulz-Flory theory (see for instance B. Elvers, et al., Ed. Ullmann's Encyclopedia of Industrial Chemistry, Vol. A13, VCH Verlagsgesellschaft mbH, Weinheim, 1989, p. 243–247 and 275–276) serves as a measure of these α-olefins' molecular weights. From this theory, $K=n(C_{n+2} \text{ olefin})/n(C_n \text{ olefin})$, where $n(C_n \text{ olefin})$ is the number of moles of olefin containing n carbon atoms, and $n(C_{n+2} \text{ olefin})$ is the number of moles of olefin containing n+2 carbon atoms, or in other words the next higher oligomer of $C_n$ olefin. From this can be determined the weight (mass) fractions of the various olefins in the resulting product. The ability to vary this factor provides the ability to choose the then-desired olefins.

Alpha-olefins produced herein may be further polymerized with other olefins to form more oligomers or even form homopolymers and copolymers of the alpha olefins produced. These polymers may be made by a number of known methods, such as Ziegler-Natta-type polymerization, metallocene catalyzed polymerization, and other methods, see for instance WO 96/23010, see for instance Angew. Chem., Int. Ed. Engl., vol. 34, p. 1143–1170 (1995); European Patent Application, 416,815; and U.S. Pat. No. 5,198,401 for information about metallocene-type catalysts, and J. Boor Jr., Ziegler-Natta Catalysts and Polymerizations, Academic Press, New York, 1979 and G. Allen, et al., Ed., Comprehensive Polymer Science, Vol. 4, Pergamon Press, Oxford, 1989, pp. 1–108, 409–412 and 533–584, for information about Ziegler-Natta-type catalysts, and H. Mark, et al., Ed., Encyclopedia of Polymer Science and Engineering, Vol. 6, John Wiley & Sons, New York, 1992, p. 383–522, for information about polyethylene. Preferred oligomerization processes include oligomerizing ethylene to $C_4$–$C_{26}$ linear alpha-olefins.

Oligomers produced herein may be used as polyolefin feed stocks. They may be used as a mixture of olefins alone, as a mixture of olefins added to other olefins, or they may be separated into fractions and then used alone or in combination with other olefins to form polyolefins. Additionally, alpha-olefins produced herein may be converted to alcohols by known processes, these alcohols being useful for a variety of applications such as intermediates for detergents or plasticizers. Typical processes for the conversion of alpha-olefins to alcohols include, but are not limited to the oxo process followed by hydrogenation, or by a modified, single-step oxo process (the modified Shell process), see for instance B. Elvers, et al., Ed., Ullmann's Encyclopedia of Chemical Technology, 5th Ed., Vol. A18, VCH Verlagsgesellschaft mbH, Weinheim, 1991, p. 321–327.

Polymerization Processes

One or more catalyst systems as described herein, and one or more monomers are contacted to produce an oligomer or polymer. The components may be contacted in a solution, bulk, gas, or slurry polymerization process or a combination thereof. Thus, this invention further relates to a process to produce the polymers described above comprising contacting one or more catalyst systems comprising the herein-described catalyst precursor, and one or more monomers. In another embodiment the one or more catalyst systems and one or more monomers, are contacted to produce an oligomer or polymer.

In general the combined catalyst and the catalyst precursor are combined in ratios of about 1:10,000 to about 1:1, in other embodiments the combined catalyst and the catalyst precursor are combined in ratios of 1:1 to 100:1. When alumoxane or aluminum alkyl activators are used, the combined capped support-to-activator molar ratio is from 1:5000 to 10:1, alternatively from 1:1000 to 10:1; alternatively, 1:500 to 2:1; or 1:300 to 1:1. When ionizing activators are used, the combined capped support-to-activator molar ratio is from 10:1 to 1:10; 5:1 to 1:5; 2:1 to 1:2; or 1.2:1 to 1:1. Multiple activators may also be used, including using mixtures of alumoxanes or aluminum alkyls with ionizing activators.

One or more reactors in series or in parallel may be used in the present invention. Catalyst component and activator may be delivered as a slurry, either separately to the reactor, activated in-line just prior to the reactor, or preactivated and pumped to the reactor. A preferred operation is two solutions activated in-line. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

Ethylene-alpha-olefin (including ethylene-cyclic olefin and ethylene-alpha-olefin-diolefin) elastomers of high molecular weight and low crystallinity can be prepared utilizing the catalysts of the invention under traditional solution processes or by introducing ethylene gas into a slurry utilizing the alpha-olefin or cyclic olefin or mixture thereof with other monomers, polymerizable and not, as a polymerization diluent in which the catalyst suspension is suspended. Typical ethylene pressures will be between 10 and 1000 psig (69–6895 kPa) and the polymerization diluent temperature will typically be between –10 and 160° C. The process can be carried out in a stirred tank reactor or a tubular reactor, or more than one operated in series or in parallel. See the general disclosure of U.S. Pat. No. 5,001, 205 for general process conditions. All documents are incorporated by reference for description of polymerization processes, ionic activators and useful scavenging compounds.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment when high-density polyethylene is desired then the reactor temperature is typically between 70 and 105° C.

The productivity of the catalyst or catalyst system in a gas phase system is influenced by the partial pressure of the main monomer. The preferred mole percent of the main monomer, ethylene or propylene, preferably ethylene, is from about 25 to 90 mole percent and the comonomer partial pressure is in the range of from about 138 kPa to about 517 kPa, preferably about 517 kPa to about 2069 kPa, which are typical conditions in a gas phase polymerization process. Also in some systems the presence of comonomer can increase productivity.

In a preferred embodiment, the reactor utilized in the present invention is capable of producing more than 500 lbs of polymer per hour (227 Kg/hr) to about 200,000 lbs/hr (90,900 Kg/hr) or higher, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421, all of which are herein fully incorporated by reference.

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process should be operated above the reaction diluent critical temperature and pressure. Preferably, a hexane or an isobutane medium is employed.

Useful polymerization techniques include those referred to as particle form polymerization, or slurry process, where the temperature is kept below the temperature at which the polymer goes into solution. Such technique are known, and described in for instance, in U.S. Pat. No. 3,248,179, which is fully incorporated herein by reference. The preferred temperature in the particle form process is within the range of about 85° C. to about 100° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

The slurry process may be carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low-pressure flash vessel, rotary dryer and a nitrogen purge column in sequence for removal of the isobutane diluent and all unreacted monomer and comonomers. The resulting hydrocarbon free powder is then compounded for use in various applications.

The reactor used in the slurry process of the invention may be capable of producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Using the slurry process of the invention, the total reactor pressure may be in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In the slurry process of the invention, the concentration of predominant monomer in the reactor liquid medium may be in the range of from about 1 to 10 weight percent, preferably from about 2 to about 7 weight percent, more preferably from about 2.5 to about 6 weight percent, most preferably from about 3 to about 6 weight percent.

The process, preferably a slurry or gas phase process may be operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference. The process described herein may also be run with scavengers. Typical scavengers include trimethyl aluminum, tri-isobutyl aluminum and an excess of alumoxane or modified alumoxane.

Bulk Phase Polymerization

The catalysts described herein can be used advantageously in bulk phase processes. Generally this involves polymerization in a continuous reactor in which the polymer formed and the starting monomer and catalyst materials supplied, are agitated to reduce or avoid concentration gradients. Suitable processes operate above the melting point of the polymers at high pressures (i.e., from about 1 to about 3000 bar (10–30,000 MPa)), in which the monomer acts as diluent or in solution polymerization using a solvent.

Temperature control in the reactor is obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 0° C. and about 160° C., more preferably from about 10° C. to about 140° C., and most preferably from about 40° C. to about 120° C. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1–16,000 MPa), most preferably from 1.0 to 500 bar (10–5000 MPa).

Each of these processes may also be employed in a single reactor, or in a parallel or series reactor configuration. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling and the monomer feed my or may not be refrigerated. See the general disclosure of U.S. Pat. No. 5,001,205 for general process conditions. See also, international application WO 96/33227 and WO 97/22639.

Polymers Produced

The polymers produced herein, particularly the ethylene homopolymers and copolymers, may have a weight average molecular weight (Mw) of 25,000 to 500,000. The polymers produced herein, particularly the ethylene homopolymers and copolymers, may also have a molecular weight distribution (Mw/Mn) of up to 5, more preferably of up to 4 more preferably from 1.1 to 3, more preferably from 1.1 to 2.

Polymers or oligomers produced by this invention may be functionalized. Preferred functional groups include maleic acid and maleic anhydride. By functionalized is meant that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. More preferably, the organic compound contains an ethylenic unsaturation conjugated with a carbonyl group (—C=O). Examples include maleic, fumaric, acrylic, methacrylic, itaconic, crotonic, alpha.methyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride.

EXAMPLES

Example 1

Catalyst with Capped Silica

Silica (320.96 grams) which had been calcined at 600° C. for 4 hours was suspended in anhydrous toluene. A toluene solution of the capping reagent (HB($C_6F_5$)$_2$, 22.2 grams) was added to the silica suspension. Gas is evolved upon addition of the borane capping agent. A toluene solution of diethylaniline or DEA (4.6 grams) and the activator tris (pentafluorophenyl)borane (16.4 grams) was added to the capped silica suspension. This mixture was allowed to stir for 30 minutes. The catalyst precursor was added as a toluene suspension/solution Me$_2$(2-Me-4-Ph-indenyl)ZrMe$_2$ (4.7 grams). The mixture was stirred for 30 minutes. The solvent removed and the remaining solids placed under vacuum for 48 hours. The supported catalysts system was suspended in mineral oil in order to generate a 10% by weight suspension.

Comparative Example 2

Catalyst without Capped Silica

In order to demonstrate the value of the capping reagent in connection with higher activity as discussed in this invention, a comparative example was conducted without the addition of the capping reagent. Accordingly, Silica (2.69 grams) which has been calcined at 600° C. for 4 hours was suspended in anhydrous toluene. A toluene solution of diethylaniline or DEA (0.04 grams) and the activator, tris (pentafluorophenyl)borane (0.137 grams) was added to the silica suspension. This mixture was allowed to stir for 30 minutes. The catalyst precursor was added as a toluene suspension/solution Me$_2$(2-Me-4-Ph-indenyl)ZrMe$_2$ (0.039 grams). The mixture was stirred for 30 minutes. The solvent removed and the remaining solids placed under vacuum for 4 hours. The supported catalysts system was suspended in mineral oil in order to generate a 10% by weight suspension.

Polymerization

Prior to each run the 2 liter batch bulk liquid polymerization reaction vessel was checked for leaks, heat purged with nitrogen, cooled to room temperature, and purged three times with nitrogen. Next, the reactor was charged with hydrogen and 0.5 mL of TEAL (1.0 M tri-ethylaluminum in hexane). The reactor was then filled with 1000 mls propylene under agitation and temperature controlled to about 70° C. The catalyst was then charged to the reactor along with about 250 mls propylene. The reaction was allowed to continue for 1 hour prior to venting and cooling to stop the reaction.

Modified Catalyst / Polymer Analysis

|  | Example 1 Capped Silica | Comparative Example 2 Non Capped Silica |
|---|---|---|
| Catalyst amt (g) | 1.025 (107.6 mgs) | 1.005 (104.5 mgs) |
| Yield (g) | 369.6 | 140.2 |
| Catalyst efficiency (g/g) | 3435 | 1342 |
| Bulk Density (g/cc) | 0.336 | 0.358 |
| Melt Flow rate (dg/min) ASTM 1238 2.16 kg, 190° C. | 10.4 | 82.9 |
| Tc DSC (Cryst) (° C.) | 109.07 | 110.67 |
| Tm DSC (2nd melt) (° C.) | 151.57 | 151.90 |
| Mw | 314381 | 120310 |
| Mn | 75808 | 46548 |
| Mw/Mn | 4.15 | 2.58 |

Accordingly, Example 1, the catalyst utilizing the silica capped with a capping agent comprising boron, produced yields nearly double that of Comparative Example 2.

For purposes of this invention and the claims thereto:
1. Bulk Density is measured as follows; the resin is poured via a ⅞" diameter funnel into a fixed volume cylinder of 400 cc; the bulk density is measured as the weight of resin in the cylinder divided by the 400 cc to give a value in g/cc.
2. Peak melting point (Tm) and peak crystallization temperature (Tc) are determined using the following procedure according to ASTM E 794-85. Differential scanning calorimetric (DSC) data is obtained using a TA Instruments model 2920 machine. Samples weighing approximately 7–10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded.
3. Molecular weights (number average molecular weight (Mn) and weight average molecular weight (Mw)), are determined using a Waters 150 Size Exclusion Chromatograph (SEC) equipped with a differential refractive index detector (DRI), an online low angle light scattering (LALLS) detector and a viscometer (VIS). The details of the detector calibrations have been described elsewhere [Reference: T. Sun, P. Brant, R. R. Chance, and W. W. Graessley, *Macromolecules*, Volume 34, Number 19, 6812–6820, (2001)].

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

Accordingly, disclosed herein is:

1 a. A catalyst support comprising the result of the combination of:
(a) a support comprising hydroxyl groups;
(b) a capping agent comprising a boron containing Lewis acid; and
(c) an ionic activator, wherein at least some of the capping agent does not form a support bound activator.

2a. The catalyst support of 1a, wherein the support comprising hydroxyl groups comprises silica.

3a. The catalyst support of 1a to 2a, wherein the support comprising hydroxyl groups comprises silica calcined at about 400° C. to about 700° C. for a time less than or equal to about 12 hours.

4a. The catalyst support of 1a to 3a, wherein the support comprising hydroxyl groups comprises silica calcined in the presence of a fluorine source.

5a. The catalyst support of 1a to 4a, wherein the fluorine source is a fluoride salt.

6a. The catalyst support of 1a to 5a, wherein the support comprises less then or equal to about 0a.1 millimole Si—OH functional groups per gram of support.

7a. The catalyst support of 1a to 6a, wherein the support comprises less then or equal to about 0a.05 millimoles Si—OH functional groups per gram of support.

8a. The catalyst support of 1a to 7a, wherein the support comprises less then or equal to about 0a.001 millimoles Si—OH functional groups per gram of support.

9a. The catalyst support of 1a to 8a, wherein the support comprises a plurality of particles, each particle having a plurality of pores arranged within the particle such that a surface of the pores defines an inner surface of the particle located internal to an outer surface of the particle, and wherein a concentration of Si—OH functional groups disposed on the inner surface of the particle is greater than a concentration of Si—OH functional groups disposed on the outer surface of the particle.

10a. The catalyst support of 1a to 9a, wherein the capping agent comprises $R^1R^2BH$, and wherein $R^1$ and $R^2$ are independently at each occurrence an organic radical comprising: $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl, $C_7$–$C_{40}$-haloarylalkyl, or a combination comprising at least one of the foregoing.

11a. The catalyst support of 1a to 10a, wherein $R^1$ and $R^2$ are independently at each occurrence an organic radical comprising pentafluorophenyl, nonafluoroanthracenyl, undecafluorotetrahydronaphthyl, nonafluorofluorenyl, 2,3,4,6-tetrafluorophenyl, 2,3,5,6-tetrafluorophenyl, 2,3,5-trifluorophenyl, 2,4,6-trifluorophenyl, 1,3-difluorophenyl, 2,3,5,6-tetrafluoro-4-methylphenyl, 2,3,4,6-tetrafluoro-5-methylphenyl, 2,4,5-trifluoro-6-methylphenyl, 2,3,6-trifluoro-4-methylphenyl, 2,4,6-trifluoro-3-methylphenyl, 2,6-difluoro-3-methylphenyl, 2,4-difluoro-5-methylphenyl, 3,5-difluoro-2-methylphenyl, 4-methoxy-2,3,5,6-tetrafluorophenyl, 3-methoxy-2,4,5,6-tetrafluorophenyl, 2-methoxy-3,5,6-trifluorophenyl, 3-methoxy-2,5,6-trifluorophenyl, 3-methoxy-2,4,6-trifluorophenyl, 2-methoxy-3,5-difluorophenyl, 3-methoxy-2,6-difluorophenyl, 3-methoxy-4,6-difluorophenyl, 2-methoxy-4,6-difluorophenyl, 4-methoxy-2,6-difluorophenyl, or a combination comprising at least one of the foregoing.
12a. The catalyst support of 1a to 11a, wherein the capping agent comprises bis(perfluorophenyl) borane.
13a. The catalyst support of $_1$a to 12a, wherein the ionic activator comprises boron.
14a. The catalyst support of 1a to 13a, wherein the ionic activator comprises an ammonium salt.
15a. The catalyst support of 1a to 14a, wherein the ionic activator comprises:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium)tetrakis(pentafluorophenyl) borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluoro-phenyl) borate,
N,N-dimethyl-(2,4,6-trimethylanilinium)tetrakis-(2,3,4,6-tetrafluorophenyl) borate,
di-(i-propyl)ammonium tetrakis(pentafluorophenyl) borate,
dicyclohexylammonium tetrakis(pentafluorophenyl) borate,
triphenylphosphonium tetrakis(pentafluorophenyl) borate,
tri(o-tolyl)phosphonium tetrakis(pentafluorophenyl) borate,
tri(2,6-dimethylphenyl)phosphonium tetrakis(pentafluorophenyl) borate, or a
combination comprising at least one of the foregoing activators.
16a. The catalyst support of 1a to 15a, wherein the ionic activator comprises N,N-dimethylanilinium tetrakis (pentafluorophenyl)borate, triphenylcarbenium tetrakis (pentafluorophenyl)borate, or a combination comprising at least one of the foregoing.
17a. The catalyst support of 1a to 16a, wherein essentially all of the capping agent does not form a support bound activator.
18a. A catalyst system comprising a catalyst support and a catalyst, the catalyst support comprising the result of the combination of:
(a) a support comprising hydroxyl groups;
(b) a capping agent comprising a boron containing Lewis acid; and
(c) an ionic activator, wherein at least some of the capping agent does not form a support bound activator.
19a. The catalyst system of 18a, wherein the catalyst comprises a metallocene.
20a. The catalyst system of 18a to 19a, wherein the catalyst comprises:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-pentadienyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
pentamethylcyclopentadienyltitaniumdimethylchloride,
$\eta^5$-2,4-dimethyl-1,3-pentadienyl)titaniumtrimethyl,
octahydrofluorenyltitaniumtrimethyl,
tetrahydroindenyltitaniumtrimethyl,
etrahydrofluorenyltitaniumtrimethyl,
(1,1-dimethyl-2,3,4,9,10-.eta.-1,4,5,6,7,8-hexahydronaphthalenyl)titaniumtrimethyl,
(1,1,2,3-tetramethyl-2,3,4,9,10-.eta.-1,4,5,6,7,8-hexahydronaphthalenyl)titaniumtrimethyl,
(tert-butylamido)(tetramethyl-η5-cyclopentadienyl)dimethylsilanetitanium dichloride,
(tert-butylamido)(tetramethyl-η5-cyclopentadienyl)dimethylsilanetitanium dimethyl,
(tert-butylamido)(tetramethyl-η5-cyclopentadienyl)-1,2-ethanediyltitanium dimethyl,
(tert-butylamido)(tetramethyl-η5-indenyl)dimethylsilaL-netitanium dimethyl, (tert-butylamido)(tetramethyl-η5-cyclopentadienyl)dimethylsilane titanium (III) 2-(dimethylamino)benzyl;
(tert-butylamido)(tetramethyl-η5-cyclopentadienyl)dimethylsilanetitanium (III) allyl,
(tert-butylamido)(tetramethyl-η5-cyclopentadienyl)dimethylsilanetitanium (II) 1,4-diphenyl-1,3-butadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (IV) 1,3-butadiene,
(tert-butylamido)(2,3-dimethylindenyl)dimethylsilanetitanium (II) 1,4diphenyl-1,3-butadiene,
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methyl-4-phenylindenyl)dimethylsilanetitanium (II) 1,4-diphenyl-1,3-butadiene,
(tert-butylamido)(tetramethyl-η5-cyclopentadienyl)dimethylsilanetitanium (IV) 1,3-butadiene,
(tert-butylamido)(tetramethyl-η5-cyclopentadienyl)dimethylsilanetitanium (II) 1,4-dibenzyl-1,3-butadiene, (tert-butylamido)(tetramethyl-η5-cyclopentadienyl)dimethylsilanetitanium (II) 2,4-hexadiene,
(tert-butylamido)(tetramethyl-η5-cyclopentadienyl)dimethylsilanetitanium (II) 3-methyl-1,3-pentadiene,
(tert-butylamido)(2,4-dimethyl-1,3-pentadien-2-yl)dimethylsilanetitaniumdimethyl,
(tert-butylamido)(1,1-dimethyl-2,3,4,9,10-.eta.-1,4,5,6,7,8-hexahydronaphthalen-4-yl)dimethylsilanetitaniumdimethyl,
(tert-butylamido)(1,1,2,3-tetramethyl-2,3,4,9,10-.PI.-1,4,5, 6,7,8-hexahydronaphthalen-4-yl)dimethylsilanetitaniumdimethyl,
biscyclopentadienylzirconiumdimethyl,
biscyclopentadienyltitaniumdiethyl,
cyclopentadienyltitaniumdiisopropyl,
biscyclopentadienyltitaniumdiphenyl,
biscyclopentadienylzirconium dibenzyl,
biscyclopentadienyltitanium-2,4-pentadienyl,
biscyclopentadienyltitaniummethylmethoxide,
biscyclopentadienyltitaniummethylchloride,
bispentamethylcyclopentadienyltitaniumdimethyl,
bisindenyltitaniumdimethyl,
indenylfluorenyltitaniumdiethyl,
bisindenyltitaniummethyl(2-(dimethylamino)benzyl),
bisindenyltitaniummethyltrimethylsilyl,
bistetrahydroindenyltitaniummethyltrimethylsilyl,
bispentamethylcyclopentadienyltitaniumdiisopropyl,
bispentamethylcyclopentadienyltitaniumdibenzyl,
bispentamethylcyclopentadienyltitaniummethylmethoxide,
bispentamethylcyclopentadienyltitaniummethylchloride,
(dimethylsilyl-bis-cyclopentadienyl)zirconiumdimethyl,
(dimethylsilyl-bis-pentamethylcyclopentadienyl)titanium-2, 4-pentadienyl,
(dimethylsilyl-bis-t-butylcyclopentadienyl)zirconium-dichloride,
(methylene-bis-pentamethylcyclopentadienyl)titanium (III) 2-(dimethylamino)benzyl,
(dimethylsilyl-bis-indenyl)zirconiumdichloride,
(dimethylsilyl-bis-2-methylindenyl)zirconiumdimethyl,
(dimethylsilyl-bis-2-methyl-4-phenylindenyl)zirconiumdimethyl,
(dimethylsilyl-bis-2-methylindenyl)zirconium-1,4-diphenyl-1,3-butadiene,
(dimethylsilyl-bis-2-methyl-4-phenylindenyl)zirconium (II) 1,4-diphenyl-1,3-butadiene, dimethylsilyl-bis-tetrahydroindenyl)zirconium(II) 1,4-diphenyl-1,3-butadiene,
(dimethylsilyl-bis-fluorenyl)zirconiumdichloride,
(dimethylsilyl-bis-tetrahydrofluorenyl)zirconiumdi(trimethylsilyl),
(isopropylidene)(cyclopentadienyl)(fluorenyl)zirconiumdibenzyl,
(dimethylsilylpentamethylcyclopentadienylfluorenyl)zirconiumdimethyl,
or a combination thereof 21a. The catalyst system of 18a to 20a, wherein the catalyst comprises:
(tert-butylamido)(tetramethyl-η5-cyclopentadienyl)-1,2-ethanediylzirconium dimethyl,
(tert-butylamido)(tetramethyl-η5-cyclopentadienyl)-1,2-ethanediyltitanium dimethylbenzyl, (methylamido)(tetramethyl-η5-cyclopentadienyl)-1,2-ethanediylzirconium dibenzhydryl,
(methylamido)(tetramethyl-η5-cyclopentadienyl)-1,2-ethanediyltitanium dineopentyl, (ethylamido)(tetramethyl-η5-cyclopentadienyl)-methylenetitanium diphenyl,
(tert-butylamido)dibenzyl(tetramethyl-η5-cyclopentadienyl)silanezirconium dibenzyl,
(benzylamido)dimethyl(tetramethyl-η5-cyclopentadienyl) silanetitanium di(trimethylsilyl),
(phenylphosphido)dimethyl(tetramethyl-η5-cyclopentadienyl)silanezirconium dibenzyl, or a combination thereof.

22a. The catalyst system of 18a to 21a, wherein the support comprises a plurality of particles, each particle having a plurality of pores arranged within the particle such that a surface of the pores defines an inner surface of the particle located internal to an outer surface of the particle, and wherein a concentration of the catalyst disposed on the inner surface of the particle is greater than a concentration of the catalyst disposed on the outer surface of the particle.

23a. The catalyst system of 18a to 22a, wherein the support comprising hydroxyl groups comprises silica.

24a. The catalyst system of 18a to 23a, wherein the support comprising hydroxyl groups comprises silica calcined at about 400° C. to about 700° C. for a time less than or equal to about 12 hours.

25a. The catalyst system of 18a to 24a, wherein the support comprising hydroxyl groups comprises silica calcined in the presence of a fluorine source.

26a. The catalyst system of 18a to 25a, wherein the fluorine source is a fluoride salt.

27. The catalyst system of 18a to 26a, wherein the support comprises less then or equal to about 0a.1 millimole Si—OH functional groups per gram of support.

28a. The catalyst system of 18a to 27a, wherein the support comprises less then or equal to about 0a.05 millimoles Si—OH functional groups per gram of support.

29a. The catalyst system of 18a to 28a, wherein the support comprises less then or equal to about 0a.001 millimoles Si—OH functional groups per gram of support.

30a. The catalyst system of 18a to 29a, wherein the support comprises a plurality of particles, each particle having a plurality of pores arranged within the particle such that a surface of the pores defines an inner surface of the particle located internal to an outer surface of the particle, and wherein a concentration of Si—OH functional groups disposed on the inner surface of the particle is greater than a concentration of Si—OH functional groups disposed on the outer surface of the particle.

31a. The catalyst system of 18a to 30a, wherein the capping agent comprises $R^1R^2BH$, and wherein $R^1$ and $R^2$ are independently at each occurrence an organic radical comprising: $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl, $C_7$–$C_{40}$-halo-arylalkyl, or a combination comprising at least one of the foregoing.

32a. The catalyst system of 31a, wherein $R^1$ and $R^2$ are independently at each occurrence an organic radical comprising:

pentafluorophenyl, nonafluoroanthracenyl, undecafluorotetrahydronaphthyl, nonafluorofluorenyl, 2,3,4,6-tetrafluorophenyl, 2,3,5,6-tetrafluorophenyl, 2,3,5-trifluorophenyl, 2,4,6-trifluorophenyl, 1,3-difluorophenyl, 2,3,5,6-tetrafluoro-4-methylphenyl, 2,3,4,6-tetrafluoro-5-methylphenyl, 2,4,5-trifluoro-6-methylphenyl, 2,3,6-trifluoro-4-methylphenyl, 2,4,6-trifluoro-3-methylphenyl, 2,6-difluoro-3-methylphenyl, 2,4-difluoro-5-methylphenyl, 3,5-difluoro-2-methylphenyl, 4-methoxy-2,3,5,6-tetrafluorophenyl, 3-methoxy-2,4,5,6-tetrafluorophenyl, 2-methoxy-3,5,6-trifluorophenyl, 3-methoxy-2,5,6-trifluorophenyl, 3-methoxy-2,4,6-trifluorophenyl, 2-methoxy-3,5-difluorophenyl, 3-methoxy-2,6-difluorophenyl, 3-methoxy-4,6-difluorophenyl, 2-methoxy-4,6-difluorophenyl, 4-methoxy-2,6-difluorophenyl, or a combination comprising at least one of the foregoing.

33a. The catalyst system of 18a to 32a, wherein the capping agent comprises bis(perfluorophenyl) borane.

34a. The catalyst system of 18a to 33a, wherein the ionic activator comprises boron.

35a. The catalyst system of 34a, wherein the ionic activator comprises an ammonium salt.

36a. The catalyst system of 18a to 35a, wherein the ionic activator comprises:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium)tetrakis(pentafluorophenyl) borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluoro-phenyl) borate,
N,N-dimethyl-(2,4,6-trimethylanilinium)tetrakis-(2,3,4,6-tetrafluorophenyl) borate,
di-(i-propyl)ammonium tetrakis(pentafluorophenyl) borate,
dicyclohexylammonium tetrakis(pentafluorophenyl) borate,
triphenylphosphonium tetrakis(pentafluorophenyl) borate,
tri(o-tolyl)phosphonium tetrakis(pentafluorophenyl) borate,
tri(2,6-dimethylphenyl)phosphonium tetrakis(pentafluorophenyl) borate, or a combination comprising at least one of the foregoing activators.

37a. The catalyst system of 18a to 36a, wherein the ionic activator comprises N,N-dimethylanilinium tetrakis (pentafluorophenyl)borate, triphenylcarbenium tetrakis (pentafluorophenyl)borate, or a combination comprising at least one of the foregoing.

38a. The catalyst system of 18a to 37a, wherein essentially all of the capping agent does not form a support bound activator.

39a. An addition polymerization process, wherein one or more addition polymerizable monomers are contacted with the catalyst system of 1a to 38a under addition polymerization conditions.

40a. The addition polymerization process of 39a, wherein the polymerizable monomer includes $C_2$–$C_{100}$ olefins, $C_2$–$C_{100}$ alpha olefins, or a combination comprising at least one of the foregoing.

41. The addition polymerization process of 39a to 40a, carried out under slurry polymerization conditions.

42a. The addition polymerization process of 39a to 41a, carried out under gas phase polymerization conditions.

43a. The addition polymerization process of 39a to 42a, wherein condensed monomer or an inert diluent is present.

44a. A process to make a catalyst support of 1a to 43a, comprising:
contacting a support material comprising hydroxyl groups with a capping agent comprising a boron containing Lewis acid to produce a capped silica; and contacting the capped silica with an activator to produce the catalyst support, wherein the capping agent comprises boron, and wherein at least some of the capping agent does not form a support bound activator.

45a. The process of 44a, wherein the capping agent comprises $R^1R^2BH$, and wherein $R^1$ and $R^2$ are independently at each occurrence an organic radical comprising: $C_1$–$C_{40}$-alkyl, $C_1$–$C_{40}$-haloalkyl, $C_6C_{40}$-aryl, $C_6$–$C_{40}$-haloaryl, $C_7$–$C_{40}$-arylalkyl, $C_7$–$C_{40}$-halo-arylalkyl, or a combination comprising at least one of the foregoing.

46a. The process of 44a to 45a, wherein $R^1$ and $R^2$ are independently at each occurrence an organic radical comprising pentafluorophenyl, nonafluoroanthracenyl, undecafluorotetrahydronaphthyl, nonafluorofluorenyl, 2,3,4,6-tetrafluorophenyl, 2,3,5,6-tetrafluorophenyl, 2,3,5-trifluorophenyl, 2,4,6-trifluorophenyl, 1,3-difluorophenyl, 2,3,5,6-tetrafluoro-4-methylphenyl, 2,3,4,6-tetrafluoro-5-methylphenyl, 2,4,5-trifluoro-6-methylphenyl, 2,3,6-trifluoro-4-methylphenyl, 2,4,6-trifluoro-3-methylphenyl, 2,6-difluoro-3-methylphenyl, 2,4-difluoro-5-methylphenyl, 3,5-difluoro-2-methylphenyl, 4-methoxy-2,3,5,6-tetrafluorophenyl, 3-methoxy-2,4,5,6-tetrafluorophenyl, 2-methoxy-3,5,6-trifluorophenyl, 3-methoxy-2,5,6-trifluorophenyl, 3-methoxy-2,4,6-trifluorophenyl, 2-methoxy-3,5-difluorophenyl, 3-methoxy-2,6-difluorophenyl, 3-methoxy-4,6-difluorophenyl, 2-methoxy-4,6-difluorophenyl, 4-methoxy-2,6-difluorophenyl, or a combination comprising at least one of the foregoing.

47a. The process of 44a to 46a, wherein the capping agent comprises bis(perfluorophenyl) borane.

48a. The process of 44a to 47a, further comprising contacting the catalyst support with a catalyst precursor to produce a catalytic system.

49a. The process of 44a to 48a, wherein the catalyst precursor comprises a metallocene.

50a. A catalyst support comprising the result of the combination of:

(a) a support comprising hydroxyl groups;

(b) a capping agent comprising a boron containing Lewis acid; and (c) an ionic activator, wherein at least some of the capping agent does not form a support bound activator as determined by:

I) performing a time resolved luminescence analysis on a reference analyte comprising a catalyst precursor that is not in combination with the activator, to produce a plurality of reference output values, each being associated with a time resolved emission intensity at an emission energy;

II) performing a time resolved luminescence analysis on a sample analyte comprising the catalyst precursor in combination with the catalyst support, to produce a plurality of sample output values, each being associated with a time resolved emission intensity at an emission energy;

III) determining a reference emission energy and a reference lifetime each associated with a maximum emission intensity in the reference output values;

IV) determining a plurality of sample emission energy values and a plurality of sample lifetime values, each associated with a maximum emission intensity in the sample output values;

V) subtracting each of the sample emission energy values from the reference emission energy to produce a plurality of energy difference values;

VI) subtracting each of the sample lifetime values from the reference lifetime to produce a plurality of lifetime difference values;

VII) determining that an energy difference value, a lifetime difference value, or both representative of the combination of the support comprising hydroxyl groups and the capping agent comprising a boron containing Lewis acid are essentially zero values, and determining that an energy difference value, a lifetime difference value, or both representative of the combination of the support comprising hydroxyl groups and the ionic activator are essentially non-zero values, to determine that at least some of the capping agent does not form a support bound activator.

51a. The catalyst support of 50a, wherein the capping agent comprises $R^1R^2BH$, and wherein $R^1$ and $R^2$ are independently at each occurrence an organic radical comprising: $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl, $C_7$–$C_{40}$-haloarylalkyl, or a combination comprising at least one of the foregoing.

52a. The catalyst support of 50a to 51a, wherein $R^1$ and $R^2$ are independently at each occurrence an organic radical comprising pentafluorophenyl, nonafluoroanthracenyl, undecafluorotetrahydronaphthyl, nonafluorofluorenyl, 2,3,4,6-tetrafluorophenyl, 2,3,5,6-tetrafluorophenyl, 2,3,5-trifluorophenyl, 2,4,6-trifluorophenyl, 1,3-difluorophenyl, 2,3,5,6-tetrafluoro-4-methylphenyl, 2,3,4,6-tetrafluoro-5-methylphenyl, 2,4,5-trifluoro-6-methylphenyl, 2,3,6-trifluoro-4-methylphenyl, 2,4,6-trifluoro-3-methylphenyl, 2,6-difluoro-3-methylphenyl, 2,4-difluoro-5-methylphenyl, 3,5-difluoro-2-methylphenyl, 4-methoxy-2,3,5,6-tetrafluorophenyl, 3-methoxy-2,4,5,6-tetrafluorophenyl, 2-methoxy-3,5,6-trifluorophenyl, 3-methoxy-2,5,6-trifluorophenyl, 3-methoxy-2,4,6-trifluorophenyl, 2-methoxy-3,5-difluorophenyl, 3-methoxy-2,6-difluorophenyl, 3-methoxy-4,6-difluorophenyl, 2-methoxy-4,6-difluorophenyl, 4-methoxy-2,6-difluorophenyl, or a combination comprising at least one of the foregoing.

53a. The catalyst support of 50a to 52a, wherein the capping agent comprises bis(perfluorophenyl) borane.

54a. The catalyst support of 50a to 53a, wherein the ionic activator comprises boron.

55a. The catalyst support of 54a, wherein the ionic activator comprises an ammonium salt.

56a. The catalyst support of 50a to 55a, wherein the ionic activator comprises:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium)tetrakis(pentafluorophenyl) borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluoro-phenyl) borate,
N,N-dimethyl-(2,4,6-trimethylanilinium)tetrakis-(2,3,4,6-tetrafluorophenyl) borate;
di-(i-propyl)ammonium tetrakis(pentafluorophenyl) borate,
dicyclohexylammonium tetrakis(pentafluorophenyl) borate
triphenylphosphonium tetrakis(pentafluorophenyl) borate,
tri(o-tolyl)phosphonium tetrakis(pentafluorophenyl) borate,
tri(2,6-dimethylphenyl)phosphonium tetrakis(pentafluorophenyl) borate, or a combination comprising at least one of the foregoing activators.

57a. The catalyst support of 50a to 56a, wherein the ionic activator comprises: N,N-dimethylanilinium tetrakis (pentafluorophenyl)borate, triphenylcarbenium tetrakis (pentafluorophenyl)borate, or a combination comprising at least one of the foregoing.

58a. The catalyst support of 50a to 57a, wherein essentially all of the capping agent does not form a support bound activator.

We claim:

1. A catalyst support comprising the result of the combination of:
   (a) a support comprising hydroxyl groups;
   (b) a capping agent comprising a boron containing Lewis acid; and
   (c) an ionic activator, wherein at least some of the capping agent does not form a support bound activator.

2. The catalyst support of claim 1, wherein the support comprising hydroxyl groups comprises silica.

3. The catalyst support of claim 1, wherein the support comprising hydroxyl groups comprises silica calcined at about 400° C. to about 700° C. for a time less than or equal to about 12 hours.

4. The catalyst support of claim 1, wherein the support comprising hydroxyl groups comprises silica calcined in the presence of a fluorine source.

5. The catalyst support of claim 4, where the fluorine source comprises a fluoride salt.

6. The catalyst support of claim 1, wherein the support comprises less then or equal to about 0.1 millimole Si—OH functional groups per gram of support.

7. The catalyst support of claim 1, wherein the support comprises less then or equal to about 0.05 millimoles Si—OH functional groups per gram of support.

8. The catalyst support of claim 1, wherein the support comprises less then or equal to about 0.001 millimoles Si—OH functional groups per gram of support.

9. The catalyst support of claim 1, wherein the support comprises a plurality of particles, each particle having a plurality of pores arranged within the particle such that a surface of the pores defines an inner surface of the particle located internal to an outer surface of the particle, and wherein a concentration of Si—OH functional groups disposed on the inner surface of the particle is greater than a concentration of Si—OH functional groups disposed on the outer surface of the particle.

10. The catalyst support of claim 1, wherein the capping agent comprises $R^1R^2BH$, and wherein $R^1$ and $R^2$ are independently at each occurrence an organic radical comprising: $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl, $C_7$–$C_{40}$-halo-arylalkyl, or a combination comprising at least one of the foregoing.

11. The catalyst support of claim 10, wherein $R^1$ and $R^2$ are independently at each occurrence an organic radical comprising pentafluorophenyl, nonafluoroanthracenyl, undecafluorotetrahydronaphthyl, nonafluorofluorenyl, 2,3,4,6-tetrafluorophenyl, 2,3,5,6-tetrafluorophenyl, 2,3,5-trifluorophenyl, 2,4,6-trifluorophenyl, 1,3-difluorophenyl, 2,3,5,6-tetrafluoro-4-methylphenyl, 2,3,4,6-tetrafluoro-5-methylphenyl, 2,4,5-trifluoro-6-methylphenyl, 2,3,6-tetrafluoro-4-methylphenyl, 2,4,6-trifluoro-3-methylphenyl, 2,6-difluoro-3-methylphenyl, 2,4-difluoro-5-methylphenyl, 3,5-difluoro-2-methylphenyl, 4-methoxy-2,3,5,6-tetrafluorophenyl, 3-methoxy-2,4,5,6-tetrafluorophenyl, 2-methoxy-3,5,6-trifluorophenyl, 3-methoxy-2,5,6-trifluorophenyl, 3-methoxy-2,4,6-trifluorophenyl, 2-methoxy-3,5-difluorophenyl, 3-methoxy-2,6-difluorophenyl, 3-methoxy-4,6-difluorophenyl, 2-methoxy-4,6-difluorophenyl, 4-methoxy-2,6-difluorophenyl, or a combination comprising at least one of the foregoing.

12. The catalyst support of claim 1, wherein the capping agent comprises bis(perfluorophenyl) borane.

13. The catalyst support of claim 1, wherein the ionic activator comprises boron.

14. The catalyst support of claim 12, wherein the ionic activator comprises an ammonium salt.

15. The catalyst support of claim 1, wherein the ionic activator comprises:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl(2,4,6-trimethylanilinium) tetrakis(pentafluorophenyl) borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluoro-phenyl) borate,
N,N-dimethyl-(2,4,6-trimethylanilinium)tetrakis-(2,3,4,6-tetrafluorophenyl) borate,
di-(i-propyl)ammonium tetrakis(pentafluorophenyl) borate,
dicyclohexylammonium tetrakis (pentafluorophenyl) borate,
triphenylphosphonium tetrakis (pentafluorophenyl) borate,
tri(o-tolyl)phosphonium tetrakis (pentafluorophenyl) borate,
tri(2,6-dimethylphenyl)phosphonium tetrakis(pentafluorophenyl) borate, or a combination comprising at least one of the foregoing activators.

16. The catalyst support of claim 1, wherein the ionic activator comprises N,N-dimethylanilinium tetrakis (pentafluorophenyl)borate, triphenylcarbenium tetrakis(pentafluorophenyl)borate, or a combination comprising at least one of the foregoing.

17. The catalyst support of claim 1, wherein essentially all of the capping agent does not form a support bound activator.

18. A catalyst system comprising a catalyst support and a catalyst, the catalyst support comprising the result of the combination of:
(a) a support comprising hydroxyl groups;
(b) a capping agent comprising a boron containing Lewis acid; and
(c) an ionic activator, wherein at least some of the capping agent does not form a support bound activator.

19. The catalyst system of claim 18, wherein the catalyst comprises a metallocene.

20. The catalyst system of claim 18, wherein the catalyst comprises:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-pentadienyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienlyltitaniumtriisopropyl, pentamethylcyclopentadienyltitanniumtribenzyl,
pentamethylcyclopentadienyltitaniumdimethylmethoside,
pentamethyicyclopentadienyltitaniumdimethylchloride,
$\eta^5$+2,4-dimethyl-1,3-pentadienyl)titaniumtrimethyl,
octahydrofluorenyltitaniumtrimethyl,
tetrahydroindenyltitaniumtrimethyl,
etrahydrofluorenyltitaniumtrimethyl,
  (1,1-dimethyl-2,3,4,9,10-.eta.-1,4,5,6,7,8-hexahydronaphthalenyl)titaniumtr imethyl,
  (1,1,2,3-tetramethyl-2,3,4,9,10-,.eta.-1,4,5,6,7,8-hexahydronaphthalenyl)ti taniumtrimethyl,
  (tert-butylamido)(tetramethyl-η5-cyclopentadienyl)dimethylsilanetitanium dichloride,
  (tert-butylamido)(tetramethyl-η5-cyclopentadienyl)dimethylsilanetitanium dimethyl,
  (tert-butylamido)(tetramethyl-η5-cyclopentadienyl)-1,2-ethanediyltitanium dimethyl,
  (tert-butylamido)(tetramethyl-η5-indenyl)dimethylsilaL-netitanium dimethyl,
  (tert-butylamido)(tetramethyl-η5-cyclopentadienyl)dimethylsilane titanium (III) 2-(dimethylamino)benzyl;
  (tert-butylamido)(tetramethyl-η5-cyclopentadienyl)dimethylsilanetitanium (III) allyl,
  (tert-butylamido)(tetramethyl-η5-cyclopentadienyl)dimethylsilanetitanium (II) 1,4-diphenyl-1,3-butadiene,
  (tert-butylamido)(2-methylindenyl)dimethylsilanetitanium (II) 1,4-diphenyl-1,3-butadiene,
  (tert-butylamido)(2-methylindenyl)dimethylsilanetitanium (IV) 1,3-butadiene,
  (tert-butylamido)(2,3-dimethylindenyl)dimethylsilanetitanimm (II) 1,4diphenyl-1,3-butadiene,
  (tert-butylamido)(2,3-dimethylindenyl)dimethylsilanetitanium (IV) 1,3-butadiene,
  (tert-butylamido)(2,3-dimethylindenyl)dimethylsilanetitanium (II) 1,3-pentadiene,
  (tert-butylamido)(2-methylindenyl)dimethylsilanetitanium (II) 1,3-pentadiene,
  (tert-butylamido)(2-methylindenyl)dimethylsilanetitanium (IV) dimethyl,
  (tert-butylamido)(2-methyl-4-phenylindenyl)dimethylsilanetitanium (II)1,4-diphenyl-1,3-butadiene,
  (tert-butylamido)(tetramethyl-η5-cyclopentadienyl)dimethylsilanetitanium (IV) 1,3-butadiene,
  (tert-butylamido)(tetramethyl-η5-cyclopentadienyl)dimethylsilanetitanium (II) 1,4-dibenzyl-1,3-butadiene,
  (tert-butylamido)(tetramethyl-η5-cyclopentadienyl)dimethylsilanetitanium (II) 2,4-hexadiene,
  (tert-butylamido)(tetramethyl-$\eta^5$-cyclopentadienyl)dimethylsilanetitanium (II) 3-methyl-1,3-pentadiene,
  (tert-butylamido)(2,4-dimethyl-1,3-pentadien-'-yl)dimethylsilanetitaniumdim ethyl,
  (tert-butylamido)(1,1-dimethyl-2,3,4,9,10-.eta.-1,4,5,6,7,8-hexahydronaphthalen-4-yl)dimethylsilanetitaniumdimethyl,
  (tert-butylamido)(1,1,2,3-tetramethyl-2,3,4,9,10-.PI.- 1,4,5,6,7,8-hexahydro naphthalen-4-yl)dimethylsilanetitaniumdimethyl,
  biscyclopentadienylzirconiumdimethyl,
  biscyclopentadienyltitaniumdiethyl,
  cyclopentadienyltitaniumdiisopropyl,
  biscyclopentadienyltitaniumdiphenyl,
  biscyclopentadienyizircomum dibenzyl,
  biscyclopentadienyltitanium-2,4-pentadienyl,
  biscyclopentadienyltitaniummethylmethoxide,
  biscyclopentadienyltitaniunimethylchloride,
  bispentamethylcyclopentadienyltitaniumdimethyl,
  bisindenyltitaniumdimethyl,
  indenylfluorenyltitaniumdiethyl,
  bisindenyltitaniummethyl(2-(dimethylamino)benzyl),
  bisindenyltitaniummethyltrimethylsilyl,
  bistetrahydroindenyltitaniummethyltrimethylsilyl,
  bispentamethylcyclopentadienyltitaniumdiisopropyl,
  bispentamethylcyclopentadienyltitaniumdibenzyl,
  bispentamethylcyclopentadienyltitaniummethylmethoxide,
  bispentamethylcyclopentadienyltitaniummethylchloride,
  (dimethylsilyl-bis-cyclopentadienyl)zirconiumdimethyl,
  (dimethylsilyl-bis-pentamethylcyclopentadienyl)titanium-2,4-pentadienyl,
  (dimethylsilyl-bis-t-butylcyclopentadienyl)zirconiumdichloride,
  (methylene-bis-pentamethylcyclopentadienyl)titanium (III) 2-(dimethylamino)benzyl,
  (dimethylsilyl-bis-indenyl)zirconiumdichloride,
  (dimethylsilyl-bis-2-methylindenyl)zirconiumdimethyl,
  (dimethylsilyl-bis-2-methyl-4-phenylindenyl)zirconiumdimethyl,
  (dimethylsilyl-bis-2-methylindenyl)zirconium-1,4-diphenyl-1,3-butadiene,
  (dimethylsilyl-bis-2-methyl-4-phenylindenyl)zirconium (II) 1,4-diphenyl-1,3-butadiene,
  dimethylsilyl-bis-tetrahydroindenyl)zirconium(II) 1,4-diphenyl-1,3-butadiene,
  (dimethylsilyl-bis-fluorenyl)zirconiumdichloride,
  (dimethylsilyl-bis-tetrahydrofluorenyl)zircomumdi(trimethylsilyl),
  (isopropylidene)(cyclopentadienyl)(fluorenyl)zirconiumdibenzyl,
  (dimethylsilylpentamethylcyclopentadienylfluorenyl)zirconiumdimethyl, or a combination thereof.

21. The catalyst system of claim 18, wherein the catalyst comprises:
  (tert-butylamido)(tetramethyl-η5-cyclopentadienyl)-1,2-ethanediylzirconium dimethyl,
  (tert-butylamido)(tetramethyl-η5-cyclopentadienyl)-1,2-ethanediyltitanium dimethytbenzyl,
  (methylamido)(tetramethyl-η5-cyclopentadienyl)-1,2-ethanediylzirconium dibenzhydryl,
  (methylamido)(tetramethyl-η5-cyclopentadienyl)-1,2-ethanediyltitanium dineopentyl,
  (ethylamido)(tetramethyl-η5-cyclopentadienyl)-methylenetitanium diphenyl,
  (tert-butylamido)dibenzyl(tetramethyl-η5-cyclopentadienyl)silanezirconium dibenzyl,
  (benzylamido)dimethyl(tetramethyl-η5-cyclopentadienyl)silanetitanium di(trimethylsilyl),
  (phenylphosphido)dimethyl(tetrametbyl-η5-cyclopentadienyl)silanezirconium dibenzyl, or a combination thereof.

22. The catalyst system of claim 18, wherein the support comprises a plurality of particles, each particle having a plurality of pores arranged within the particle such that a surface of the pores defines an inner surface of the particle located internal to an outer surface of the particle, and wherein a concentration of the catalyst disposed on the inner surface of the particle is greater than a concentration of the catalyst disposed on the outer surface of the particle.

23. The catalyst system of claim 18, wherein the support comprising hydroxyl groups comprises silica.

24. The catalyst system of claim 18, wherein the support comprising hydroxyl groups comprises silica calcined at about 400° C. to about 700° C. for a time less than or equal to about 12 hours.

25. The catalyst system of claim 18, wherein the support comprising hydroxyl groups comprises silica calcined in the presence of a fluorine source.

26. The catalyst system of claim 18, wherein the fluorine source comprises a fluoride salt.

27. The catalyst system of claim 18, wherein the support comprises less then or equal to about 0.1 millimole Si-OH functional groups per gram of support.

28. The catalyst system of claim 18, wherein the support comprises less then or equal to about 0.05 millimoles Si-OH functional groups per gram of support.

29. The catalyst system of claim 18, wherein the support comprises less then or equal to about 0.001 millimoles Si-OH functional groups per gram of support.

30. The catalyst system of claim 18, wherein the support comprises a plurality of particles, each particle having a plurality of pores arranged within the particle such that a surface of the pores defines an inner surface of the particle located internal to an outer surface of the particle, and wherein a concentration of Si-OH functional groups disposed on the inner surface of the particle is greater than a concentration of Si-OH functional groups disposed on the outer surface of the particle.

31. The catalyst system of claim 18, wherein the capping agent comprises $R^1R^2BH$, and wherein $R^1$ and $R^2$ are independently at each occurrence an organic radical comprising: $C_1$–$C_{40}$–alkyl, $C_1$–$C_{40}$–haloalkyl, $C_6$–$C_{40}$–aryl, $C_6$–$C_{40}$–haloaryl, $C_7$–$C_{40}$–arylalkyl, $C_7$–$C_{40}$–halo-arylalkyl, or a combination comprising at least one of the foregoing.

32. The catalyst system of claim 31, wherein $R^1$ and $R^2$ are independently at each occurrence an organic radical comprising:
pentafluorophenyl, nonafluoroanthracenyl, undecafluorotetrahydronaphthyl,
nonafluorofluorenyl, 2,3,4,6-tetrafluorophenyl, 2,3,5,6-tetrafluorophenyl, 2,3,5-trifluorophenyl, 2,4,6-trifluorophenyl, 1,3-difluorophenyl, 2,3,5,6-tetrafluoro-4-methylphenyl, 2,3,4,6-tetrafluoro-5-methylphenyl, 2,4,5-trifluoro-6-methylphenyl, 2,3,6-trifluoro-4-methylphenyl, 2,4,6-trifluoro-3-methylphenyl, 2,6-difluoro-3-metbylpheriyl, 2,4-difluoro-5-methylphenyl, 3,5-difluoro-2-methylphenyl, 4-methoxy-2,3,5,6-tetrafluorophenyl, 3-methoxy-2,4,5,6-tetrafluorophenyl, 2-methoxy-3,5,6-trifluorophenyl, 3-methoxy-2,5,6-trifluorophenyl, 3-methoxy-2,4,6-trifluorophenyl, 2-methoxy-3,5-difluorophenyl, 3-methoxy-2,6-difluorophenyl, 3-methoxy-4,6-difluorophenyl, 2-methoxy-4,6-difluorophenyl, 4-methoxy-2,6-difluorophenyl, or a combination comprising at least one of the foregoing.

33. The catalyst system of claim 18, wherein the capping agent comprises bis(perfluorophenyl) borane.

34. The catalyst system of claim 18, wherein the ionic activator comprises boron.

35. The catalyst system of claim 33, wherein the ionic activator comprises an ammonium salt.

36. The catalyst system of claim 18, wherein the ionic activator comprises:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium terakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium) tetrakis(pentafluorophenyl) borate,
trimethylamnonium tetrakis-(2,3,4,6-tetrafluorophenyl) borate,
triethylanmonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluorophenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluorophenyl) borate,
N,N-dimethyl-(2,4,6-trimethylanilinium)tetrakis-(2,3,4,6-tetrafluorophenyl) borate,
di-(i-propyl)ammonium tetrakis(pentafluorophenyl) borate,
dicyclohexylammonium tetrakis(pentafluorophenyl) borate,
triphenylphosphonium tetrakis(pentafluorophenyl) borate,
tri(o-tolyl)phosphonium tetrakis(pentafluorophenyl) borate,
tri(2,6-dimethylphenyl)phosphonium tetrakis(pentafluorophenyl) borate, or a combination comprising at least one of the foregoing activators.

37. The catalyst system of claim 18, wherein the ionic activator comprises N,N-dimethylanilinium tetrakis(pentafluorophenyl)borate, triphenylcarbenium tetrakis(pentafluorophenyl)borate, or a combination comprising at least one of the foregoing.

38. The catalyst system of claim 18, wherein essentially all of the capping agent does not form a support bound activator.

39. An addition polymerization process, wherein one or more addition polymerizable monomers are contacted with the catalyst system of claim 18 under addition polymerization conditions.

40. The addition polymerization process of claim 39, wherein the polymerizable monomer includes $C_2$–$C_{100}$ olefins, $C_2$–$C_{100}$ alpha olefins, or a combination comprising at least one of the foregoing.

41. The addition polymerization process of claim 39, carried out under slurry polymerization conditions.

42. The addition polymerization process of claim 39, carried out under gas phase polymerization conditions.

43. The addition polymerization process of claim 39, wherein condensed monomer or an inert diluent is present.

44. A process to make a catalyst support comprising:
contacting a support material comprising hydroxyl groups with a capping agent comprising a boron containing Lewis acid to produce a capped silica; and
contacting the capped silica with an activator to produce the catalyst support, wherein the capping agent comprises boron, and wherein at least some of the capping agent does not form a support bound activator.

45. The process of claim 44, wherein the capping agent comprises $R^1R^2BH$, and wherein $R^1$ and $R^2$ are independently at each occurrence an organic radical comprising: $C_1$–$C_4$-alkyl, $C_1$–$C_{40}$-haloalkyl, $C_6$–$C_{40}$-aryl, $C_6$–$C_{40}$-haloaryl, $C_{7-C40}$-arylalkyl, $C_7$–$C40$ -halo-arylailcyl, or a combination comprising at least one of the foregoing.

46. The process of claim 45, wherein $R^1$ and $R^2$ are independently at each occurrence an organic radical comprising pentafluorophenyl, nonafluoroanthracenyl, undecafluorotetrahydronaphthyl, nonafluorofluorenyl, 2,3,4,6-tetrafluorophenyl, 2,3,5,6-tetrafluorophenyl, 2,3,5-trifluorophenyl, 2,4,6-trifluorophenyl, 1,3-difluorophenyl, 2,3,5,6-tetrafluoro-4-methylphenyl, 2,3,4,6-tetrafluoro-5-methylphenyl, 2,4,5-trifluoro-6-methylphenyl, 2,3,6-trifluoro-4-methylphenyl, 2,4,6-trifluoro-3-methylphenyl, 2,6-difluoro-3-methylphenyl, 2,4-difluoro-5-methylphenyl, 3,5-difluoro-2-methylphenyl, 4-methoxy-2,3,5,6-tetrafluorophenyl, 3-methoxy-2,4,5,6-tetrafluorophenyl, 2-methoxy-3,5,6-trifluorophenyl, 3-methoxy-2,5,6-trifluorophenyl, 3-methoxy-2,4,6-trifluorophenyl, 2-methoxy-3,5-difluorophenyl, 3-methoxy-2,6-difluorophenyl, 3-methoxy-4,6-difluorophenyl, 2-methoxy-4,6-difluorophenyl, 4-methoxy-2,6-difluorophenyl, or a combination comprising at least one of the foregoing.

47. The process of claim 44, wherein the capping agent comprises bis(perfluorophenyl) borane.

48. The process of claim 44, further comprising contacting the catalyst support with a catalyst precursor to produce a catalytic system.

49. The process of claim 48, wherein the catalyst precursor comprises a metallocene.

50. A catalyst support comprising the result of the combination of:
(a) a support comprising hydroxyl groups;
(b) a capping agent comprising a boron containing Lewis acid; and
(c) an ionic activator, wherein at least some of the capping agent does not form a support bound activator as determined by:
I) performing a time resolved luminescence analysis on a reference analyte comprising a catalyst precursor that is not in combination with the activator, to produce a plurality of reference output values, each being associated with a time resolved emission intensity at an emission energy;
II) performing a time resolved luminescence analysis on a sample analyte comprising the catalyst precursor in combination with the catalyst support, to produce a plurality of sample output values, each being associated with a time resolved emission intensity at an emission energy;
III) determining a reference emission energy and a reference lifetime each associated with a maximum emission intensity in the reference output values;
IV) determining a plurality of sample emission energy values and a plurality of sample lifetime values, each associated with a maximum emission intensity in the sample output values;
V) subtracting each of the sample emission energy values from the reference emission energy to produce a plurality of energy difference values;
VI) subtracting each of the sample lifetime values from the reference lifetime to produce a plurality of lifetime difference values;
VII) determining that an energy difference value, a lifetime difference value, or both representative of the combination of the support comprising hydroxyl groups and the capping agent comprising a boron containing Lewis acid are essentially zero values, and determining that an energy difference value, a lifetime difference value, or both representative of the combination of the support comprising hydroxyl groups and the ionic activator are essentially non-zero values, to determine that at least some of the capping agent does not form a support bound activator.

51. The catalyst support of claim 50, wherein the capping agent comprises $R^1R^2BH$, and wherein $R^1$ and $R^2$ are independently at each occurrence an organic radical comprising: $C_1$-$C_{40}$-alkyl, $C_1$-$C_{40}$-haloalkyl, $C_6$-$C_{40}$-aryl, $C_6$-$C_{40}$-haloaryl, $C_7$-$C_{40}$-arylalkyl, $C_7$-$C_{40}$-halo-arylalkyl, or a combination comprising at least one of the foregoing.

52. The catalyst support of claim 51, wherein $R^1$ and $R^2$ are independently at each occurrence an organic radical comprising pentafluorophenyl, nonafluoroanthracenyl, undecafluorotetrahydronaphthyl, nonafluorofluorenyl, 2,3,4,6-tetrafluorophenyl, 2,3,5,6-tetrafluorophenyl, 2,3,5-trifluorophenyl, 2,4,6-trifluorophenyl, 1,3-difluorophenyl, 2,3,5,6-tetrafluoro-4-methylphenyl, 2,3,4,6-tetrafluoro-5-methylphenyl, 2,4,5-trifluoro-6-methylphenyl, 2,3,6-trifluoro-4-methylphenyl, 2,4,6-trifluoro-3-methylphenyl, 2,6-difluoro-3-methylphenyl, 2,4-difluoro-5-methylphenyl, 3,5-difluoro-2-methylphenyl, 4-methoxy-2,3,5,6-tetrafluorophenyl, 3-methoxy-2,4,5,6-tetrafluorophenyl, 2-methoxy-3,5,6-trifluorophenyl, 3-methoxy-2,5,6-trifluorophenyl, 3-methoxy-2,4,6-trifluorophenyl, 2-methoxy-3,5-difluorophenyl, 3-methoxy-2,6-difluorophenyl, 3-methoxy-4,6-difluorophenyl, 2-methoxy-4,6-difluorophenyl, 4-methoxy-2,6-difluorophenyl, or a combination comprising at least one of the foregoing.

53. The catalyst support of claim 50, wherein the capping agent comprises bis(perfluorophenyl) borane.

54. The catalyst support of claim 50, wherein the ionic activator comprises boron.

55. The catalyst support of claim 54, wherein the ionic activator comprises an animonium salt.

56. The catalyst support of claim 50, wherein the ionic activator comprises:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium) tetrakis(pentafluorophenyl) borate,
trimethylamnionium tetrakis-(2,3,4,6-tetrafluorophenylborate, triethylammonium tetrakis-(2,3,4,6-tetrafluorophenyl) borate, tripropylammonium tetrakis-(2,3,4,6-tetrafluorophenyl) borate, tri(n-butyl)ammonium tetrakis-(2,3,4,6-tetrafluoro-phenyl) borate, dimethyl(t-butyl)ammonium tetrakis-(2,3,4,6-tetrafluorophenyl) borate, N,N-dimethylanilinium tetrakis-(2,3,4,6-tetrafluorophenyl) borate, N,N-diethylanilinium tetrakis-(2,3,4,6-tetrafluoro-phenyl) borate, N,N-dimethyl-(2,4,6-trimethylanilinium)tetrakis-(2,3,4,6-tetrafluorophenyl) borate, di-(i-propyl)ammonium tetrakis(pentafluorophenyl) borate, dicyclohexylammonium tetrakis(pentafluorophenyl) borate triphenylphosphonium tetrakis(pentafluorophenyl) borate, tri(o-tolyl)phosphonium tetrakis(pentafluorophenyl) borate, tri(2,6-dimethylphenyl)phosphonium tetrakis(pentafluoraphenyl) borate, or a combination comprising at least one of the foregoing activators.

57. The catalyst support of claim 50, wherein the ionic activator comprises N,N-dimethylanilinium tetrakis(pentafluorophenyl)borate, triphenylcarbenium tetrakis(pentafluorophenyl)borate, or a combination comprising at least one of the foregoing.

58. The catalyst support of claim 50, wherein essentially all of the capping agent does not form a support bound activator.

* * * * *